United States Patent
Kaneko et al.

[11] Patent Number: 5,769,344
[45] Date of Patent: Jun. 23, 1998

[54] SPINNING REEL FOR FISHING HAVING A LINE ROLLER FOR REDUCING LINE TWIST

[75] Inventors: Kyoichi Kaneko; Eiji Shinohara; Masatoshi Katayama; Wataru Tsutsumi, all of Tokyo, Japan

[73] Assignee: Daiwa Seiko, Inc., Higashikurume, Japan

[21] Appl. No.: 878,137

[22] Filed: Jun. 19, 1997

Related U.S. Application Data

[63] Continuation of Ser. No. 430,821, Apr. 28, 1995, abandoned.

[51] Int. Cl.⁶ .................................................. A01K 89/01
[52] U.S. Cl. ........................................... 242/231; 242/230
[58] Field of Search ................................... 242/230, 231, 242/232, 233

[56] References Cited

U.S. PATENT DOCUMENTS

| | | |
|---|---|---|
| 2,588,524 | 3/1952 | Herbert . |
| 2,728,534 | 12/1955 | Wallace . |
| 2,836,375 | 5/1958 | Meulnart ................................. 242/231 |
| 2,891,738 | 6/1959 | Chapin . |
| 3,670,984 | 6/1972 | Lemery ................................... 242/231 |
| 3,797,774 | 3/1974 | Dumbauid . |
| 3,987,976 | 10/1976 | Lilland . |
| 4,577,807 | 3/1986 | Urso . |
| 4,767,080 | 8/1988 | Tsunoda et al. . |
| 4,969,613 | 11/1990 | Kaneko ................................... 242/231 |
| 5,149,006 | 9/1992 | Hitomi . |
| 5,261,627 | 11/1993 | Shinohara ............................... 242/231 |
| 5,547,139 | 8/1996 | Kaneko . |
| 5,560,561 | 10/1996 | Henriksson . |

FOREIGN PATENT DOCUMENTS

| | | |
|---|---|---|
| 1252667 | 12/1960 | France . |
| 1299685 | 6/1962 | France . |
| 29-16470 | 12/1954 | Japan . |
| 30-5881 | 4/1955 | Japan . |
| 53-38582 | 4/1978 | Japan . |
| 58-194680 | 12/1983 | Japan . |
| 61-693545 | 12/1986 | Japan . |
| 2-83759 | 6/1990 | Japan . |
| 3-17661 | 4/1991 | Japan . |
| 3-79660 | 8/1991 | Japan . |
| 4-7178 | 2/1992 | Japan . |
| 4-77771 | 7/1992 | Japan . |
| 4-77772 | 7/1992 | Japan . |
| 5-29029 | 7/1993 | Japan . |
| 6-46467 | 6/1994 | Japan . |
| 94-4769 | 3/1994 | Rep. of Korea . |
| 94-8260 | 12/1994 | Rep. of Korea . |
| 354960 | 8/1931 | United Kingdom . |

*Primary Examiner*—Katherine Matecki
*Attorney, Agent, or Firm*—Longacre & White

[57] ABSTRACT

The present disclosure concerns a spinning reel for fishing which eliminates the accumulation of line twists in a fishline regardless of the line winding diameter on a spool. The spinning reel for fishing includes a rotor rotatably mounted to a reel main body, and the spool is supported on the reel main body through a spool shaft. Turning a manual handle causes the rotor to rotate around the spool. A line roller is supported on the rotor and guides the fishline onto the spool during winding. The line roller is oriented such that the diameter of a fishline guide portion of the line roller increases in the direction of rotor rotation during winding. A guide projection extending generally toward the longitudinal midpoint of the line roller contacts the fishline to ensure the fishline is maintained at a desired position with respect to the line roller during winding.

24 Claims, 82 Drawing Sheets

SPINNING REEL FOR FISHING HAVING A LINE ROLLER FOR REDUCING LINE TWIST

This is a continuation of application Ser. No. 08/430,821, filed Apr. 28, 1995, which was abandoned upon the filing hereof.

BACKGROUND OF THE INVENTION

1. Field of the Invention

The invention concerns a spinning reel for fishing. In particular, the present invention concerns a structure for preventing a fishline from becoming entangled due to twisting of the fishline in the course of fishing.

2. Description of Related Art

A conventional spinning reel for fishing, as shown in FIG. 105, includes a semi-annular bail 5 mounted on the leading end portions of a pair of bail support arms 3 provided on a rotor 1. A bail arm 9 having a line roller 7 mounts a first end of the bail 5, and a bail holder (not shown) mounts a second end of the bail 5. Consequently, the bail 5 can be reversibly positioned on a first side of the rotor 1 (indicated by A in FIG. 111) for winding a fishline onto a spool 15, and a second side of the rotor 1 (indicated by B in FIG. 111) for freely playing-out the fishline off the spool 15. Reference character 17 designates a mounting leg integrally formed with the reel main body 11.

Rotating a manual handle 13 supported on the reel main body 11 turns rotor 1. Rotation in the direction indicated by arrow C (FIGS. 105 and 106A) winds the fishline onto the spool 15 after the bail 5 has been positioned to the fishline winding side A. Concurrently, the rotor 1 makes a reciprocating motion linked with the rotation of the rotor 1. On the other hand, casting is performed with the bail 5 positioned to the fishline playing-out side B such that fishing tackle connected to the fishline 19 may be freely delivered.

However, during casting of the conventional spinning reel, one disadvantage is that the fishline is played-out off the spool 15 in a spiral manner as shown in FIG. 106B. Spiral delivery of the fishline 19 causes twists in the fishline 19 which may result in the fishline 19 becoming tangled or broken.

A conventional line roller 7 has a drum shaped surface for guiding fishline 19, as shown in FIG. 107. The fishline 19 is normally situated at the center m of the line roller 7. However, during winding of the fishline onto the spool 15, the fishline 19 is shifted in a direction D (i.e. in a direction substantially opposite to the movement C of the line roller 7 during winding rotation of the rotor 1) as shown by two-dotted chain line in FIG. 107. Since the friction between the curved surface of the line roller 7 and the fishline 19 is greater on the larger diameter portion of the line roller 7 than it is on the smaller diameter portion thereof, the line roller 7 on which the fishline 19 slides produces twists in the fishline 19 as shown by arrow E in FIG. 107. The twist direction E of the fishline 19 is the same as the direction of the spiral of the fishline 19 when it is played-out from the spool 15, thereby accentuating the aforementioned disadvantage of conventional spinning reels.

Japanese Utility Model Kokoku Publication No. Hei. 3-17661 addresses the noted disadvantage by including a line control member 29 on a spinning reel 31, as shown in FIGS. 108 and 109. Specifically, a U-shaped end portion 21a of a bail arm 21 supports the control member 29 for the purpose of shifting a fishline 27 from a central position n of a line roller 23 to a position closer to the end tip of the U-shaped portion 21a (i.e. toward a spool 25 referring to FIG. 108).

However, the spinning reel 31 fails to fully overcome the aforementioned disadvantage because the winding diameter of the fishline 27 onto the spool 25 varies according to the amount of the fishline 27 played-out from or wound on the spool 25, as shown in FIG. 110. As the winding diameter of the fishline 27 onto the spool 25 increases, the fishline 27 is shifted in a direction of arrow D as shown in FIG. 111. The line control member 29 is only capable of restricting the shifting of the fishline 27 from a distal position with respect to the line roller 23. Therefore, the line roller 23 in the fishing reel 31 still produces adverse twisting of the fishline 27 in the same direction E when the fishline 27 is played-out.

Consequently, the spinning reel as disclosed in Japanese Utility Model Kokoku Publication No. Hei. 3-17661 is adversely influenced by the winding diameter of the fishline 27 on the spool 25 and thus is not always capable of achieving its desired objective.

SUMMARY OF THE INVENTION

An object of the present invention is to overcome the aforementioned disadvantages in conventional spinning reels for fishing. Accordingly, an object of the present invention is to provide a spinning reel for fishing which eliminates the accumulation of twists in a fishline, without being affected by the winding diameter of the fishline. Another object of the present invention is to provide a spinning reel for fishing in which the fishline is prevented from becoming tangled in a line roller guiding the fishline onto a spool during winding of the fishline.

To attain the above-noted and other objects, the present invention describes a spinning reel for fishing including: a reel main body having a spool shaft; a spool mounted on the spool shaft; a rotor rotatably supported with respect to the reel main body for winding a fishline onto the spool, the rotor supporting a bail arm; and a line roller provided on the bail arm for guiding the fishline onto the spool upon rotation of the rotor.

The line roller includes a first axial end, a second axial end opposite from the first axial end, and a fishline guide portion extending between the first and second axial ends. The diameter of the fishline guide portion progressively increases in the axial direction from the first axial end to the second axial end.

The present invention further provides a spinning reel for fishing which includes: a reel main body having a spool shaft; a spool mounted on the spool shaft; a rotor rotatably supported with respect to the reel main body for winding a fishline onto the spool, the rotor supporting a bail arm; a line roller provided on the bail arm for guiding the fishline onto the spool upon rotation of the rotor; and an elongated fishline guide projection partially covering the fishline guide portion. A distal end, or guide, of the fishline guide projection extends axially to substantially over the longitudinal midpoint of the line roller, and contacts the fishline during winding onto the spool.

The present invention yet further provides a spinning reel for fishing which includes: a reel main body having a spool shaft; a spool mounted on the spool shaft; a rotor rotatably supported with respect to the reel main body for winding a fishline onto the spool, the rotor supporting a bail arm; a line roller provided on the bail arm for guiding the fishline onto the spool upon rotation of the rotor; and a flange radially projecting from at least one of the first and second axial ends of the line roller.

The present invention further provides a spinning reel for fishing which includes: a reel main body having a spool shaft; a spool mounted on the spool shaft; a rotor rotatably supported with respect to the reel main body for winding a fishline onto the spool, the rotor supporting a bail arm; a first line roller provided on the bail arm for guiding the fishline when the fishline is wound onto the spool by the rotor; and a second line roller juxtaposed with respect to the first line roller and constricted at an axial center for restricting axial shifting of the fishline with respect to the first line roller.

The present invention further provides a spinning reel for fishing which includes: a reel main body having a spool shaft; a spool mounted on the spool shaft; a rotor rotatably supported with respect to the reel main body for winding a fishline onto the spool, the rotor supporting a bail arm; a line roller provided on the bail arm for guiding the fishline onto the spool upon rotation of the rotor. The line roller includes a first axial end, a second axial end opposite from the first axial end, and a fishline guide portion extending between the first and second axial ends. A constricted portion of the fishline guide portion is defined by a minimal outer diameter of the fishline guide portion. The spinning reel further includes an elongated fishline guide projection extending axially from the first axial end toward the constricted portion. The guide projection prevents the fishline from shifting on the fishline guide portion in an axial direction from the constricted portion toward the first axial end.

The present invention yet further provides a spinning reel for fishing which includes: a reel main body having a spool shaft; a spool mounted on the spool shaft; a rotor rotatably supported with respect to the reel main body for winding a fishline onto the spool, the rotor supporting a bail arm; and a line roller provided on the bail arm for guiding the fishline onto the spool upon rotation of the rotor, the axis of rotation for the line roller being obliquely oriented with respect to the spool shaft.

DESCRIPTION OF THE PREFERRED EMBODIMENTS

Figure 1:
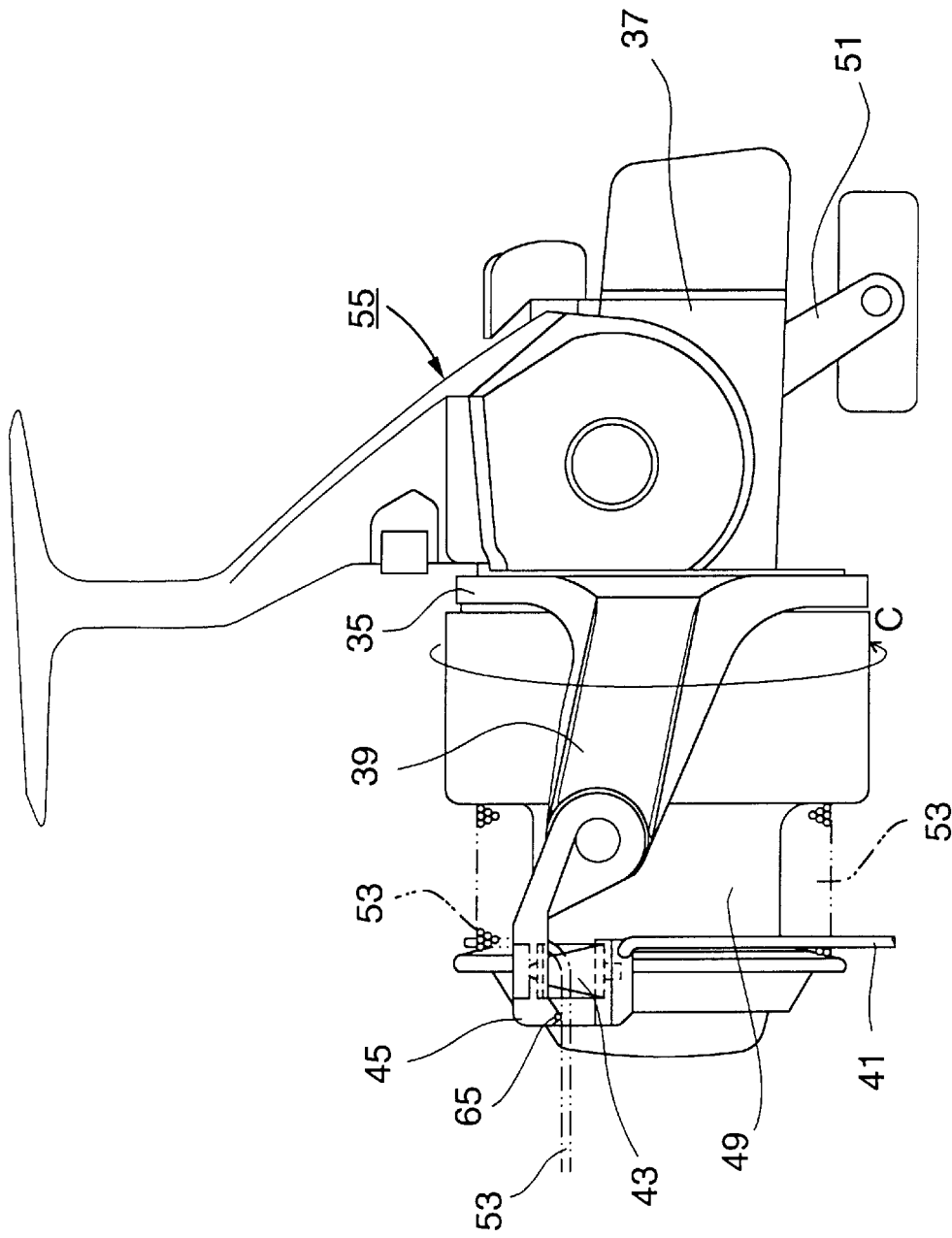
FIG. 1 is a front elevation view of a spinning reel for fishing according to a first embodiment of the present invention.
Figure 2:
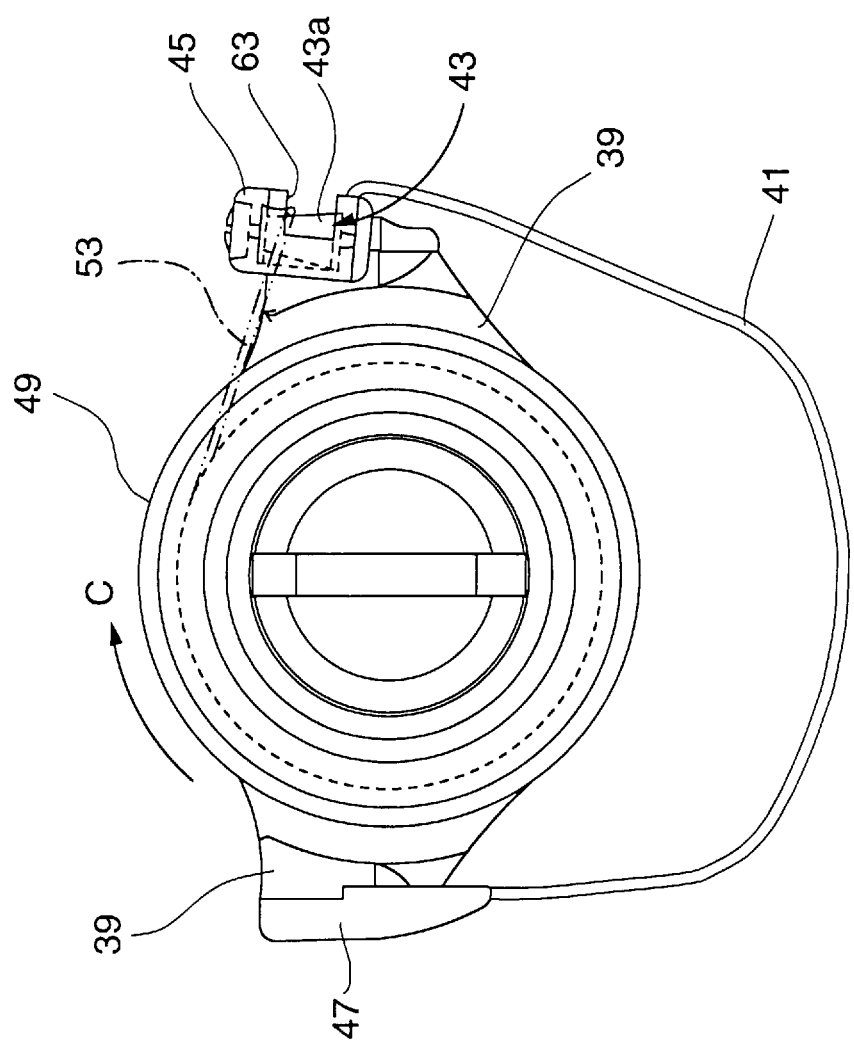
FIG. 2 is a left-side elevation view of the spinning reel for fishing shown in FIG. 1.

FIGS. 1–4 show a spinning reel for fishing according to a first embodiment of the present invention. In FIG. 1, a rotor 35 is rotatably mounted on a reel main body 37. A pair of bail support arms 39 (only one is shown) are formed integrally with the rotor 35. As shown in FIGS. 1 and 2, a semi-annular bail 41 is mounted on the leading end portions of the bail support arms 39. A bail arm 45 having a line roller 43 mounts a first end of the bail 41, and a bail holder 47 mounts a second end of the bail 41. Consequently, the bail 41 can be reversibly positioned on a first side of the rotor 35 for winding a fishline 53 onto a spool 49, and on a second side of the rotor 35 for freely playing-out the fishline 53 off the spool 49.

The spool 49 is mounted coaxially with the rotor 35 and is fixed on a spool shaft (not shown). The spool shaft is mounted for reciprocating movement with respect to the reel main body 37. Similar to the conventional spinning reels for fishing, after the bail 41 has been positioned on the fishline winding side, the rotor 35 is rotated in a fishline winding direction (indicated by arrow $\underline{C}$ in FIG. 1) by operating a manual handle 51. The fishline 53 is wound around the spool 49, which concurrently reciprocates in conjunction with rotation of the rotor 35.

The spinning reel 55 according to the first embodiment of the present invention has the following featured components in addition to the above-mentioned structure which is similar to the conventional fishing reels.

Figure 3:
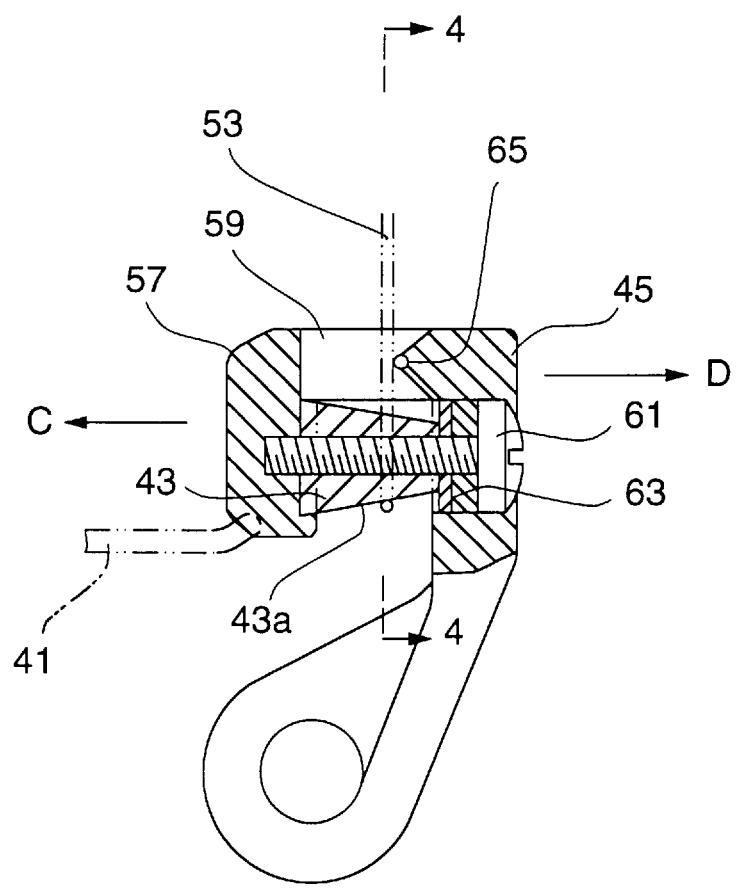
FIG. 3 is a cross-section view of the featured components of the spinning reel for fishing shown in FIG. 1.
Figure 4:
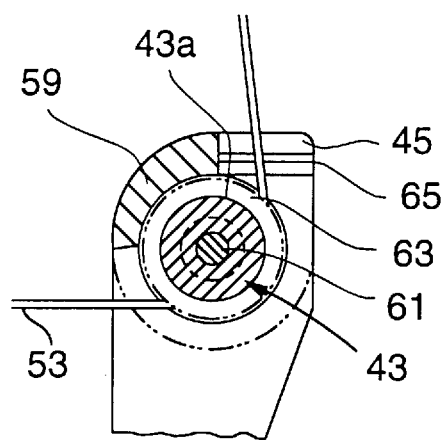
FIG. 4 is a cross-section view taken along line 4—4 in FIG. 3.

As shown in FIG. 3, a line slider 57 is fixed to the bail arm 45 by a line cover 59 in an integral manner. A line roller 43 is located between the bail arm 45 and line slider 57, and rotatably supported with a bolt 61 through a line washer 63. A fishline guide portion 43a of the line roller 43, interposed between right cylindrical end portions, is tapered. The diameter of the fishline guide portion 43a increases from proximate to the bail arm 45 to proximate the line slider 57 (in the direction of rotation $\underline{C}$ by the rotor 35 during winding).

Further, the leading face of the bail arm 45 projects toward the line slider 57 with a triangular shaped cross-section. A round cross-section guide 65 at the vertex of the projection may be formed of a hard ceramic or other material. During fishline winding, the guide 65 may contact the fishline 53 before the fishline 53 is directed by the line roller 43, thereby restricting movement of the fishline 53 toward the bail arm 45.

In the present embodiment, the line roller 43 has a tapered shape such that the diameter increases in the fishline winding direction of rotation $\underline{C}$ by the rotor 35. Preferably, the angle of taper of the line roller 43 is in the range of 1° to 12° as described below.

Figure 8:
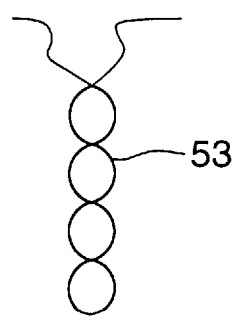
FIG. 8 is an explanatory view illustrating a "twine" caused by twisting a fishline.
Figure 9:
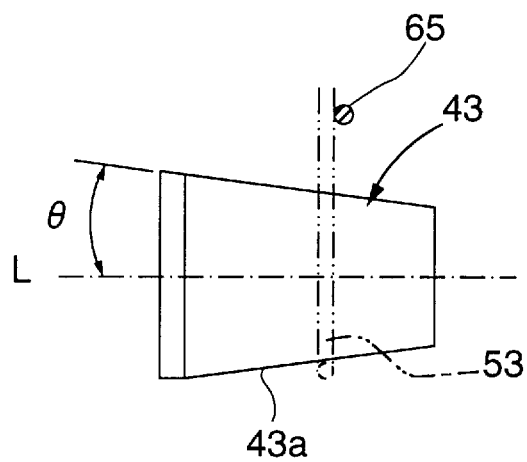
FIG. 9 is a front elevation view illustrating the "taper angle" of a line roller according to the present invention.

A test was conducted as to the relationship between the taper angle of the line roller 43, i.e. an angle θ between the longitudinal tangent 'LT' extending along the outer surface of the fishline guide portion 43a with respect to an axis L of the line roller 43 (FIG. 9), and the diameter of the fishline 53. The fishline 53 was wound onto the spool 49 a predetermined length with the angle of taper θ and the diameter of the fishline varied. The fishline 53 thus wound was played-out from the spool 49, and the twines or entanglements produced due to twists in the fishline 53 at a range of 5 m from the tip weight were counted. For example, the twines shown in FIG. 8 are counted as four. If the twists formed while playing-out the fishline are canceled by the twists produced during fishline winding, the number of twines is zero.

Table 1 shows an example of test variables used to evaluate various taper angles θ of line rollers. To ensure accurate test results, several reels and fishing rods were used in the tests.

TABLE 1

| diameter of fishline (grade) | weight of fishline (UNITS) | length of wound fishline × number of windings |
| --- | --- | --- |
| 1  | 15 | 30 m × 5 |
| 2  | 15 | 30 m × 5 |
| 4  | 25 | 50 m × 5 |
| 6  | 25 | 70 m × 5 |
| 12 | 30 | 70 m × 5 |
| 16 | 30 | 70 m × 5 |

Figure 10:
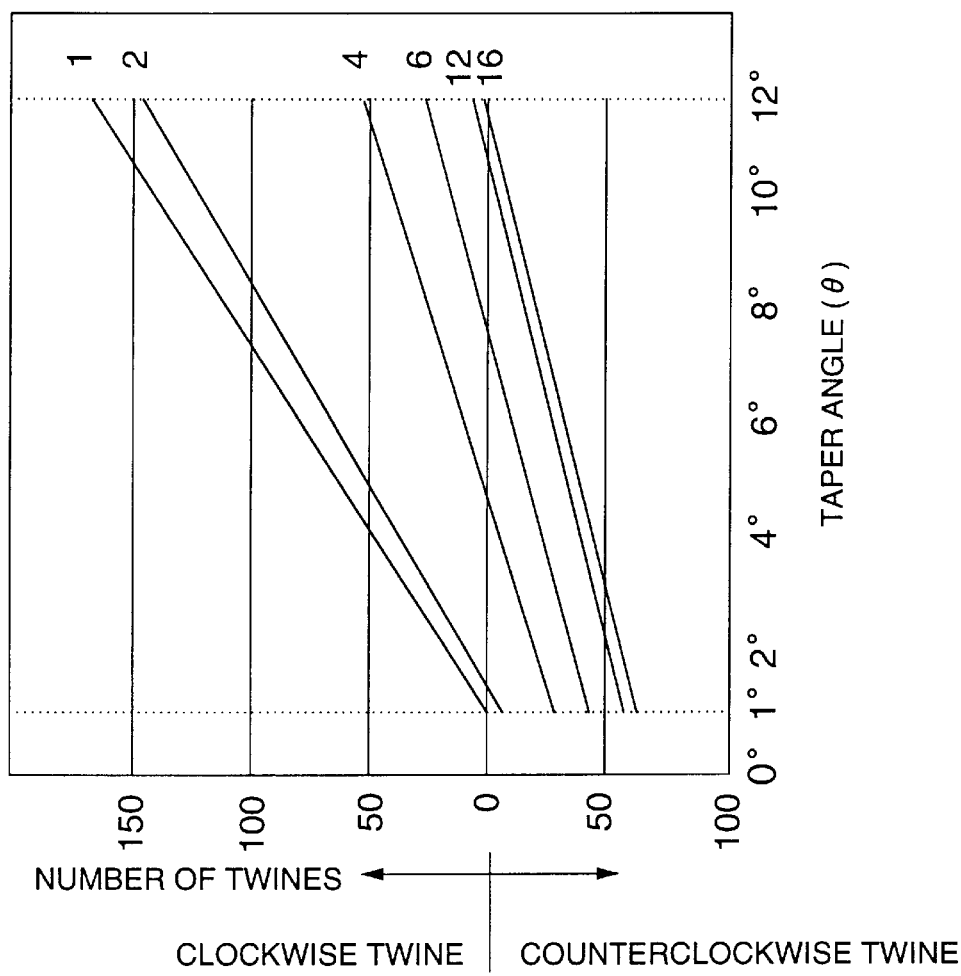
FIG. 10 is a graph illustrating the relationship between the taper angle and the number of twines.

A variety of line roller taper angles θ were tested with fishline diameters ranging from grade 1 to 16, inasmuch as these are the common fishline diameters used with spinning reels. The test results are shown in FIG. 10. It was found that the measured twines became zero (i.e. the combined twists occurring during fishline winding and playing-out mutually cancel) at a taper angle θ of about 1° with grade 1 fishline; about 7° with grade 6 fishline; about 10° with grade 12 fishline; and, about 12° with grade 16 fishline.

In view of the aforementioned test results, the embodiment of the present invention as shown in FIG. 3 employs a line roller 43 having a taper angle θ of 10° designed for use with grade 12 diameter fishline. The line roller 43 of the present embodiment is designed to be interchangeable, in accordance with the grade of fishline to be used. Therefore, an appropriately selected line roller 43 having a taper angle θ within the range of 1° to 12° is removably mounted between the line slider 57 and bail arm 45 via the bolt 61 and the line washer 63. Although the present embodiment is designed to have a line roller 43 which is interchangeable, it is also envisioned that a single line roller 43 may be selected with a taper angle θ of approximately 7°, even though such a line roller 43 can not completely remove the twists from all grades of fishline. However, the twists formed are generally within an acceptable range for use with any of the fishline diameters grade 4 to 16.

Alternatively, line roller 43 need not have a completely linear, tapered shape. For instance, line roller 43 may have a curved, tapered shape (FIG. 11), or a constricted shape (FIG. 12). The angle of taper θ of such line rollers 43 is defined as the angle formed between the axis L of the line roller and a tangential line at a point on the fishline guide portion 43a which contacts the fishline 53 during winding.

Figure 11:
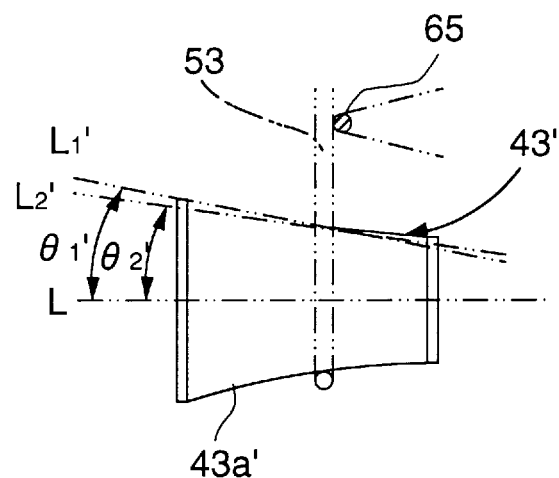
FIG. 11 illustrates the taper angle of another line roller according to the present invention.
Figure 12:
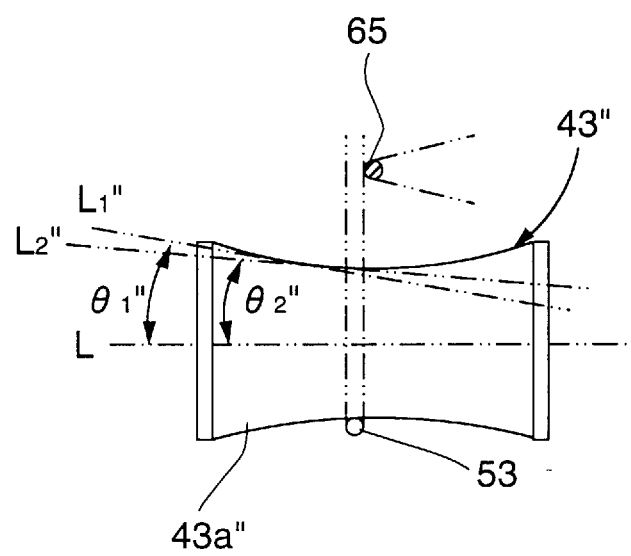
FIG. 12 illustrates the taper angle of yet another line roller according to the present invention.

As shown in FIG. 11, an angle $\theta_1'$ between the axis L and the line $L_1'$, an angle $\theta_2'$ between the axis L and the line $L_2'$, as well as the angles θ at all other points along the fishline guide portion 43a', are within the range of 1°–12°. The lines $L_1'$, $L_2'$ are tangential to the curved surface of the fishline guide portion 43a' at two of the points contacted by the fishline 53 during winding. Similarly, as shown in FIG. 12, an angle $\theta_1''$ between the axis L and the line $L_1''$, an angle $\theta_2''$ between the axis L and the line $L_2''$, as well as the angles θ at all other points along the fishline guide portion 43a'', are also within the range of 1°–12°. The lines $L_1'',L_2''$ are tangential to the curved surface on the left-side of the fishline guide portion 43a'' (guide 65 prevents fishline 53 from coming into contact with the right-side of the fishline guide portion 43a'' during fishline winding).

Although it is preferable to set the taper angle θ of the fishline guide portion 43 within a range of 1°–12°, the taper angle is properly determined in the design stage according to the size of the reel, thus the taper angle θ is not limited to 1°–12°.

Line roller 43 is generally constructed of various ceramics or other hard compositions, such as that obtained by subjecting copper alloy or the like to a hard plating treatment. Additional hardened materials which are acceptable include: aluminum subjected to a hard Alumirite treatment or a hard plating treatment, and stainless steel subjected to an ion plating process. These materials are not limitative, and alternative materials can also be used. The above-mentioned guide 65 can also be formed similarly.

Figure 5:
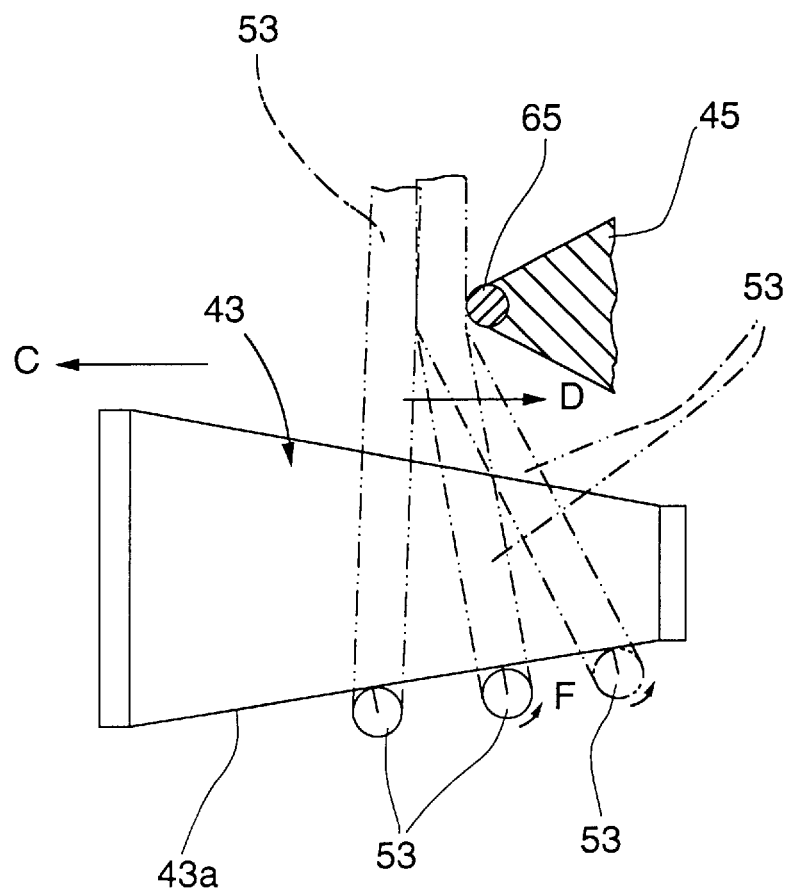
FIG. 5 is an explanatory view illustrating the movement and twist of a fishline as the line winding diameter varies.

Casting with a spinning reel including the components described hereto is performed with the bail 41 positioned on the fishline play-out side of the rotor 35, whereupon the fishline 53 wound around the spool 49 may be freely played out. Thereafter, the bail 41 is positioned on the fishline winding side of the rotor 35 with the fishline 53 situated substantially over the longitudinal midpoint along the axis L of the line roller 43, as shown in FIG. 5.

During winding, the manual handle 51 is rotated so as to wind the fishline 53 around the spool 49, which concurrently reciprocates in conjunction with rotation of the handle 51. Winding also causes the fishline 53 to shift in the direction indicated by arrow D in FIG. 5, however the guide 65 restricts such shifting of the fishline 53.

Inasmuch as the fishline guide portion 43a of the line roller 43 has a tapered shape that increases in diameter in the fishline winding direction C of the rotor 35, the friction between the line roller 43 and the fishline 53 is greater at the larger diameter side of the line roller 43. Consequently, the fishline 53 twists in a direction indicated by arrow F in FIG. 5, i.e. opposite to the direction the fishline twists during casting.

Figure 6:
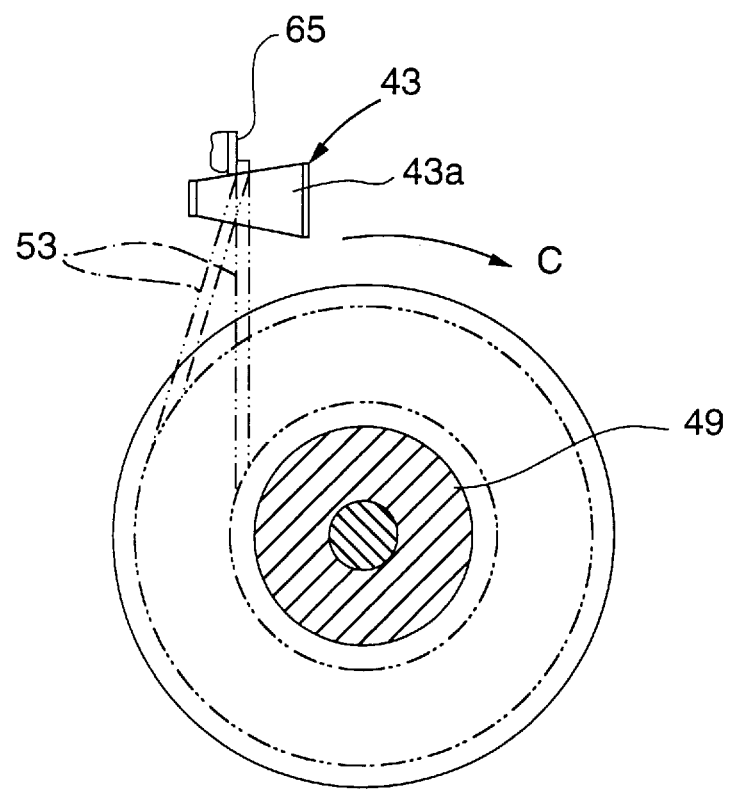
FIG. 6 is an explanatory view illustrating variations in the line winding diameter.

Further, as the contact point between the fishline 53 and the fishline guide portion 43a of the line roller 43 shifts further in the direction of arrow D (FIG. 5), due to increasing line winding diameter (FIG. 6), the tapered configuration of the line roller 43 additionally twists the fishline 53 in the direction F.

Figure 7A:
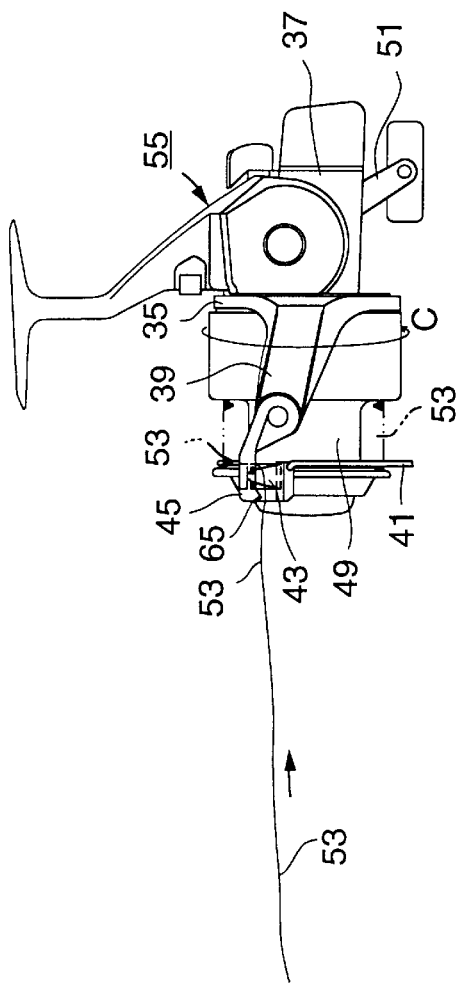
FIG. 7A shows the present invention in condition for winding a fishline onto a spool.
Figure 7B:
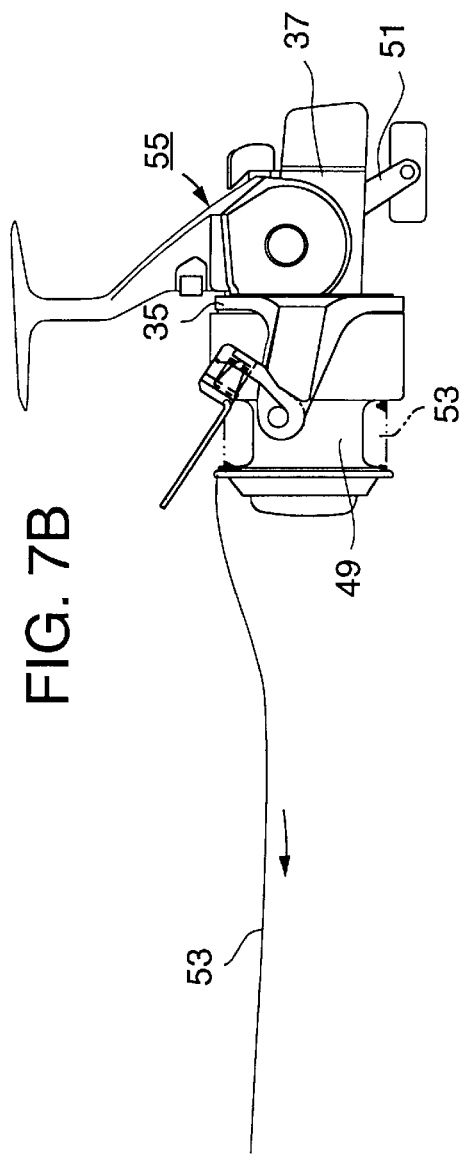
FIG. 7B shows the present invention in a condition for freely playing-out a fishline off a spool.

The fishline 53 wound onto the spool 49 according to the present invention is delivered during casting such that the line twists produced during casting and winding mutually cancel one another. That is to say, the fishline 53 can be delivered from the spool 49 in a straight manner as shown in FIG. 7B.

As the fishline 53 is further shifted in the direction D due to variations in the line winding diameter on the spool 49, contact between the fishline 53 and the guide 65 restricts movement of the fishline 53, thereby preventing the fishline 53 from becoming tangled between the line roller 43 and line washer 63.

This embodiment of the present invention solves the problems of conventional spinning reels for fishing previously described with reference to FIGS. 99 to 105. According to the present invention, line twists during fishline winding are intentionally produced in an opposite direction to line twists which occur during casting, thereby preventing line twists from accumulating in the fishline, regardless of the line winding diameter around the spool. Therefore, it is possible to eliminate the fishline becoming tangled due to twisting and avoid the possibility that the fishline may be severed due to accumulation of twists over time.

The extension of the guide 65 toward the longitudinal midpoint of the line roller 43 is not limited to the above description. Essentially, contact between the guide 65 and the fishline 53 must preclude separation of the fishline 53 from the fishline guide portion 43a of the line roller 43.

Figure 13:
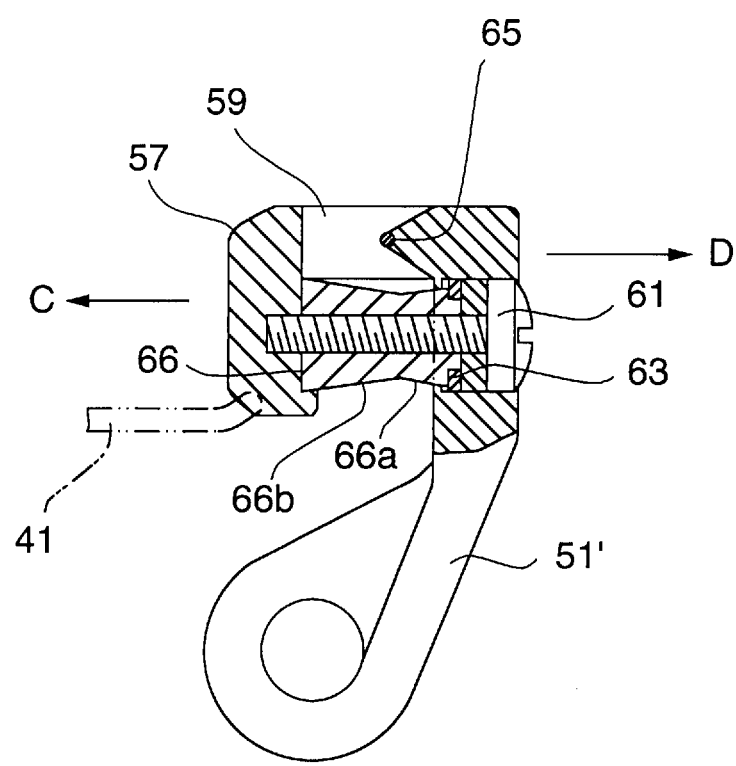
FIG. 13 is a cross-section view of the featured components of a spinning reel for fishing according to a second embodiment of the present invention.

FIG. 13 shows the featured components of a spinning reel for fishing according to a second embodiment of the present invention. A V-shaped line roller 66 is rotatably mounted via a bolt 61 which passes through a line washer 63 between a bail arm 51' and a line slider 57. The leading face of the bail arm 51' confronting the line slider 57 projects substantially to the longitudinal midpoint of the line roller 66, and possess a triangular section. A guide 65 is fixed to the vertex of the leading face of the bail arm 51'. The line roller 66 includes a valley portion 66a which is offset toward the bail arm 51'.

During winding, the guide 65 contacts the fishline 53 and restricts movement of the fishline 53 in the direction indicated by arrow D. Consequently, the fishline 53 is maintained between the longitudinal midpoint of the line roller 66 and the line slider 57, thus only portion 66b of the line roller 66 which is proximate to the line slider 57 functions as a fishline guide portion.

According to this embodiment of the present invention, the valley portion 66a of the V-shaped line roller 66 is situated slightly nearer to the bail arm 51' relative to the longitudinal midpoint of the line roller 66. The fishline guide portion 66b of the line roller 66 extending toward the line slider 57 is tapered such that the diameter increases in the fishline winding direction of rotation C of the rotor 35.

Elements of the second embodiment which are similar to those of the first embodiment are given the same designations and repetitive description thereof is omitted.

According to the second embodiment, turning the handle 51 causes the rotor 35 to rotate in the fishline winding direction C. The guide 65 contacts the fishline 53 to restrict shifting of the fishline 53 in the direction D such that the fishline 53 maintains contact with the fishline guide portion 66b of the line roller 66. The valley portion 66a in cooperation with the guide 65 further restrict shifting of the fishline 53 from the valley portion 66a toward the bail arm 51'.

Similar to the first embodiment, it is possible with the second embodiment of the present invention to intentionally twist the fishline 53 in the opposite direction to the line twists which occur during casting.

As the line winding diameter of the fishline 53 around the spool 49 increases, contact between the fishline 53 and the fishline guide portion 66b shifts in the direction D. However, the guide 65 contacts the fishline 53, thereby restricting movement of the fishline 53 so as to maintain the fishline 53 in contact with the tapered fishline guide portion 66b.

Similar to the first embodiment during fishline winding, the second embodiment intentionally twists the fishline 53 in the opposite direction to the line twists which occur during casting, regardless of the line winding diameter of the fishline 53 on the spool 49.

Figure 14:
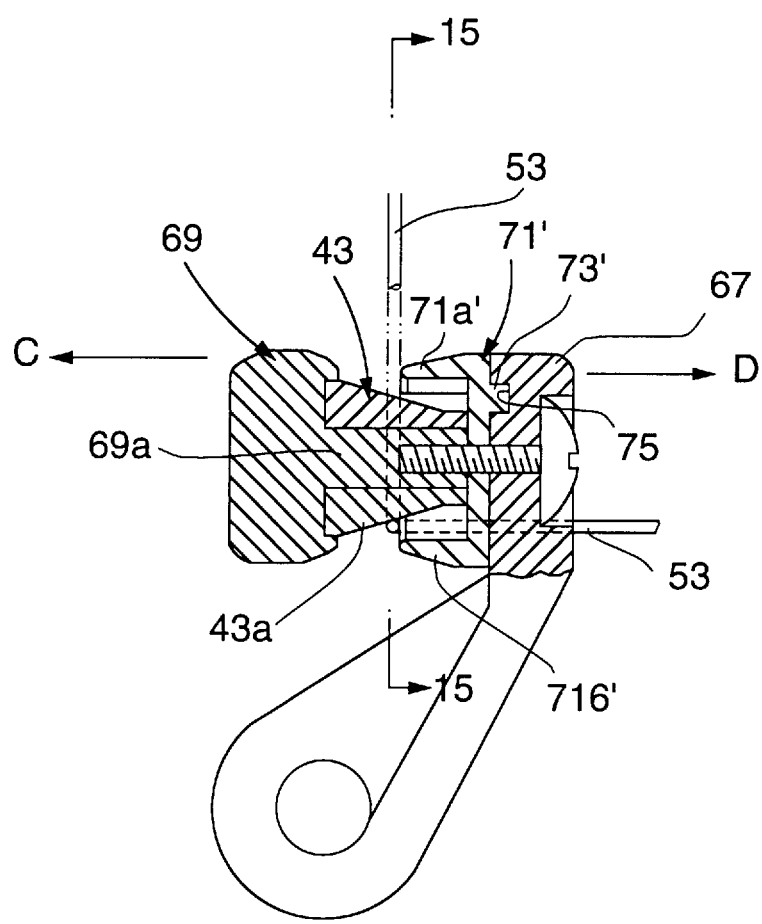
FIG. 14 is a cross-section view of the featured components of a spinning reel for fishing according to a third embodiment of the present invention.
Figure 15:
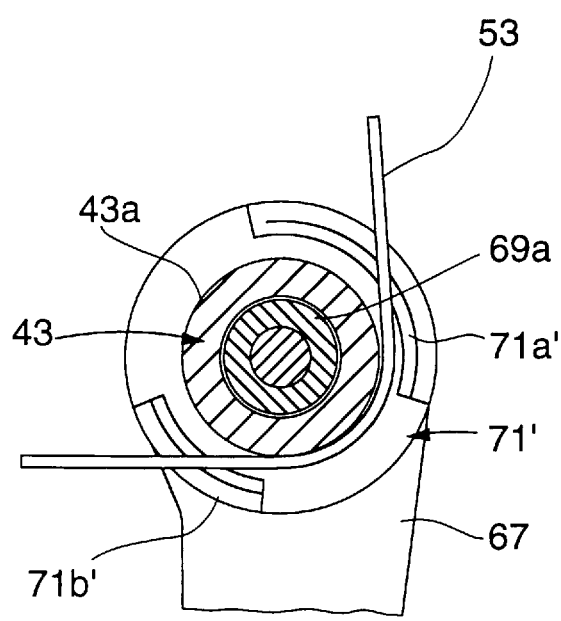
FIG. 15 is a cross-section view taken along the line 15—15 in FIG. 14.

FIGS. 14 and 15 show a spinning reel for fishing according to a third embodiment of the present invention. A ceramic guide 71' and a line slider 69 are secured to a bail arm 67. An appendage 73' provided on the guide 71' engages a recess formed in the bail arm 67 to prevent the guide 71' from rotating.

Two arc-shaped guide pieces 71a', 71b' integrally extend from the peripheral edge of the guide 71' toward the longitudinal midpoint of the line roller 43, and are diametrically opposite to one another with respect to the axis of the line roller 43. During winding, guide piece 71a' contacts the fishline 53 to restrict shifting of the fishline 53 in the direction D. The guide piece 71b' also contacts the fishline 53 to restrict shifting of the fishline 53 in the direction D in order to maintain the fishline 53 in substantially the central region of the line roller 43.

According to the third embodiment of the present invention, turning the handle 51 causes the rotor 35 to rotate in the fishline winding direction C. The guide piece 71a' contacts the fishline 53 to restrict shifting of the fishline 53 in the direction D such that the fishline 53 maintains contact with the central region of the fishline guide portion 43a.

As the line winding diameter of the fishline 53 around the spool 49 increases, contact between the fishline 53 and the line roller 43 shifts in the direction D. However, the guide piece 71b' contacts the fishline 53, thereby restricting movement of the fishline 53 so as to maintain the fishline 53 in contact with the fishline guide portion 43a.

Similar to the previous embodiments during fishline winding, the third embodiment of the present invention intentionally twists the fishline 53 in the opposite direction to the line twists which occur during casting, regardless of the line winding diameter of the fishline 53 on the spool 49.

Also, according to the third embodiment, as the line winding diameter of the fishline 53 wound around the spool 49 varies, the guide projection piece 71b' contacts the fishline 53 to restrict movement of the fishline 53 with respect to the line roller 43.

Figure 16:
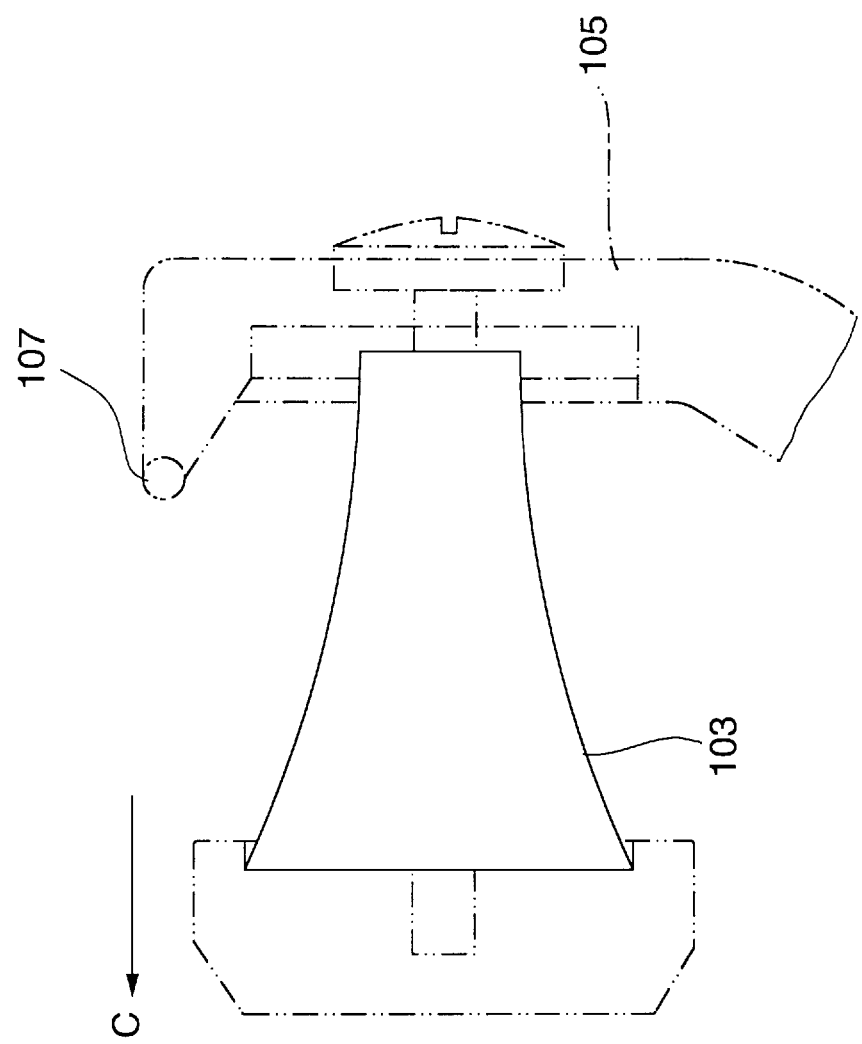
FIG. 16 is an enlarged front elevation view of a line roller in a spinning reel for fishing according to a fourth embodiment of the present invention.
Figure 17:
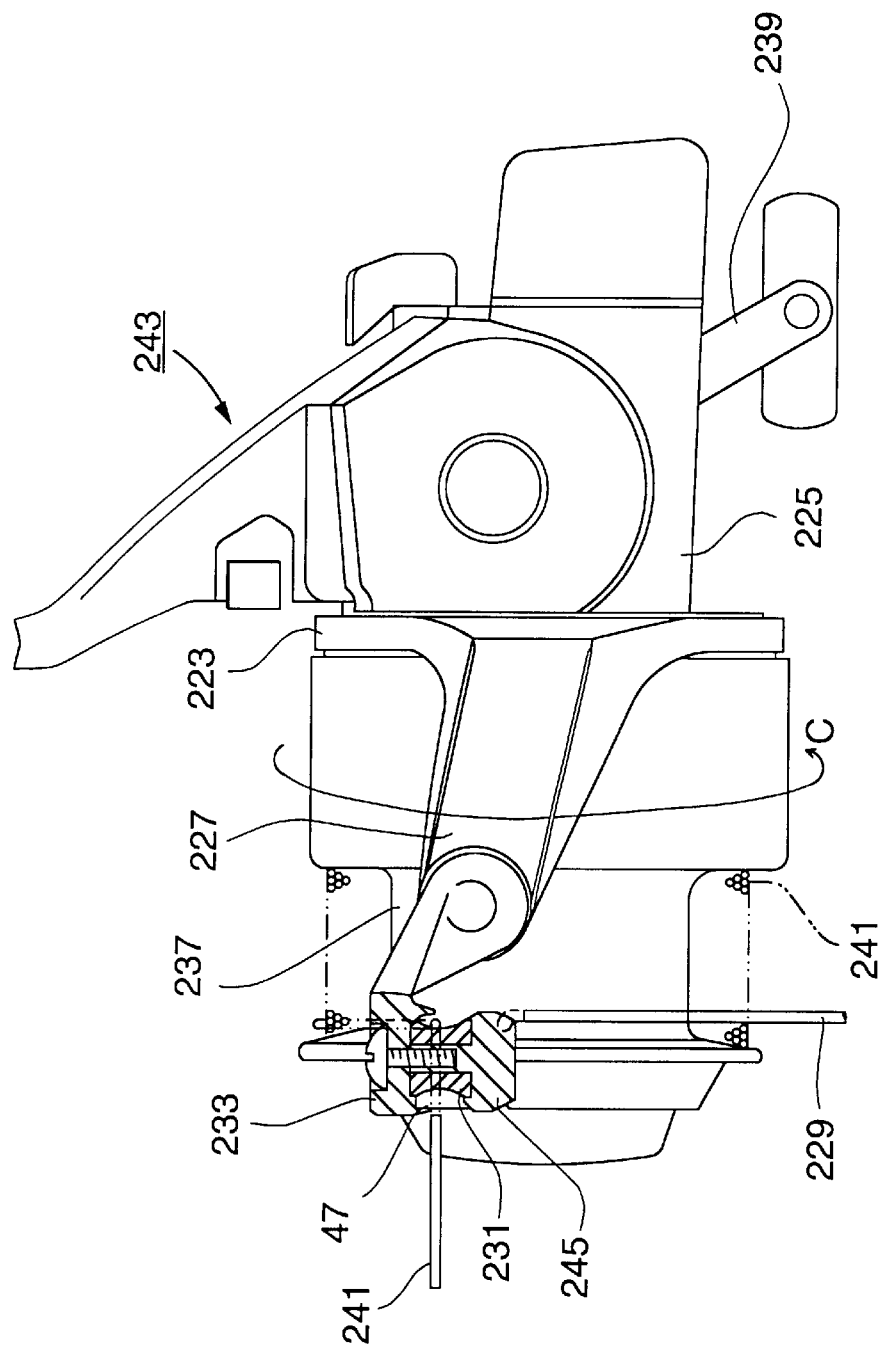
FIG. 17 is a front elevation view of a spinning reel for fishing according to a fifth embodiment of the present invention.

The shape of the line roller is not limited to the shapes illustrated in describing the first three embodiments of the present invention. For example, FIG. 16 illustrates a fourth embodiment according to the present invention in which a line roller 103 is formed in a trumpet shape with the diameter increasing non-linearly in the fishline winding direction C of the rotor 35, from proximate to the bail arm 105. The bail arm 105 may also project toward the longitudinal midpoint of the line roller 103 and include a guide 107 for contact with the fishline 53 as in the preceding embodiments.

Figure 18:
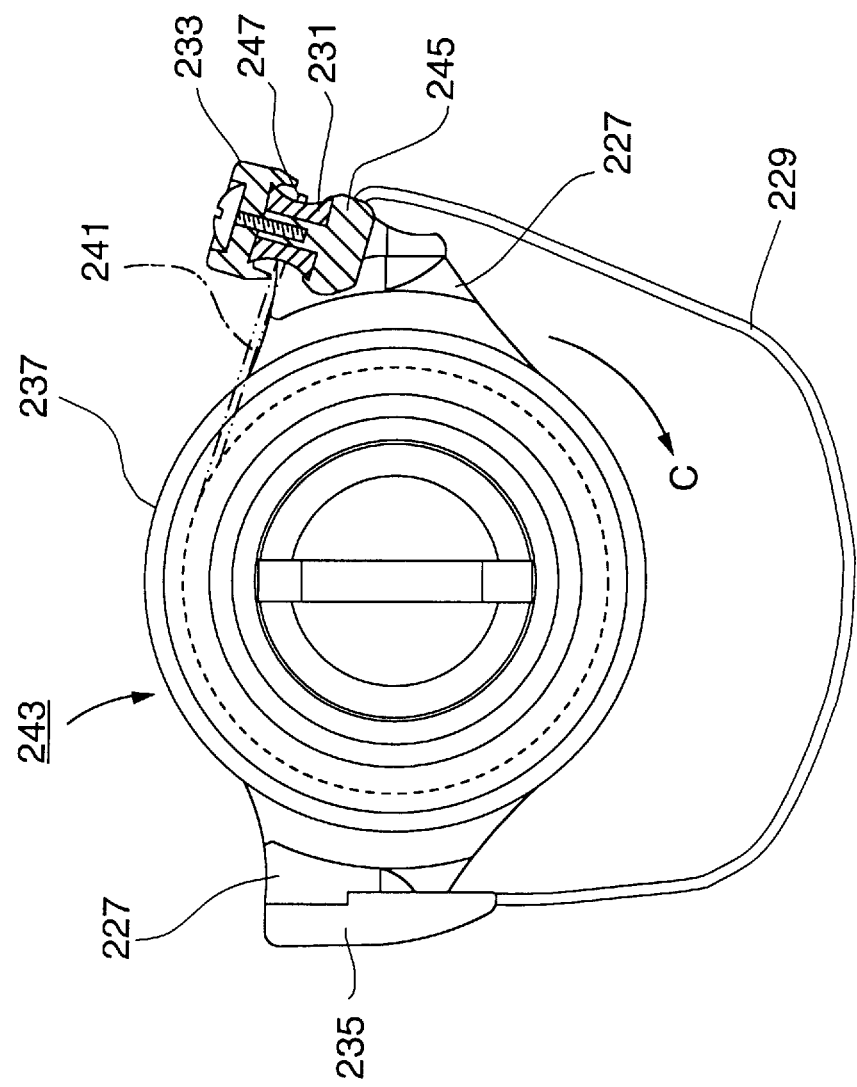
FIG. 18 is a partial cross-section, left-side elevation view of the spinning reel for fishing shown in FIG. 17.

FIGS. 17 to 20 show a spinning reel for fishing according to a fifth embodiment of the present invention. A rotor 223 is rotatably mounted on a reel main body 225. A pair of bail support arms 227 (only one is shown) are formed integrally with the rotor 223. As shown in FIG. 18, a semi-annular bail 229 is mounted on the leading end portions of the bail support arms 227. A bail arm 223 having a line roller 231 mounts a first end of the bail 229, and a bail holder 235 mounts a second end of the bail 229. Consequently, the bail 229 can be reversibly positioned on a first side of the rotor 223 for winding a fishline 241 onto a spool 237, and on a second side of the rotor 223 for freely playing-out the fishline 241 off the spool 237.

The spool 237 is mounted coaxially with the rotor 223 and is fixed on a spool shaft (not shown). The spool shaft is mounted for reciprocating movement with respect to the reel main body 225. After the bail 229 has been positioned on the fishline winding side, the rotor 223 is rotated in a fishline winding direction (indicated by arrow C in FIG. 18) by operating a manual handle 239. The fishline 241 is wound around the spool 237, which concurrently reciprocates in conjunction with rotation of the rotor 223.

Figure 19:
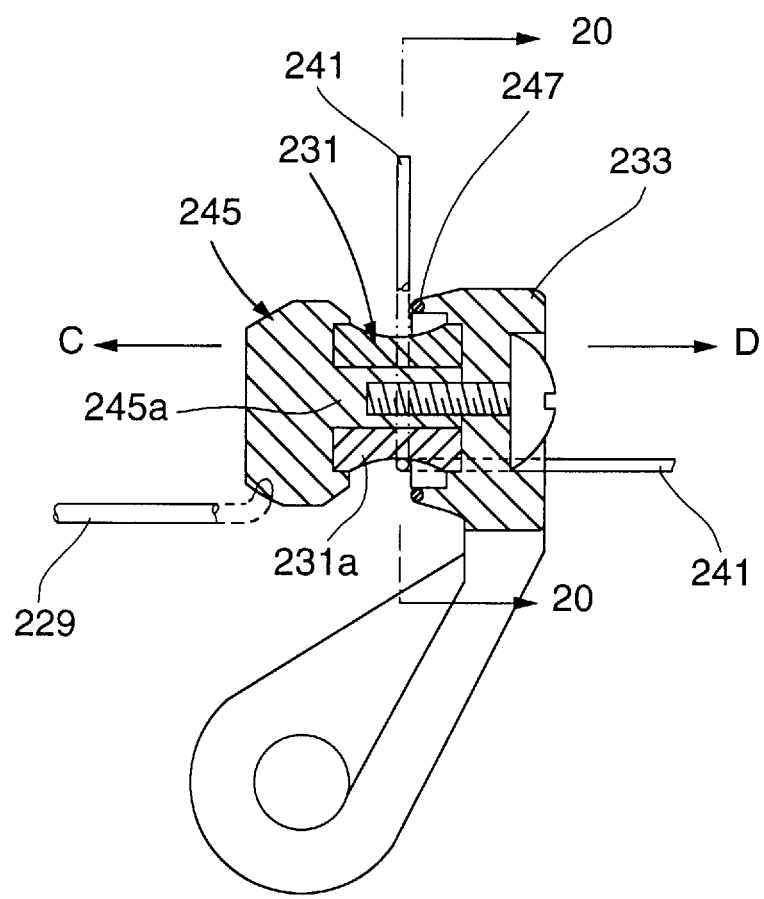
FIG. 19 is a cross-section view of the featured components of the spinning reel for fishing shown in FIG. 17.
Figure 20:
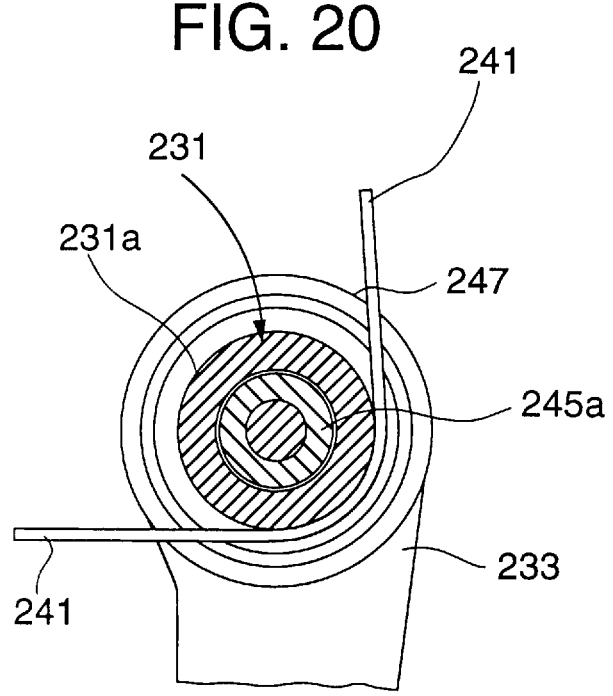
FIG. 20 is a cross-section view taken along the line 20—20 in FIG. 19.

FIG. 19 shows a structure for rotatably supporting the line roller 231. A line slider 245 has a substantially T-shaped axial cross-section including a shaft portion 245a secured to the bail arm 233. The line roller 231, including a drum-shaped fishline guide portion 231a, is rotatably supported on the shaft portion 245a.

The leading face of the bail arm 233 includes an annular projection formed on the peripheral edge which extends coaxially toward the longitudinal midpoint of the line roller 231. A hard ceramic annular guide 247 is fixed to the edge of the annular peripheral projection of the bail arm 233. During winding, the fishline 241 contacts the guide 247 to restrict shifting of the fishline 241, thereby maintaining the fishline 241 substantially in the central region of the line roller 231.

According to the fifth embodiment, turning the handle 239 causes the rotor 223 to rotate in the fishline winding direction C. The guide 247 contacts the fishline 241 to restrict shifting of the fishline 241 in the direction D such that the fishline 241 maintains contact with the central region of the line roller 231, i.e. to avoid becoming tangled in a gap between the line roller 231 and the bail arm 233.

Similarly to the previous embodiments, it is possible with the fifth embodiment of the present invention to intentionally twist the fishline 241 in the opposite direction to the line twists which occur during casting.

Inasmuch as shifting the fishline from the central position of the line roller 231 in the direction D is prevented, and intentional twisting of the fishline 241 during fishline winding is produced similar to the previous embodiments, the fishline 241 can be played-out from the spool 237 without twines.

Figure 21:
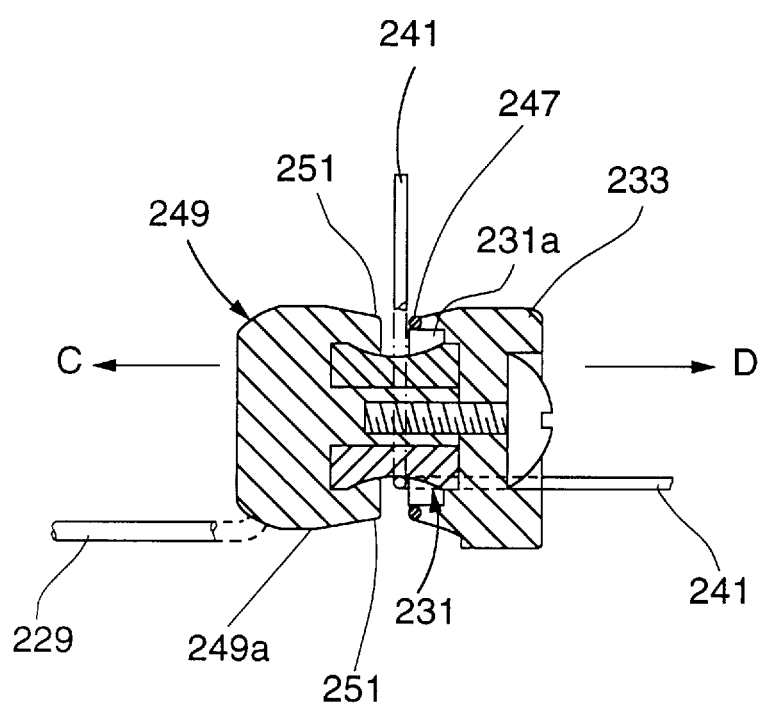
FIG. 21 is a cross-section view of the featured components of a spinning reel for fishing according to a sixth embodiment of the present invention.
Figure 22:
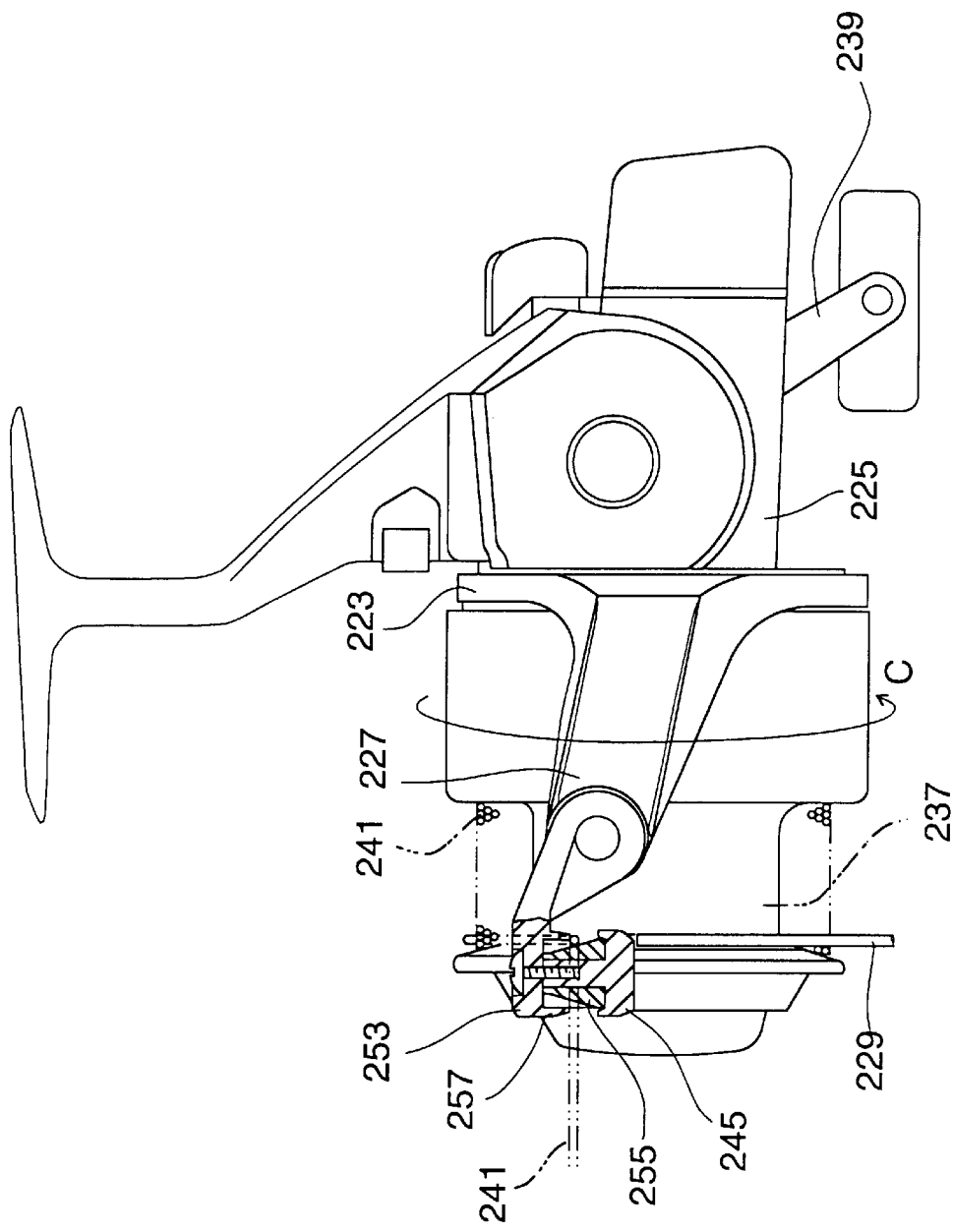
FIG. 22 is a front elevation view of a spinning reel for fishing according to a seventh embodiment of the present invention.
Figure 23:
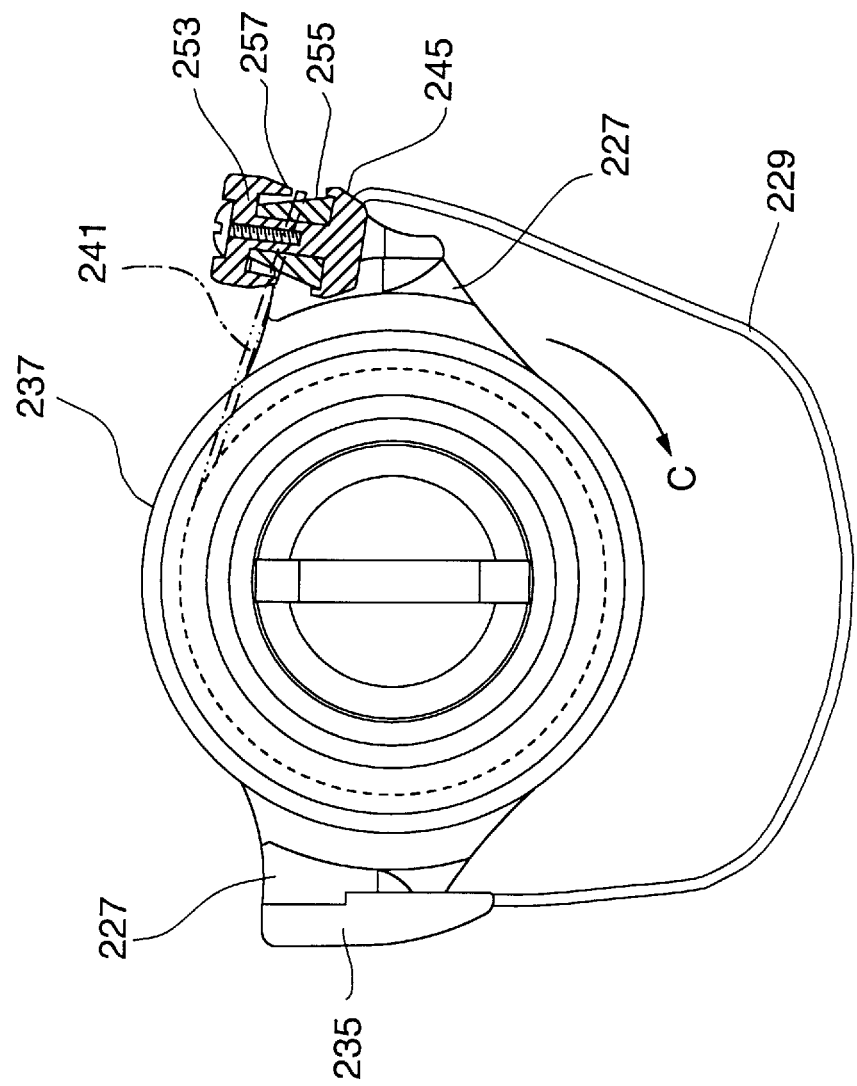
FIG. 23 is a partial cross-section, left-side elevation view of the spinning reel for fishing shown in FIG. 22.

FIG. 21 shows the featured components of a spinning reel for fishing according to a sixth embodiment of the present invention. In the sixth embodiment, the line slider 245 of the fifth embodiment is further modified to prevent the fishline 241 from becoming tangled in a gap between the line slider 245 and the line roller 231.

Elements of the sixth embodiment which are similar to those of the fifth embodiment are given the same designations and repetitive description thereof is omitted.

A line slider 249 including a shaft portion 249a is secured to the bail arm 233, and the line roller 231 is rotatably supported on the shaft portion 249a. The line slider 249 includes an annular, coaxial projection extending from the periphery toward the longitudinal midpoint of the line roller 231. A ceramic annular guide 251 is fixed to the edge of the annular peripheral projection so as to confront the guide 247.

The guide 251 prevents the fishline 241 from becoming tangled in the gap between the line slider 249 and line roller 231 and maintains the fishline 241 in substantially the central region of the line roller 231.

Similar to the fifth embodiment, as the fishline 241 is wound onto the spool, the guide 247 restricts the fishline 241 from shifting in the direction D, and in cooperation with guide 251 also maintains the fishline 241 substantially in the central region of the line roller 231, regardless of the line winding diameter of the fishline 241.

According to the sixth embodiment of the present invention, during winding of the fishline 241, the guide 247 prevents the fishline 241 from becoming tangled in the gap between the line roller 231 and bail arm 233. In addition, as the bail 229 is reversed from the fishline play-out side of the rotor 223 to the fishline winding side of the rotor 223, the guide portion 251 prevents the fishline 241 from becoming tangled in the gap between the line roller 231 and line slider 249.

FIGS. 22 to 25 show the featured components of a spinning reel for fishing according to a seventh embodiment of the present invention. Elements of the seventh embodiment which are similar to those of the fifth embodiment are given the same designations and repetitive description thereof is omitted.

A bail arm 253 is pivotally supported on an end portion of one of two bail support arms 227. Similarly to the fifth embodiment, the shaft portion 245a of the line slider 245 is secured to the bail arm 253 and a line roller 255 is rotatably supported on the shaft portion 245a. A fishline guide portion 255a of the line roller 255 has a tapered shape except for the two end portions. The diameter of the fishline guide portion 255a increases from proximate to the bail arm 253 to proximate to the line slider 245, i.e. in the fishline winding direction C of rotation of the rotor 223.

Figure 24:
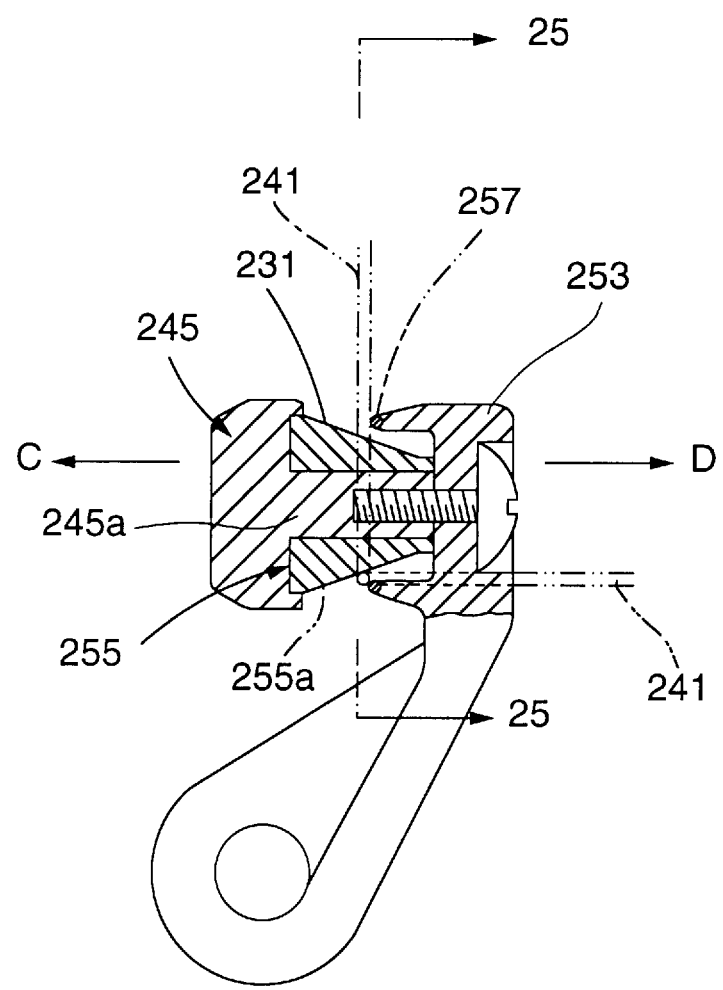
FIG. 24 is a cross-section view of the featured components of the spinning reel for fishing shown in FIG. 22.
Figure 25:
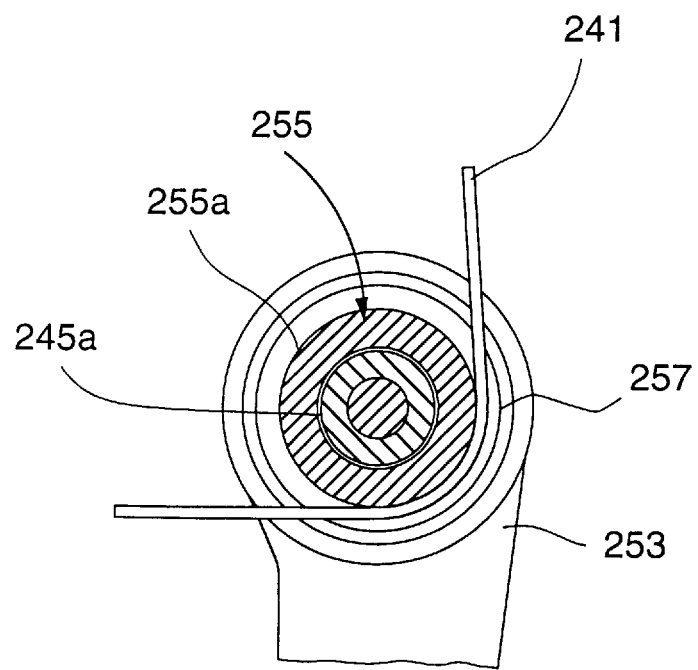
FIG. 25 is a cross-section view taken along line 25—25 in FIG. 24.

As shown in FIG. 24, the leading face of the bail arm 253 is formed in a circular shape and, similar to the bail arm 233, the periphery projects toward the center of the line roller 255 in an annular shape coaxial with respect to the line roller 255. A hard ceramic annular guide portion 257 is fixed to the edge of the annular periphery. During winding, the fishline 241 contacts the guide portion 257 so as to restrict shifting of the fishline 241 and maintain the fishline 241 substantially in the central region of the line roller 255.

Preferably, the line roller 255 has a taper angle θ in the range of 1° to 10°. However, the taper angle θ of the line roller 255 is best determined in the design stage according to the size of the fishing reel, and thus the taper angle θ is not limited to 1° to 10°.

Turning the handle 239 causes rotation of the rotor 223 in the direction C, and the fishline 241 to be shifted in the direction D as shown in FIG. 24. However, the guide 257 contacts the fishline 241 to restrict movement of the fishline 241 and hold the fishline 241 substantially in the central region of the line roller 255.

As the line winding diameter of the spool 237 increases as more of the fishline 241 is wound onto the spool 237, the fishline 241 in contact with the fishline guide portion 255a of the line roller 255 will tend to shift further in the direction D. However, contact between guide 257 and the fishline 241 restricts the shift in the direction D so as to maintain the fishline 241 substantially in the central region of the line roller 255.

Inasmuch as the line roller 255 has a tapered shape in which the diameter increases in the fishline winding direction C of rotation by the rotor 223, friction between the line roller 255 and the fishline 241 is greater at the larger diameter side of the line roller 255. Consequently, the fishline 241 is intentionally twisted during winding in the direction opposite to twisting which occurs during casting. Twisting of the fishline 241 during winding cancels the twisting in the casting operation, thus the fishline 241 can be delivered from the spool 237 in a straight manner (i.e. without twines).

Similarly to the fifth embodiment, the seventh embodiment of the present invention prevents the fishline 241 from becoming tangled in the gap between the line roller 255 and bail arm 253 during fishline winding. It is also possible to intentionally twist the fishline 241 in the opposite direction to line twists which occur during casting operation, thereby preventing accumulation of line twists in the fishline 241. Consequently, the seventh embodiment of the present invention minimizes the possibility that the fishline 241 will be severed when it is used over a long period of time.

Figure 26:
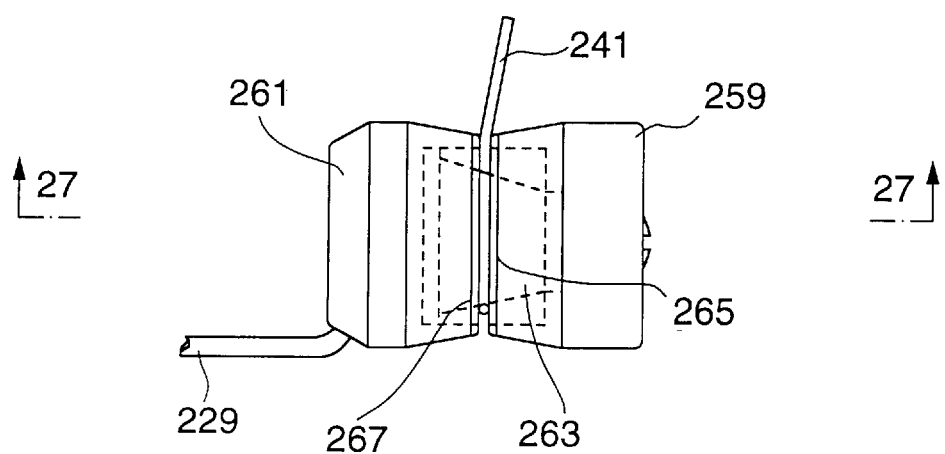
FIG. 26 is a plan view of the featured components of a spinning reel according to an eighth embodiment of the present invention.
Figure 27:
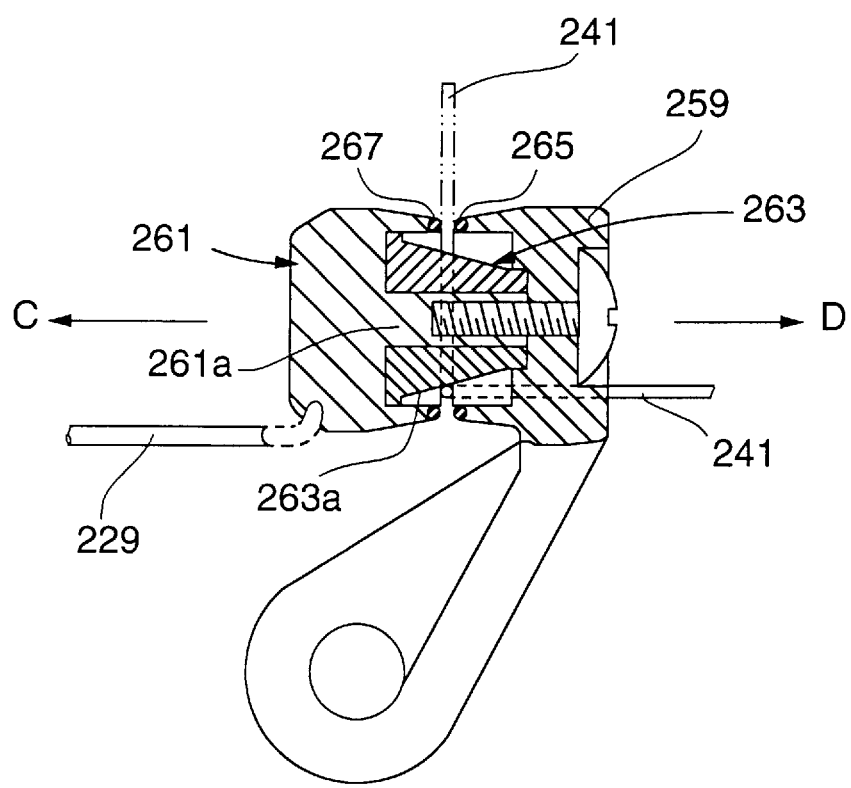
FIG. 27 is a cross-section view taken along line 27—27 in FIG. 26.

FIGS. 26 and 27 show a spinning reel for fishing according to an eighth embodiment of the present invention. A line slider 261 includes a shaft portion 261a secured to a bail arm 259. A line roller 263 is rotatably supported on the shaft portion 261a.

Similar to the line roller 255 of the seventh embodiment of the present invention, the line roller 263 according to the eighth embodiment includes a fishline guide portion 263a which is tapered between the two end portions of the line roller 263. The diameter of the fishline guide portion 263a increases from the bail arm 259 toward the line slider 261, i.e. in the fishline winding direction of rotation C of the rotor 223.

Both the leading face of the bail arm 259 supporting the line roller 263 and the line slider 261 are formed in a circular shape with coaxial annular projections extending from their periphery toward the longitudinal midpoint of the line roller 263. The annular projections confront one another on either side of the center of the line roller 263. Hard ceramic annular guides 265 and 267 are respectively fixed to the edges of the annular projections. Accordingly, during winding, the guides 265 and 267 contact the fishline 241 to restrict movement of the fishline 241 and maintain the fishline 241 at a given position on the line roller 263.

Elements of the eighth embodiment which are similar to those of the fifth embodiment are given the same designations and repetitive description thereof is omitted.

During winding, the fishline 241 is intentionally twisted in the opposite direction to line twists which occur during casting.

The two guides 265 and 267 maintain the fishline 241 at a given position on the line roller 263, therefore the fishline 241 is prevented from becoming tangled in a gap between the bail arm 259 and line roller 261 during fishline winding. Further, when the bail 229 is reversed from the fishline play-out side of the rotor 223 to the fishline winding side of the rotor 223, the guide portion 267 prevents the fishline 241 from becoming tangled in a gap between the line slider 261 and line roller 263.

Figure 28:
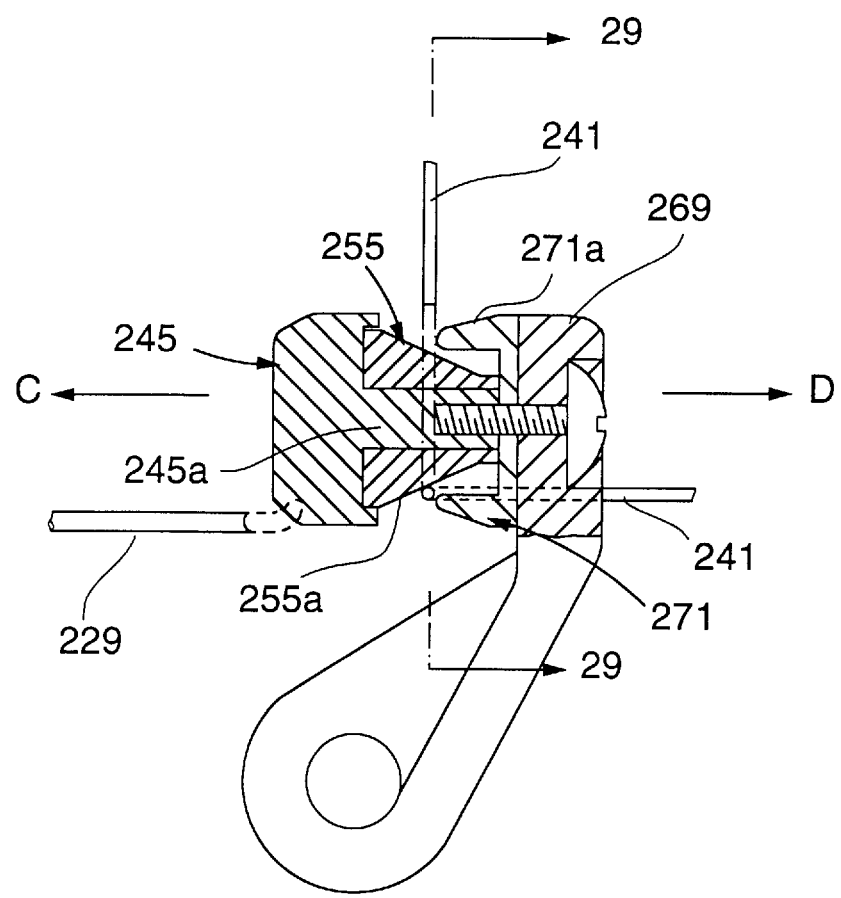
FIG. 28 is a cross-section view of the featured components of a spinning reel for fishing according to a ninth embodiment of the present invention.
Figure 29:
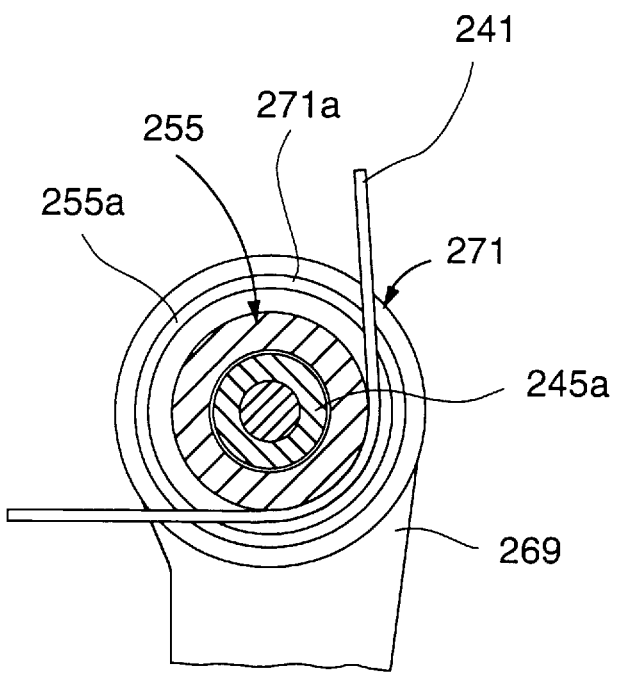
FIG. 29 is a cross-section view taken along line 29—29 in FIG. 28.

FIGS. 28 and 29 show the featured components of a spinning reel for fishing according to a ninth embodiment of the present invention. A bail arm 269 is pivotally mounted on the leading end of a bail support arm 227. A line slider 245 including a shaft portion 245a is bolted to the bail arm 269. A line roller 255 rotatably supported on the shaft portion 245a has a tapered shape in which the diameter decreases toward the bail arm 269.

A ceramic annular guide piece 271 is also secured to the bail arm 269 by the line slider 245. The guide piece 271 includes an annular guide projection 271a extending coaxially from the periphery of the guide piece 271 toward the longitudinal midpoint of the line roller 255. During winding, the guide projection 271a contacts the fishline 241 to restrict movement of the fishline 241 and maintain the fishline 241 in substantially the central region of the line roller 255.

In addition to ceramics, alternate hard materials for the guide piece 271 (similar to the guide projection 247 shown in FIG. 19) include copper alloy receiving a hard plating treatment, aluminum receiving a hard Alumirite treatment or a hard plating treatment, stainless steel receiving an ion plating treatment, and the like. However, the material of the guide piece 271 is not limited to these materials.

Turning the handle 239 to rotate the rotor 223 in the fishline winding direction C twists the fishline 241 in the opposite direction to line twists occurring during casting.

During winding, the fishline 241 guided by the line roller 255 is shifted in the direction D. However, the guide projection 271a contacts the fishline 241 to restrict shifting of the fishline 241 and maintain the fishline 241 substantially in the central region of the line roller 255.

According to the eighth embodiment of present the present invention, the fishline 241 is prevented from becoming tangled in a gap between the line roller 255 and bail arm 269 during winding, and also prevented from being severed due to accumulation of line twists in the fishline 241.

As previously noted with respect to the embodiments shown in FIGS. 22 to 25, the guides 257,271a are projected toward the longitudinal midpoint of the line roller 255 sufficiently to prevent the fishline 242 from becoming tangled while guiding the fishline 241 to the fishline guide portion of the line roller 255 during winding. As such, the extent of projection for the guides is not restricted to or by that illustrated in the drawings.

Figure 30:
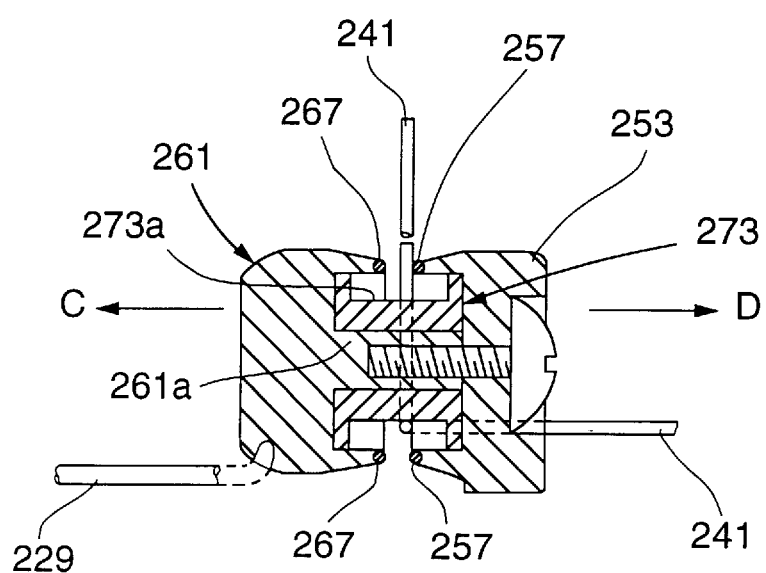
FIG. 30 is a cross-section view of the featured components of a spinning reel for fishing, which is a modification of the ninth embodiment.

Similarly, the shape of the line roller is not limited to the drum shape, the tapered shape or the variations shown in the accompanying drawings. For example, FIG. 30 illustrates a line roller 273 having a right cylindrical fishline guide portion 273a and integral flange-like ends of the cylindrical guide portion 273a, which may also be used as a line roller for a spinning reel according to the present invention. Supporting line roller 273 as illustrated in either FIG. 24 or FIG. 27, the fishline 241 is prevented from becoming tangled between the line roller, the bail arm and the line slider in accordance with an object of the present invention.

Figure 31:
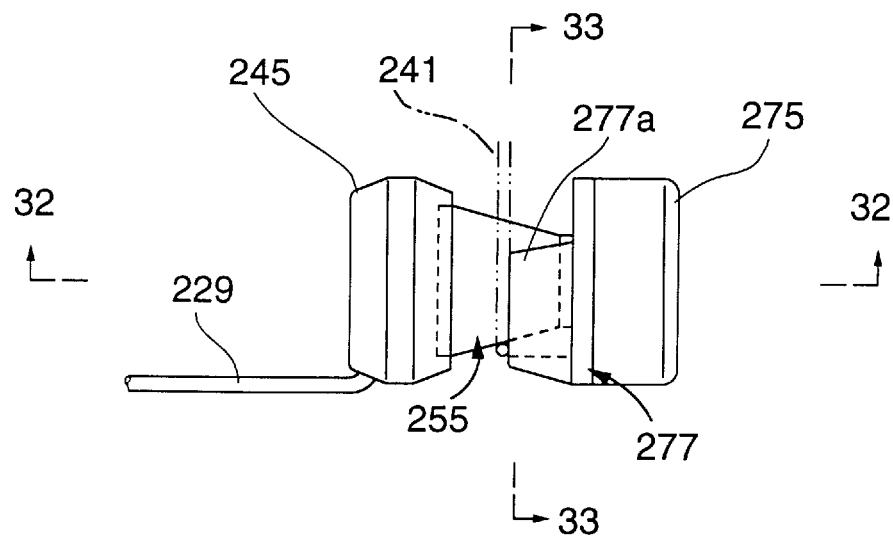
FIG. 31 is a plan view of the featured components of a spinning reel for fishing according to a tenth embodiment of the present invention.
Figure 32:
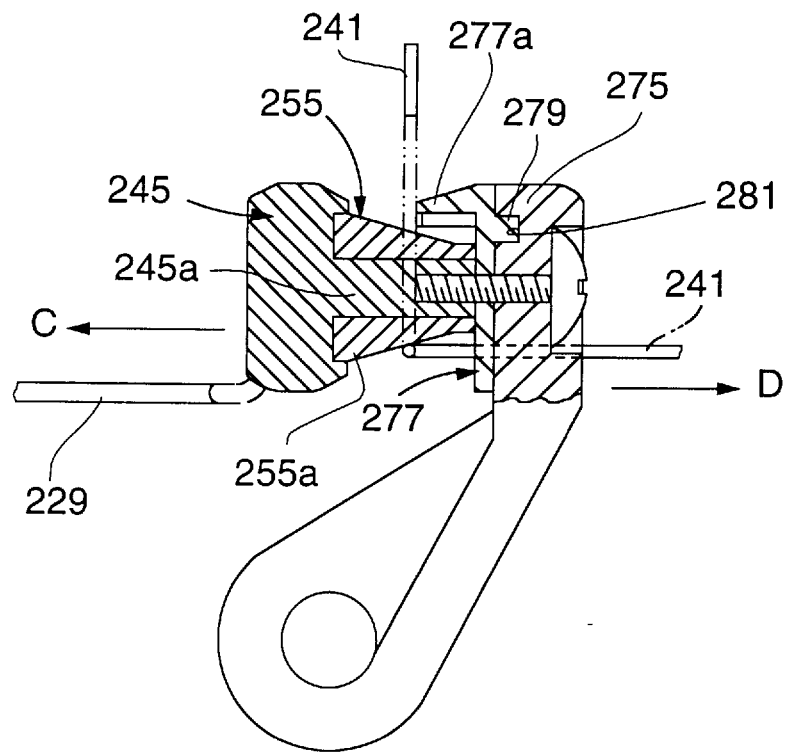
FIG. 32 is a cross-section view taken along the line 32—32 in FIG. 31.
Figure 33:
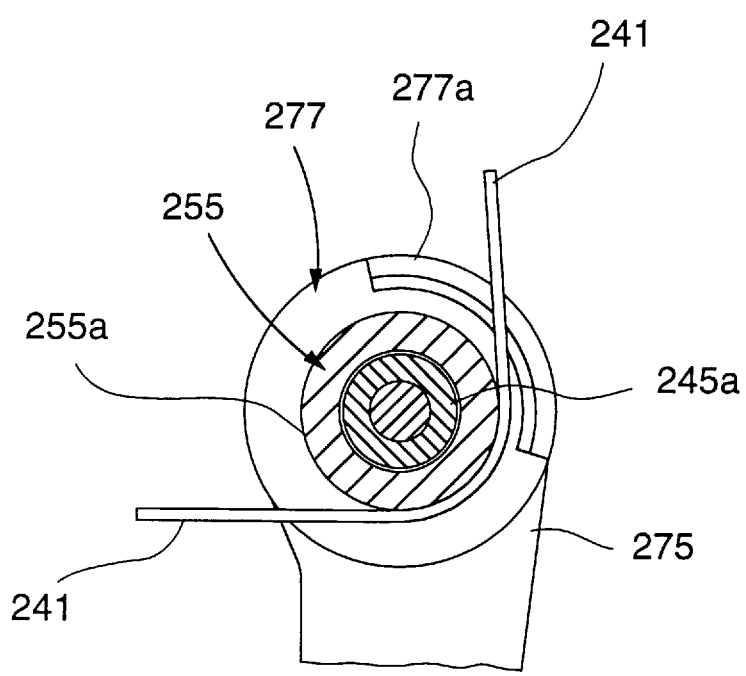
FIG. 33 is a cross-section view taken along the line 33—33 in FIG. 31.

FIGS. 31–33 show a spinning reel for fishing according to a tenth embodiment of the present invention. Elements of the tenth embodiment which are similar to those of the seventh embodiment are given the same designations and repetitive description thereof is omitted.

A bail arm 275 is pivotally mounted on the leading end of a bail support arm 227. A line roller 255 is rotatably supported on the shaft portion 245a of the line slider 245 secured to the bail arm 275. The diameter of the line roller 255 decreases from the line slider 245 toward the bail arm 275.

A guide piece 277 formed of ceramics or the like is secured to the bail arm 275 by the line slider 245. An appendage 279 provided on the guide piece 277 engages a recess 281 in the bail arm 275 to prevent relative rotation.

The end of the bail arm 275 and the guide piece 277 are congruent. An arc-shaped guide projection 277a extends integrally from a peripheral edge of the guide piece 277 toward the longitudinal midpoint of the line roller 255. During winding, the guide projection 277a contacts the fishline 241 to restrict shifting of the fishline 241 from a central region of the line roller 255 in the direction D.

Rotation of the rotor 223 is winding direction C intentionally twists the fishline 241 in the opposite direction to the line twists which occur during casting. Also during winding, the guide projection 277a contacts the fishline 241 to restrict shifting of the fishline 241 in the direction D.

As the line winding diameter of the fishline 241 on the spool 237 increases, the fishline 241 shifts further in the direction D. However, similar to the aforementioned embodiments of the present invention, the guide projection 277a restricts further shifting of the fishline 241 to prevent the fishline 241 from becoming tangled in the gap between the line roller 255 and the bail arm 275.

As in all embodiments of the present invention, the fishline 241 is intentionally twisted in the opposite direction to the line twists which occur during casting. Thus the line twists produced during winding are cancelled by the line twists which occur during casting. Consequently, the fishline 241 can be delivered from the spool in a straight manner, i.e. without twines.

Similar to the seventh embodiment, the tenth embodiment of the present invention not only prevents the fishline 241 from becoming tangled in a gap between the line roller 255 and bail arm 275 during winding, but also twists the fishline 241 in the opposite direction to the line twists which occur during casting. Thus, line twists are prevented from accumulating in the fishline 241, eliminating the possibility that the fishline 241 may be severed due to accumulation of line twists over a long time.

Figure 34:
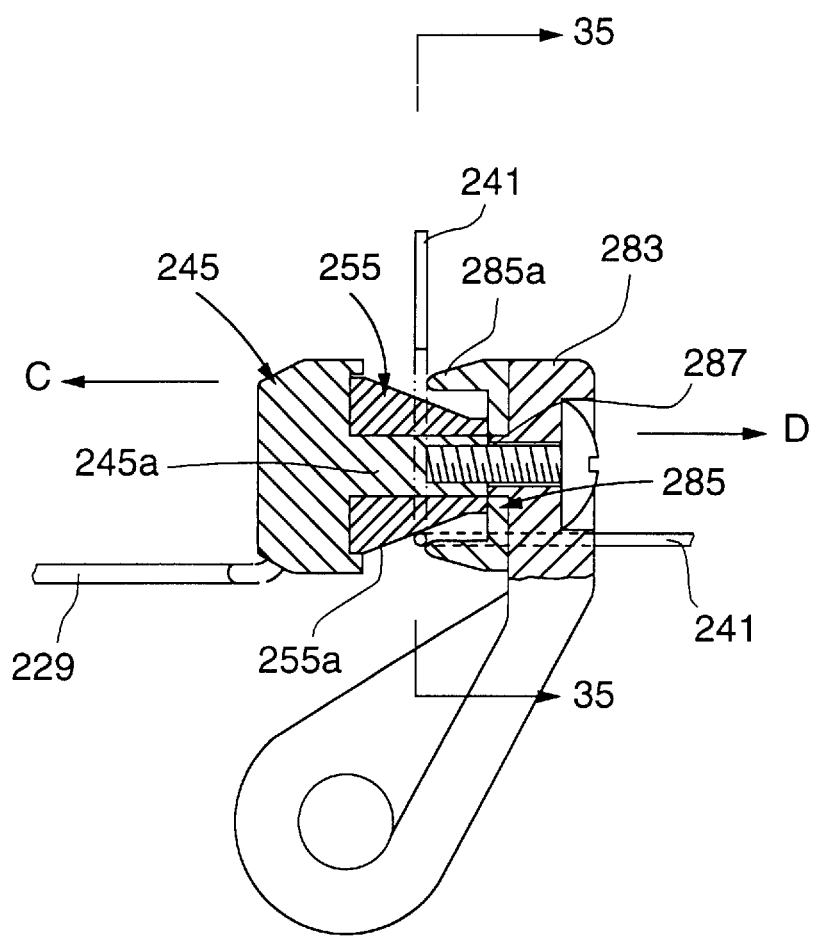
FIG. 34 is a cross-section view of the featured components of a spinning reel for fishing according to an eleventh embodiment of the present invention.
Figure 35:
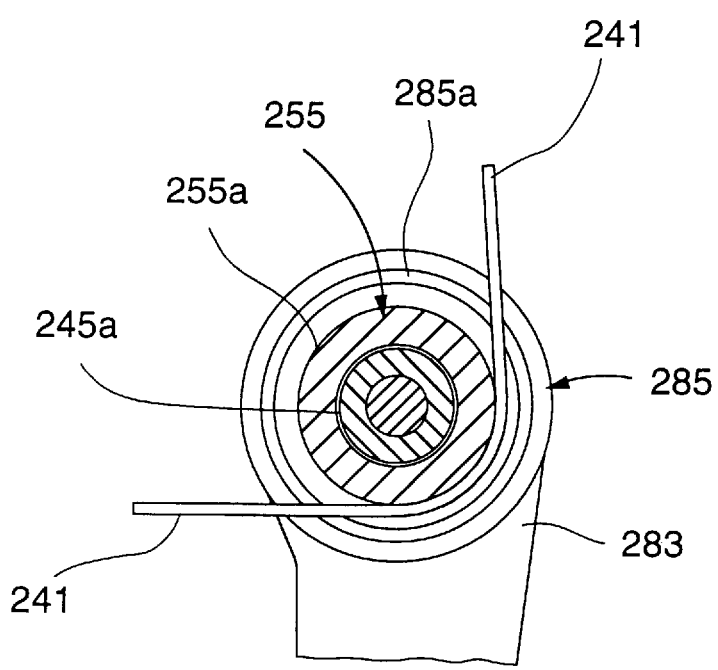
FIG. 35 is a cross-section view taken along the line 35—35 in FIG. 34.

FIGS. 34 and 35 show an eleventh embodiment of spinning reel for fishing according to the present invention. Similar to the description of the ninth embodiment, a guide piece 285 is supported on the bail arm 283 together with the line slider 245. However, the guide piece 285 of the eleventh embodiment is relatively rotatable with respect to the bail arm 283.

In particular, the bail arm 283 supports an annular ceramic guide piece 285 which, similar to the guide piece 271, includes a guide projection 285a extending toward the longitudinal midpoint of the line roller 255. The guide piece 285 is rotatably supported on a cylindrical support projection 287 extending from the bail arm 283. The cylindrical support projection 287 has the same diameter as the shaft portion 245a of the line slider 245. The line roller 255 is rotatably supported between the guide 285 and line slider 245 on the shaft portion 245a of the line slider 245.

Figure 36:
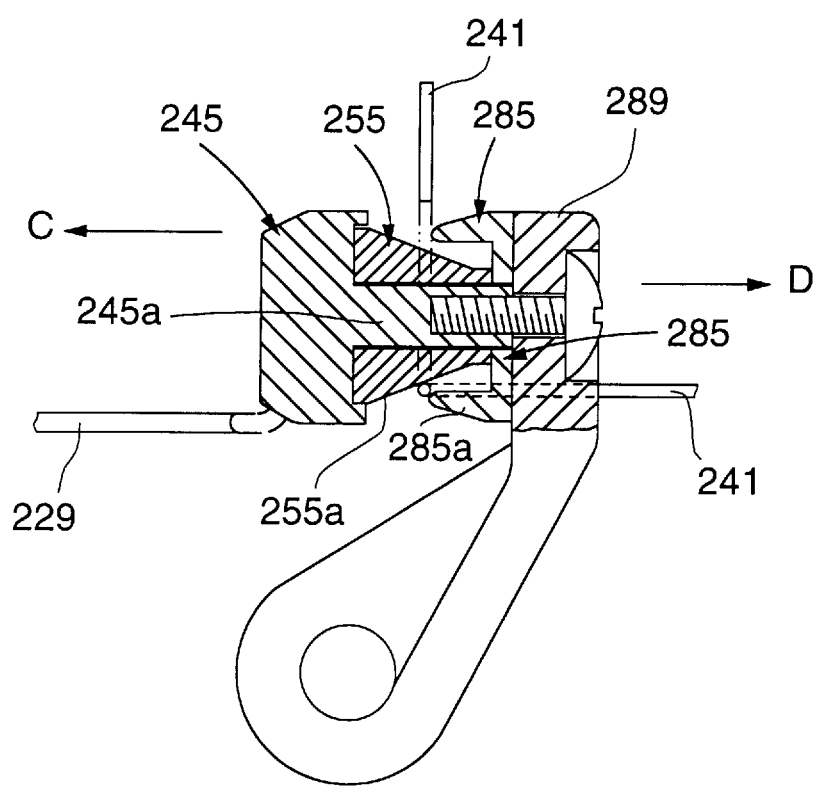
FIG. 36 is a cross-section view of the featured components of a spinning reel for fishing according to a twelfth embodiment of the present invention.

FIG. 36 shows a twelfth embodiment of a spinning reel for fishing. According to the twelfth embodiment, the cylindrical support projection 287 of the eleventh embodiment is eliminated. That is, the length of the shaft portion 245a of the line slider 245 extends the entire distance through the guide piece 285. The shaft portion 245a is secured to the bail arm 289, and the guide piece 285 is supported on the extended end portion of the shaft portion 245a for relative rotation with respect to the bail arm 289.

Again, according to the eleventh and twelfth embodiments, not only is the fishline 241 prevented from becoming tangled in a gap between the line roller 255 and bail arms 283,289 during winding, the fishline 241 is prevented from being severed due to the accumulation of line twists. Further, the guide piece 285 in contact with the fishline 241 is relatively rotatable with respect to the bail arms 283,289, independently from the line roller 255. Rotation of the guide piece 285 due to the contact with the fishline 241 during winding, causes the guide piece 285 to be rotated in the same direction as the line roller 255, but not necessarily synchronously.

Figure 37:
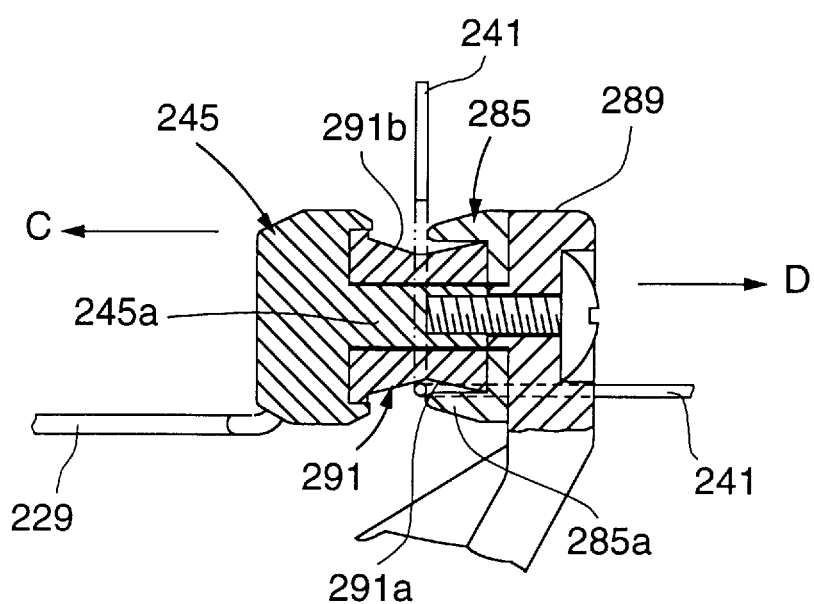
FIG. 37 is a cross-section view of the featured components of a spinning reel for fishing according to a thirteenth embodiment of the present invention.

The structure of the eleventh and twelfth embodiments makes it possible to guide the fishline 241 to the spool 237 without applying unreasonable resistance to the fishline 241 inasmuch as resistance between the guide piece 285 and the fishline 241 is reduced. An advantage of the eleventh and twelfth embodiments is the additional prevention of fishline twisting during casting FIG. 37 shows a spinning reel for fishing according to thirteenth embodiment of the present invention. Instead of the line roller 255 in the twelfth embodiment, the thirteenth embodiment uses a V-shaped line roller 291 which includes a valley portion 291a located slightly closer to the bail arm 289 with respect to the longitudinal midpoint of the line roller 291. A guide projection 285a provided on the guide piece 285 maintains the fishline 241 on a fishline guide portion 291b which extends from the valley portion 291a of the line roller 291 toward the line slider 245.

Figure 38:
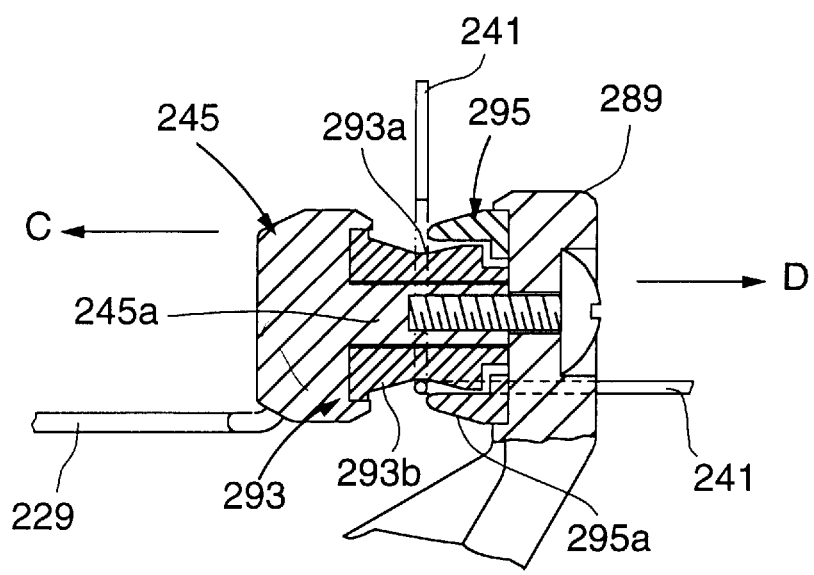
FIG. 38 is a cross-section view of the featured components of a spinning reel for fishing according to a fourteenth embodiment of the present invention.

FIG. 38 shows the featured components of a spinning reel for fishing according to fourteenth embodiment of the present invention. A V-shaped line roller 293 is rotatably supported on the shaft portion 245a of the line slider 245 and includes a valley portion 293a formed substantially in the central region of the line roller 293. An annular guide piece 295 is rotatably situated within a recess of the bail arm 289 and includes a guide projection 295a extending substantially to the valley portion 293a of the line roller 293. The guide piece 295 maintains the fishline 241 on the fishline guide portion 293b extending from the valley portion toward the line slider 245 during winding.

Figure 39:
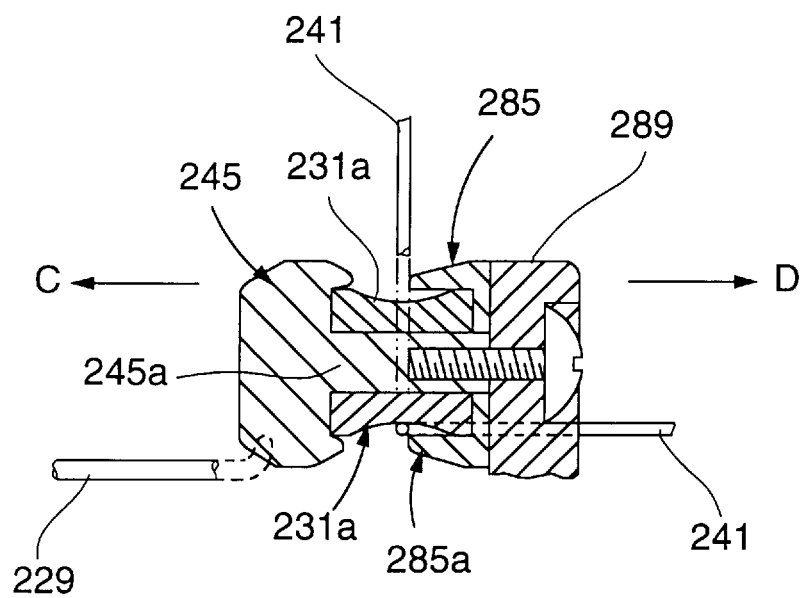
FIG. 39 is a cross-section view of the featured components of a spinning reel for fishing according to a fifteenth embodiment of the present invention.

FIG. 39 shows the featured components of a spinning reel for fishing according to fifteenth embodiment of the present invention. Instead of the line roller 255 shown in the twelfth embodiment, the drum-shaped line roller 231 shown in the fifteenth embodiment is rotatably supported on the shaft portion 245a of the line slider 245. The guide projection 285a of the rotatable guide piece 285 extends toward the longitudinal midpoint of the line roller 231 to maintain the fishline 241 between the longitudinal midpoint of the line roller 231 and the line slider 245.

The thirteenth through fifteenth embodiments of the present invention provide the same advantages as the twelfth embodiment.

Alternatively, the guide piece 285 in the thirteenth through fifteenth embodiments may also be non-rotatably fixed with respect to their respective bail arms, similar to the tenth embodiment. As in the previous embodiments, the fishline 241 is both prevented from becoming tangled at the axial end of the line roller, and accumulation of line twist is prevented.

Figure 40:
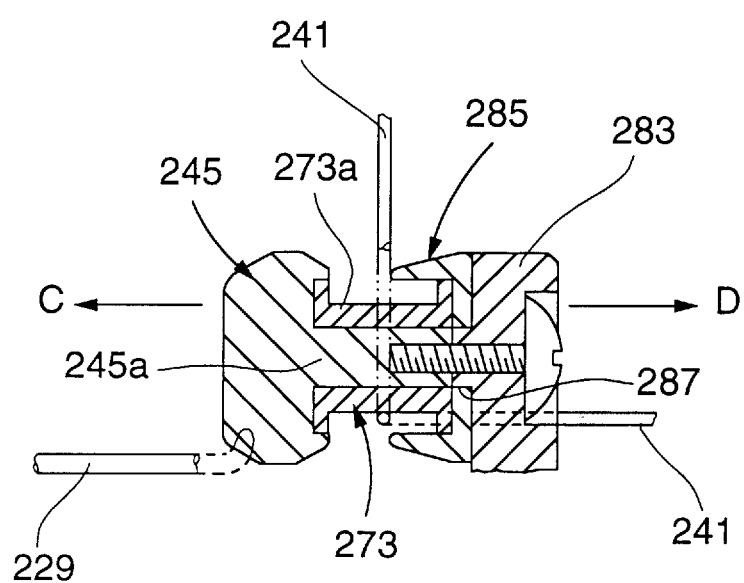
FIG. 40 is a cross-section view of the featured components of a spinning reel for fishing according to a sixteenth embodiment of the present invention.

FIG. 40 shows main portions of a spinning reel for fishing according to a sixteenth embodiment of the present invention. Instead of the line roller 231 in the fifteenth embodiment, a line roller 273 including a right cylindrical fishline guide portion 273a is rotatably supported on the shaft portion 245a of the line slider 245. According to the sixteenth embodiment, the fishline 241 is prevented from becoming tangled in a gap between the line roller 273 and bail arm 283 during winding.

In each of seventeenth through twenty-fourth embodiments, a line roller is rotatably supported by a ball bearing. Elements of these embodiments which are similar to one another are given the same designations and repetitive descriptions are omitted.

Figure 41:
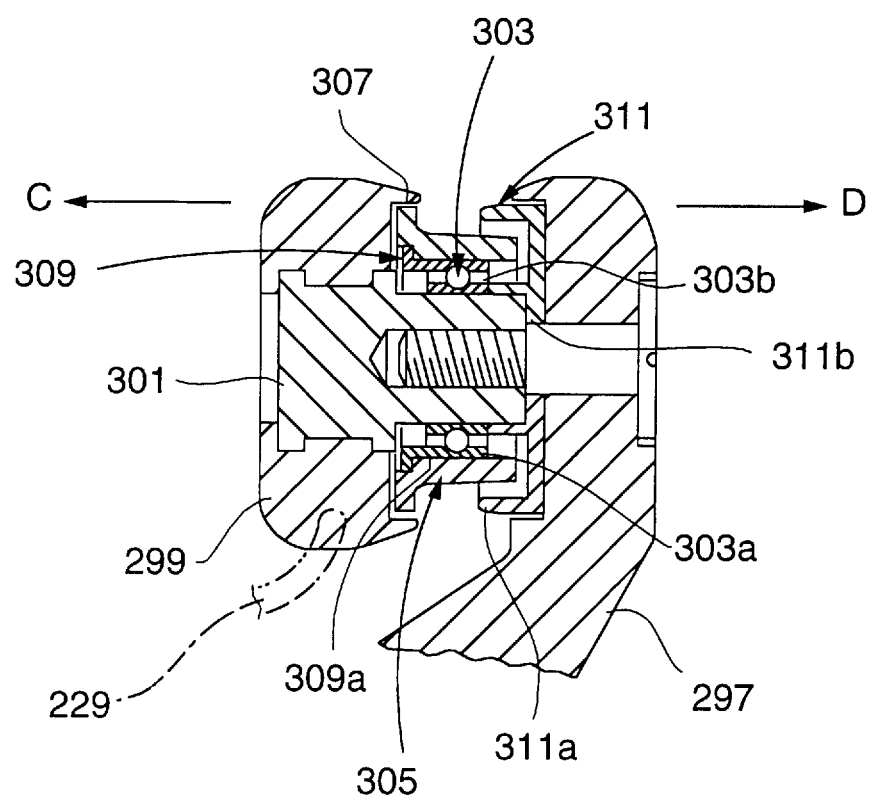
FIG. 41 is a cross-section view of the featured components of a spinning reel for fishing according to a seventeenth embodiment of the present invention.

FIG. 41 shows the featured components of a spinning reel for fishing according to seventeenth embodiment of the invention. A line slider 299 is fixed to a metal support shaft 301 and secured to a bail arm 297. A ball bearing 303 rotatably supports a line roller 305 on the support shaft between the bail arm 297 and the line slider 299.

The line roller 305 has a tapered shape such that the diameter increases in the fishline winding direction $\underline{C}$ of rotor rotation. A disk-shaped guide projection 307 is integrally formed at an axial end of the line roller 305 proximate to the line slider 299. The guide projection 307 restricts shifting of the fishline 241 in the direction $\underline{C}$ when the fishline 241 is played-out from the spool against the resistance of a drag mechanism during winding, thereby preventing the fishline 241 from becoming tangled between the line slider 299 and line roller 305.

A cylindrical securing collar 309 is secured to an interior periphery of the line roller 305 proximate the line slider 299. An end portion 309a of the securing collar 309 contacts the outer race 303a of the ball bearing 303 to restrict movement of the line roller 305 in a direction $\underline{D}$ during winding.

An annular guide piece 311 with a guide projection 311a extends coaxially toward the longitudinal midpoint of the line roller 305. The guide piece 311 and a support shaft 301 are secured to the bail arm 297. The end of the support shaft 301 proximate to the bail arm 297 is received in a cylindrical mounting portion 311b extending from the guide 311. The edge of the cylindrical mounting portion 311a contacts the inner race 303b of the ball bearing 303.

Turning handle 239 to rotate the rotor in the fishline winding direction C intentionally twists a fishline 241 in the opposite direction to line twists occurring during casting. During winding, the fishline 241 shifts in the direction D, however, the guide projection 311a contacts the fishline 241 to restrict shifting of the fishline 241.

As the line winding diameter of the fishline 241 around the spool 237 increases, the fishline 241 also tends to shift in the direction D. Again, contact between the guide projection 311a and the fishline 241 restricts shifting of the fishline 241 so as to maintain the fishline 241 in the central region of the line roller 305.

The end portion 309a of the securing collar 309 abuts against the outer race 303a of the ball bearing 303 to restrict the movement of the line roller 305 in the direction D during winding. Consequently, the line roller 305 is prevented from contacting the bail arm 297.

According to the seventeenth embodiment, the guide projection 311a of the guide piece 311 contacts the fishline 241 to restrict the movement of the fishline 241 in the direction D during winding. Concurrently, the fishline 241 is twisted in the opposite direction to line twists which occur during casting. Further, the annular guide projection 311a maintains the fishline 241 at substantially the central region of the line roller 305 regardless of the line winding diameter of the fishline 241 wound around the spool 237.

Moreover, inasmuch as the line roller 305 according to the seventeenth embodiment of the present invention is mounted on the support shaft 301 through the ball bearing 303, resistance to rotation of the line roller 305 is reduced.

Figure 42:
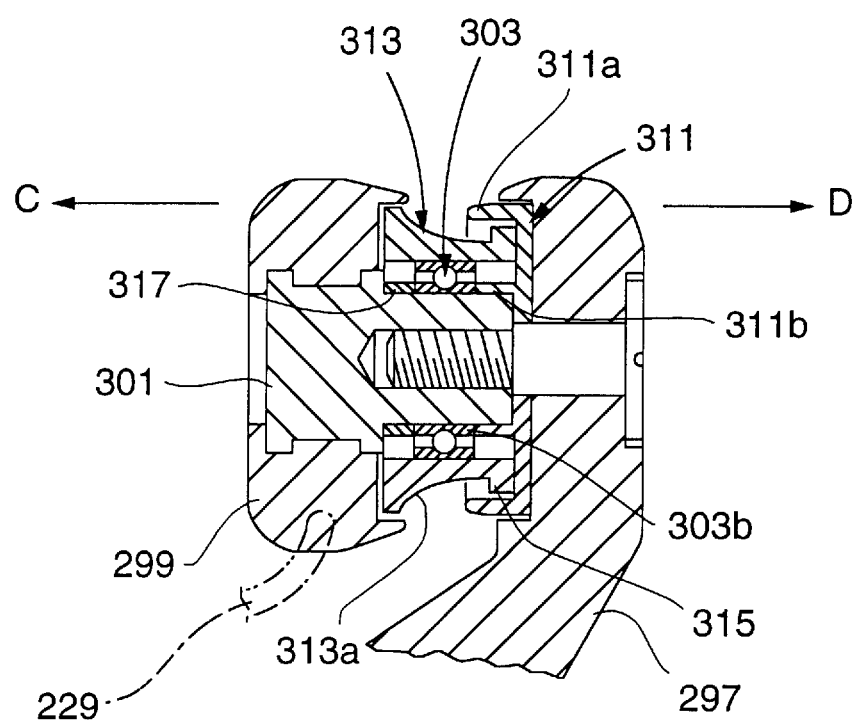
FIG. 42 is a cross-section view of the featured components of a spinning reel for fishing according to an eighteenth embodiment of the present invention.

FIG. 42 shows the featured components of a spinning reel for fishing according to an eighteenth embodiment of the present invention. Instead of the line roller 305 according to the seventeenth embodiment, a trumpet-shaped line roller 313 is rotatably supported by the ball bearing 303 on the support shaft 301. The line roller 313 includes a fishing guide portion 313a having a diameter which increases non-linearly in the fishline winding direction C of rotation of rotor 223. An integral annular flange 315 is formed on the axial end of the line roller 313 proximate to the bail arm 297.

A cylindrical member 317 is mounted on the support shaft 301. The cylindrical member 317 and the cylindrical mounting portion 311b of the guide piece 311 position the inner race 303b of the ball bearing 303.

Instead of fixing the securing collar 309 of the seventeenth embodiment to the line roller 313, the line roller 313 according to the eighteenth embodiment is movable in the directions C and D during fishline winding.

Figure 43:
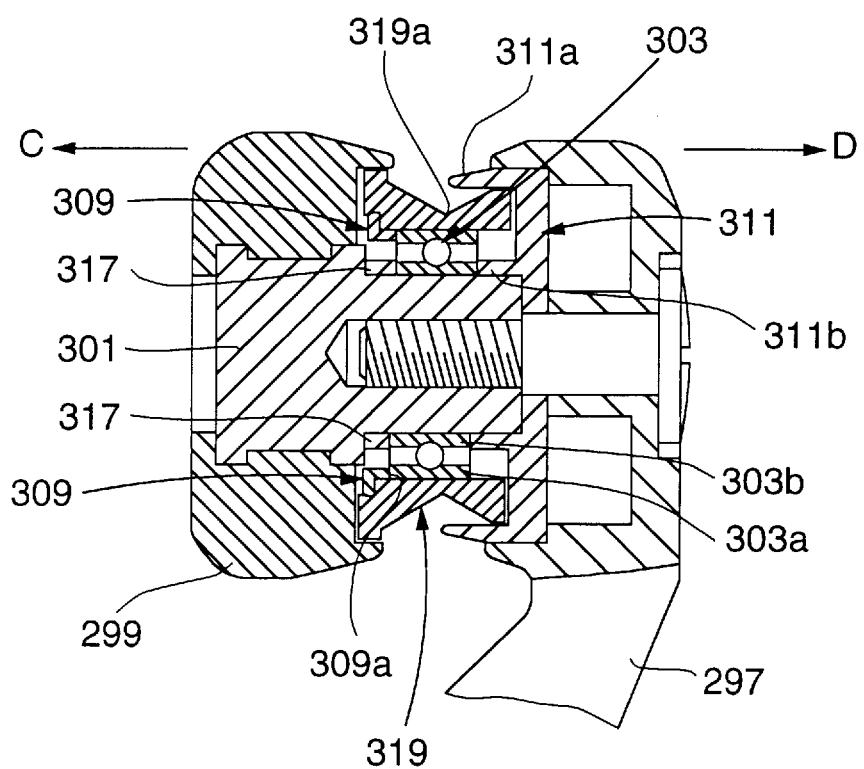
FIG. 43 is a cross-section view of the featured components of a spinning reel for fishing according to a nineteenth embodiment of the present invention.

FIG. 43 shows the featured components of a spinning reel for fishing according to a nineteenth embodiment of the present invention. The ball bearing 303 rotatably supports a V-shaped line roller 319, including a valley portion 319a located closer to the bail arm 297 with respect to the longitudinal midpoint of the line roller 319. The guide projection 311a of the guide piece 311 extends substantially to the valley portion 319a of the line roller 319. The remaining portions of the nineteenth embodiment are similar to those of the seventeenth and eighteenth embodiments.

Figure 44:
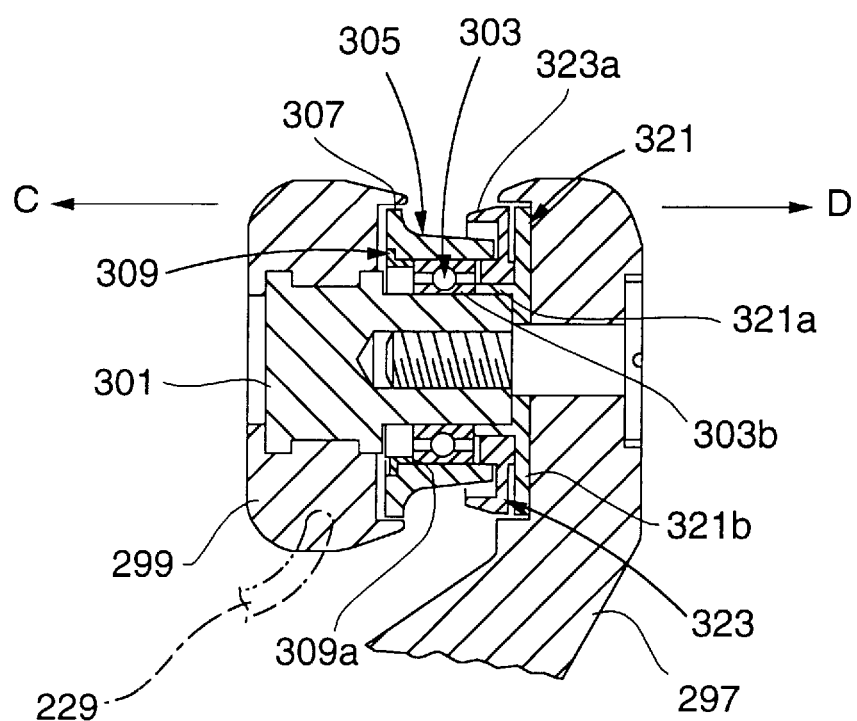
FIG. 44 is a cross-section view of the featured components of a spinning reel for fishing according to a twentieth embodiment of the present invention.

FIG. 44 shows the featured components of a spinning reel for fishing according to a twentieth embodiment of the invention. A cylindrical member 321 and the support shaft 301 are secured to the bail arm 297. The end portion of the support shaft 301 proximate to the bail arm 297 is received in the cylindrical mounting portion 321a of the cylindrical member 321, and the edge of the mounting cylindrical portion 321a contacts the inner race 303b of the ball bearing 303.

A guide projection 323a extends from an annular guide piece 323 toward the longitudinal midpoint of the line roller 305. The guide piece 323 is rotatably supported on the outer periphery of the cylindrical mounting portion 321a and is located between the line roller 305 and the flange 321b of the cylindrical member 321. The guide projection 323a contacts the fishline 241 to restrict the movement of the fishline 241 and maintain the fishline 241 in the central region of the line roller 305.

Turning the handle 239 to rotate the rotor 223 in the fishline winding direction C intentionally twists the fishline 241 in the opposite direction to line twists occurring during casting. The fishline 241 shifts in the direction D during winding, however, the guide projection 323a contacts the fishline 241 to restrict shifting of the fishline 241.

As the line winding diameter of the fishline 241 around the spool 237 increases, the fishline 241 also tends to shift in the direction D. Contact between the guide projection 323a and the fishline 241 restricts shifting of the fishline 241 so as to maintain the fishline 241 in the central region of the line roller 305.

As in the previous embodiments, the fishline 241 is intentionally twisted during winding in the opposite direction to line twists which occur during casting, regardless of line winding diameter variations. Similar to the seventeenth embodiment, the annular guide projection 323a of the twentieth embodiment also maintains the fishline 241 in the central region of the line roller 305, regardless of line winding diameter variations of the fishline 241 on the spool 237.

Inasmuch as the guide piece 323 according to the twentieth embodiment of the present invention is rotatably mounted on the bail arm 297 through the cylindrical member 321, resistance to rotation of the guide piece 323 due to contact with the fishline 241 during winding is reduced. Further, rotation of the guide piece 323 is in the same direction, but independent of rotation of the line roller 305.

Figure 45:
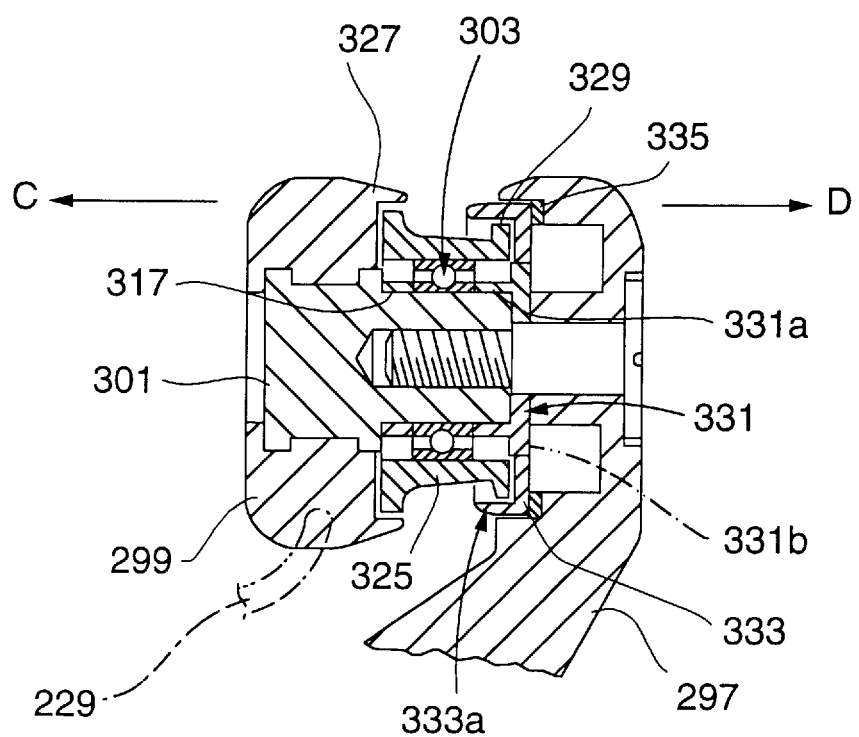
FIG. 45 is a cross-section view of the featured components of a spinning reel for fishing according to a twenty-first embodiment of the present invention.

FIG. 45 shows the featured components of a spinning reel for fishing according to a twenty-first embodiment of the present invention. A line roller 325 is rotatably supported by the ball bearing 303 on the support shaft 301. Line roller 325 has a tapered shape such that the diameter increases in the fishline winding direction C of rotation by the rotor 223. The line roller 325 has a disk-shaped guide portion 327 similar to the disk-shaped guide portion 307, and an integral annular flange 329 at the axial end of the line roller 325 proximate the bail arm 297, i.e. at the opposite axial end from the disk-shaped guide portion 327.

A cylindrical member 331 and the support shaft 301 are secured to the bail arm 297. The end of the support shaft 301 proximate the bail arm 297 is received in the cylindrical mounting portion 331a of the cylindrical member 331. The edge of the cylindrical mounting portion 331a contacts the inner race 303b of the ball bearing 303.

A coaxial annular guide piece 333 including a guide projection 333a extending toward the longitudinal midpoint of the line roller 325 is rotatably supported on the flange portion 331b of the cylindrical member 331. A resin washer 335 is in contact with and provided between the side surface of the bail arm 297 and the guide piece 333. During winding, the guide projection 333a contacts the fishline 241 to restrict the movement of the fishline 241 and thereby maintain the fishline 241 in the central region of the line roller 325.

Inasmuch as the securing collar 309 according to the eighteenth embodiment is not used in the twenty-first embodiment, the line roller 325 is able to move in the direction D during fishline winding. The ring-shaped resin washer 335 mounted between the bail arm 297 and the guide piece 333 reduces frictional resistance when the line roller 325 is relatively rotated in contact with the guide piece 333. In particular, the resin washer 335 enables the line roller 325 to be rotated more smoothly.

Figure 46:
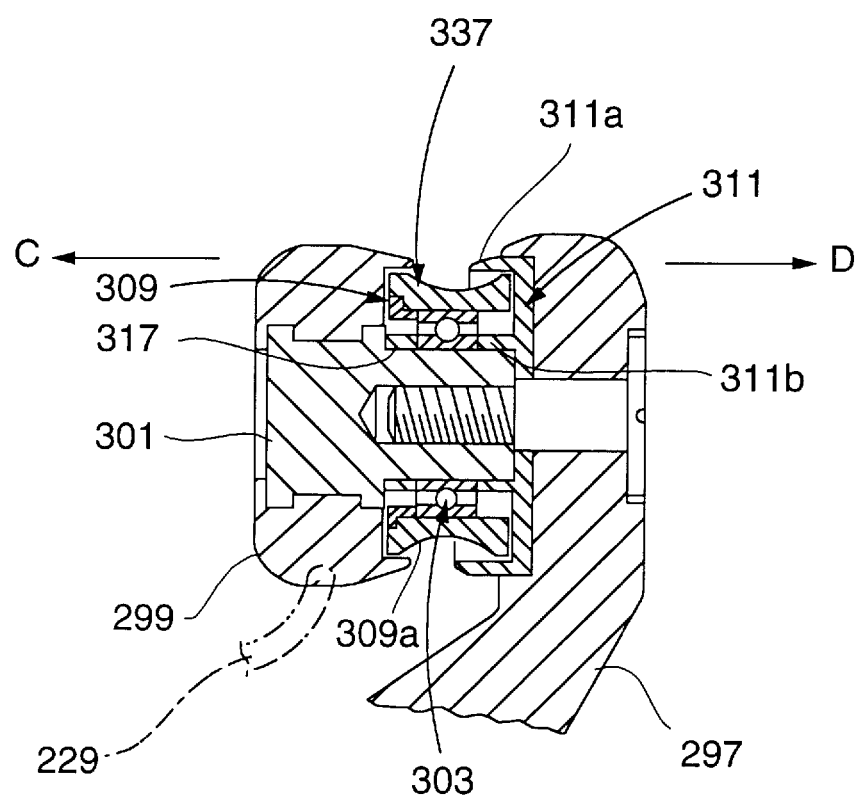
FIG. 46 is a cross-section view of the featured components of a spinning reel for fishing according to a twenty-second embodiment of the present invention.

FIG. 46 shows the featured components of a spinning reel for fishing according to a twenty-second embodiment of the present invention. Instead of the V-shaped line roller 319 of the nineteenth embodiment, a drum-shaped line roller 337 according to the twenty-second embodiment is rotatably supported on the support shaft 301 by the ball bearing 303. As before, the guide projection 311a of the guide piece 311 extends substantially to the longitudinal midpoint of the line roller 337. All other elements of the twenty-second embodiment are similar to those of the nineteenth embodiment and are given the same designations and repetitive description thereof is omitted.

The guide projection 311a according to the twenty-second embodiment positions fishline 241 closer to the line slider 299 with respect to the longitudinal midpoint of the line roller 337. Thus, the fishline 241 is twisted in the opposite direction to line twists which occur during casting, regardless of variations in the line winding diameter. Specifically, the annular guide piece 311 maintains the fishline 241 closer to the line slider 299 with respect to the longitudinal midpoint of the line roller 337 regardless of variations in the line winding diameter.

Figure 47:
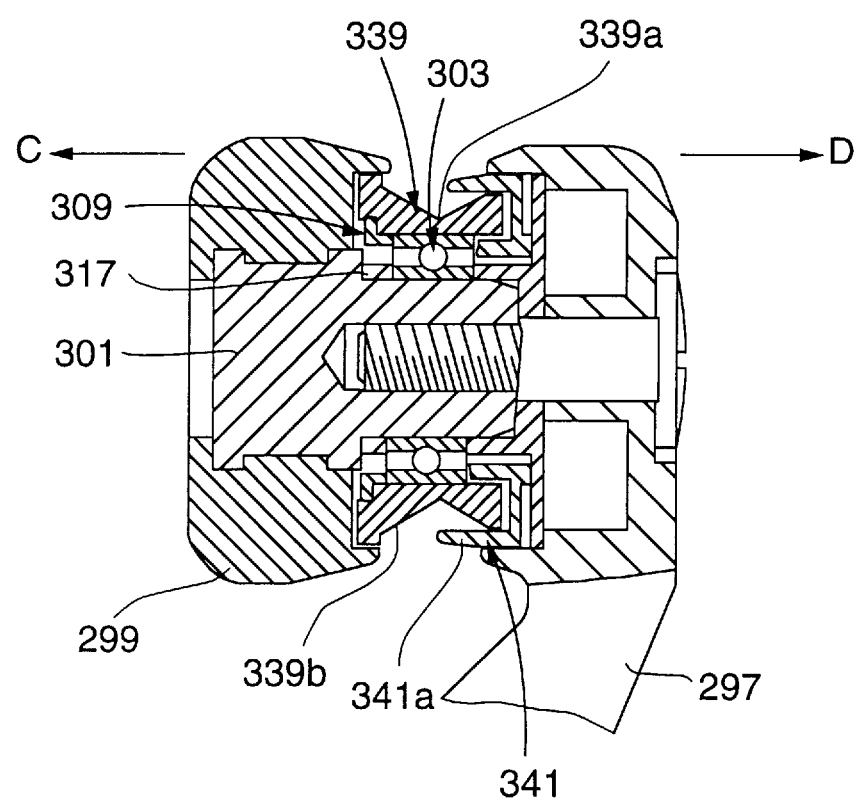
FIG. 47 is a cross-section view of the featured components of a spinning reel for fishing according to a twenty-third embodiment of the present invention.

FIG. 47 shows the featured components of a spinning reel for fishing according to a twenty-third embodiment of the present invention. A V-shaped line roller 339 includes a valley portion 339a located closer to the bail arm 297 with respect to the longitudinal midpoint of the line roller 339. An annular guide piece 341 including a guide projection 341a extending substantially to the valley portion 339a of the line roller 339 is rotatably supported on the bail arm 297. The guide projection 341a contacts the fishline 241 during winding to maintain the fishline 241 in a fishline guide portion 339b of the line roller 339 extending from the valley portion 339a toward the line slider 299. All other elements of the twenty-third embodiment being similar to those of previous embodiments, and being given the same designations, repetitive description thereof are omitted.

As in the aforementioned embodiments, the guide piece 341 of the twenty-third embodiment prevents the fishline 241 from becoming tangled in a gap between the line roller 339 and bail arm 297 during winding. Concurrently, the fishline 241 is intentionally twisted in the opposite direction to line twists which occur during casting, thereby preventing the accumulation of line twists in the fishline 241.

Inasmuch as the guide piece 341 is rotatable with respect to the bail arm 297, resistance to guiding the fishline 241 onto the spool 237 is reduced, further preventing the accumulation of line twists in the fishline 241. Also, since the ball bearing 303 rotatably supports the line roller 339 on the support shaft 301, resistance to rotation of the line roller 339 is reduced.

Figure 48:
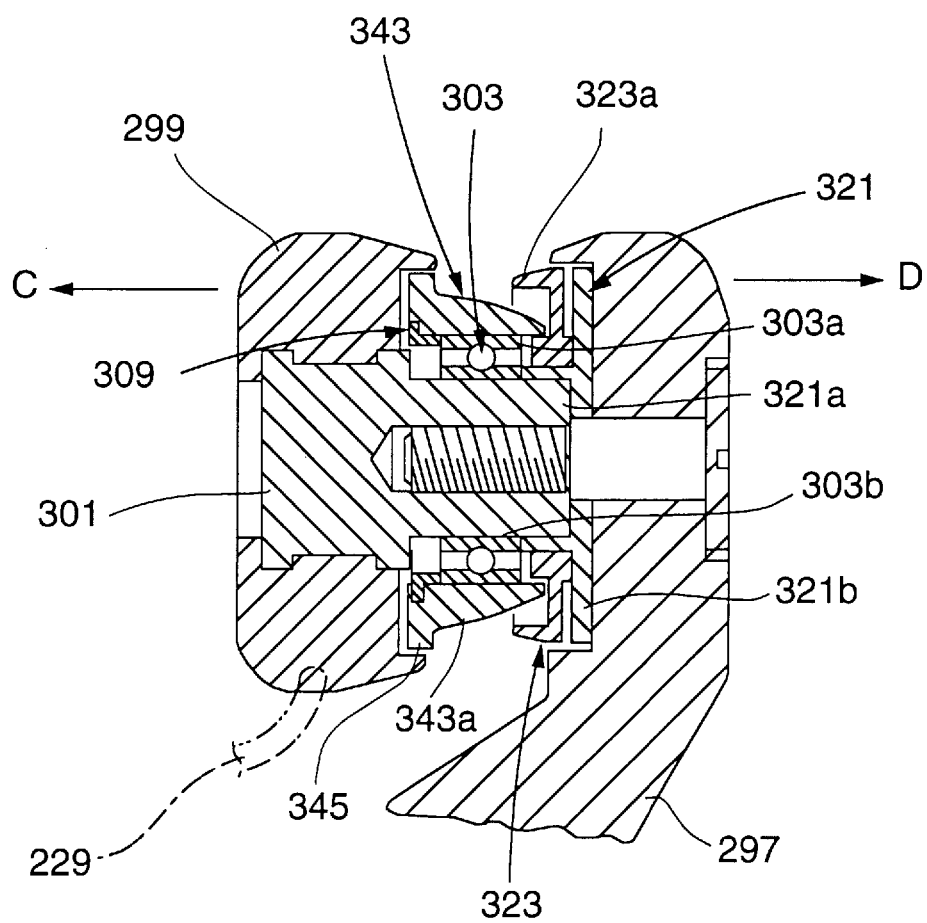
FIG. 48 is a cross-section view of the featured components of a spinning reel for fishing according to a twenty-fourth embodiment of the present invention.
Figure 49:
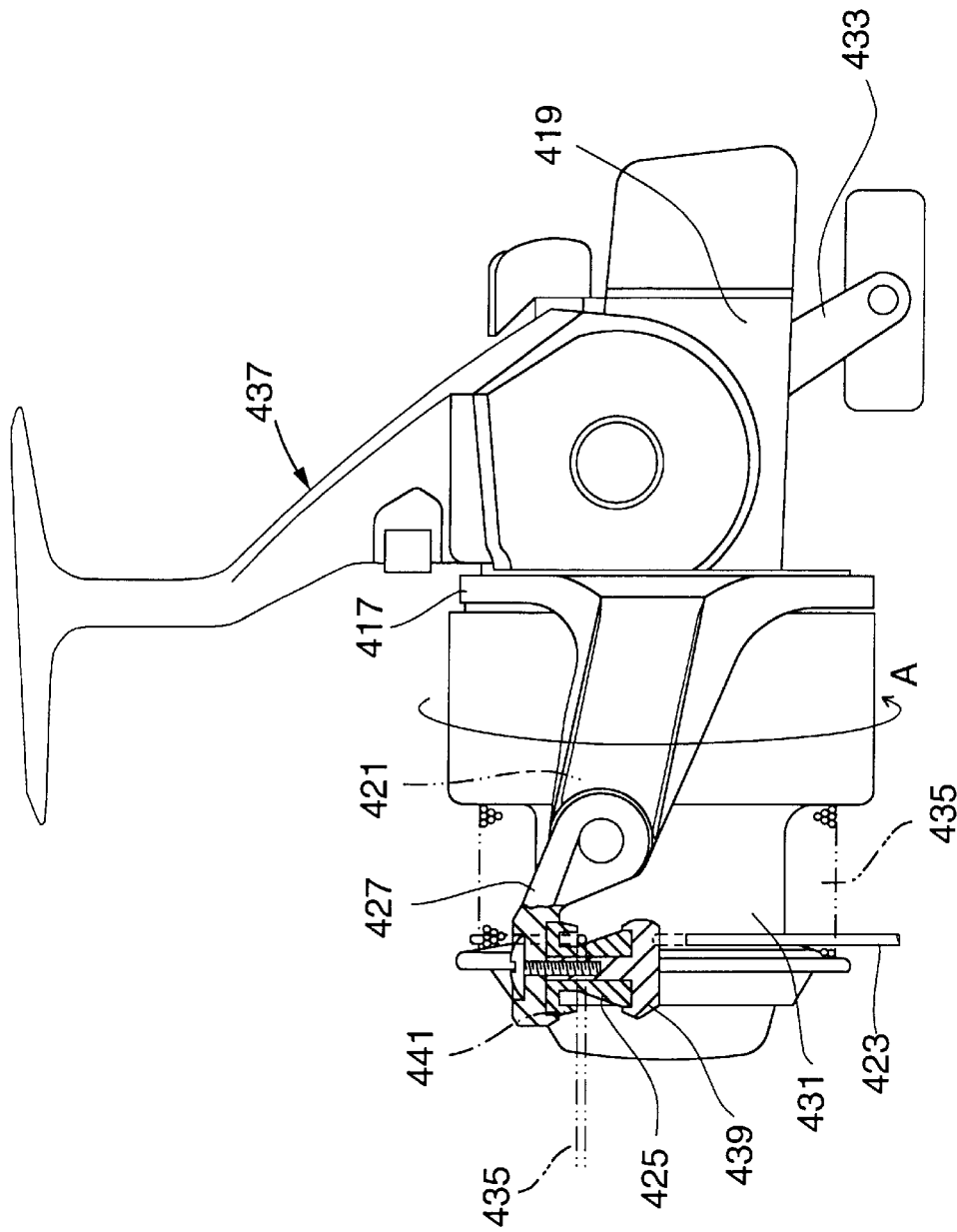
FIG. 49 is a front elevation view of a spinning reel for fishing according to a twenty-fifth embodiment of the present invention.

FIG. 48 shows the featured components of a spinning reel for fishing according to a twenty-fourth embodiment of the present invention. Instead of the line roller 305 according to the twentieth embodiment, the diameter of a line roller 343 increases in the direction from the bail arm 297 toward the line slider 299. The ball bearing 303 rotatably supports a convex fishline guide portion 343a of the line roller 343 on a support shaft 313. An integral disk-shaped guide 345 is formed at the axial end of the line roller 343 proximate to the line slider 299. The twenty-fourth embodiment, like the previous embodiments, similarly achieves the objects of the present invention.

The first through twenty-fourth embodiments of the present invention are described in the context of spinning reels for fishing of the type that include a bail arm as a support member for the line roller. Additionally, there are present many spinning reels for fishing which have no bail arm. Instead, a support member equivalent to the above-mentioned bail arm is provided on the rotor, and the line roller is supported by the support member. The present invention is also applicable to spinning reels for fishing which have a support member rather than a bail arm.

Further, the first through twenty-fourth embodiments of the present invention are directed to spinning reels for fishing in which a line slider rotatably supports the line roller on the bail arm. Alternatively, the present invention is also applicable to spinning reels for fishing in which the line roller is supported directly on the bail arm.

Figure 50:
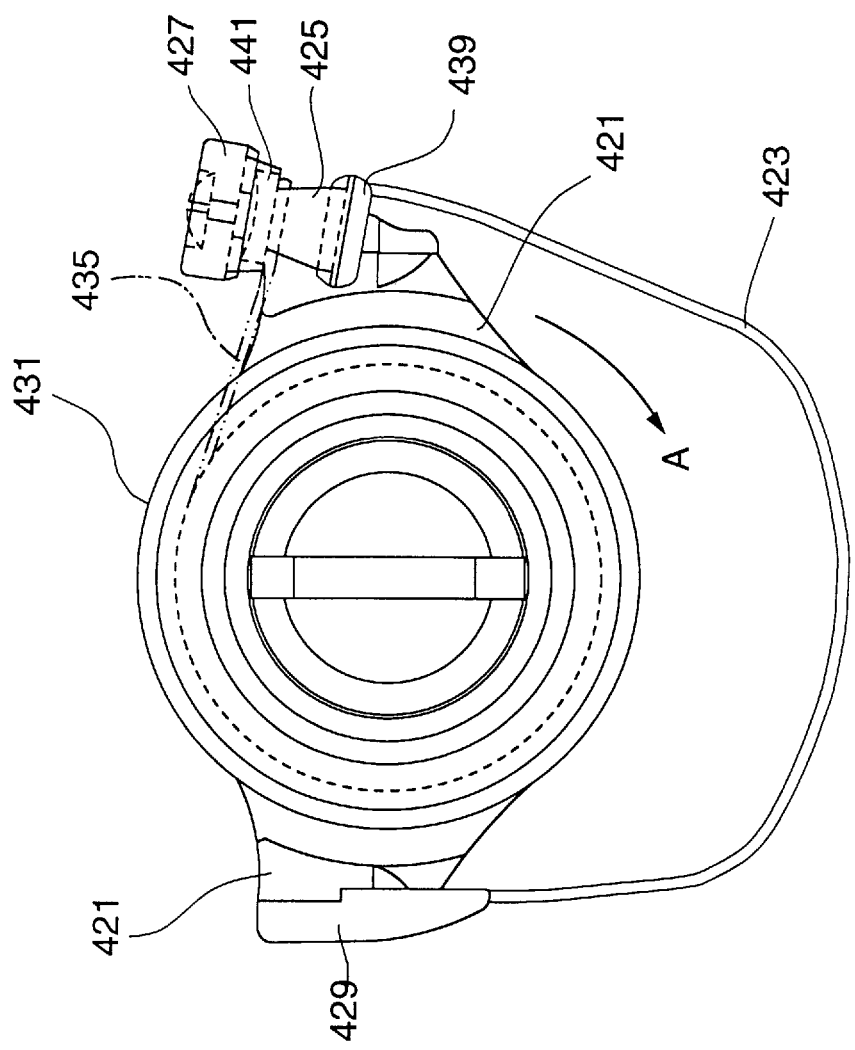
FIG. 50 is a left-side elevation view of the spinning reel for fishing shown in FIG. 49.

FIGS. 49 to 52 show a spinning reel for fishing according to a twenty-fifth embodiment of the present invention. A rotor 417 is rotatably supported on a reel main body 419 and includes a pair of integral bail support arms 421. As shown in FIG. 50, one end of a semi-annular bail 423 is mounted on one of the bail support arms 421 by a bail arm 427 with a line roller 425, and the other end of the bail 423 is mounted on the other bail support arm 421 via a bail holder 429. Consequently, the bail 423 is freely reversible between a fishline winding side of the rotor 417 and a fishline play-out side of the rotor 417.

A spool 431 is arranged coaxially with respect to the rotor 417 and is supported by a spool shaft (not shown) mounted on the reel main body 419 for relative reciprocal movement with respect thereto. A fishline 435 is wound onto the spool 431 by positioning the bail 423 on the fishline winding side of the rotor 417, and turning a handle 433 to concurrently rotate the rotor 417 (in the fishline winding direction A shown in FIGS. 49 and 50) and reciprocate the spool 431.

Figure 51:
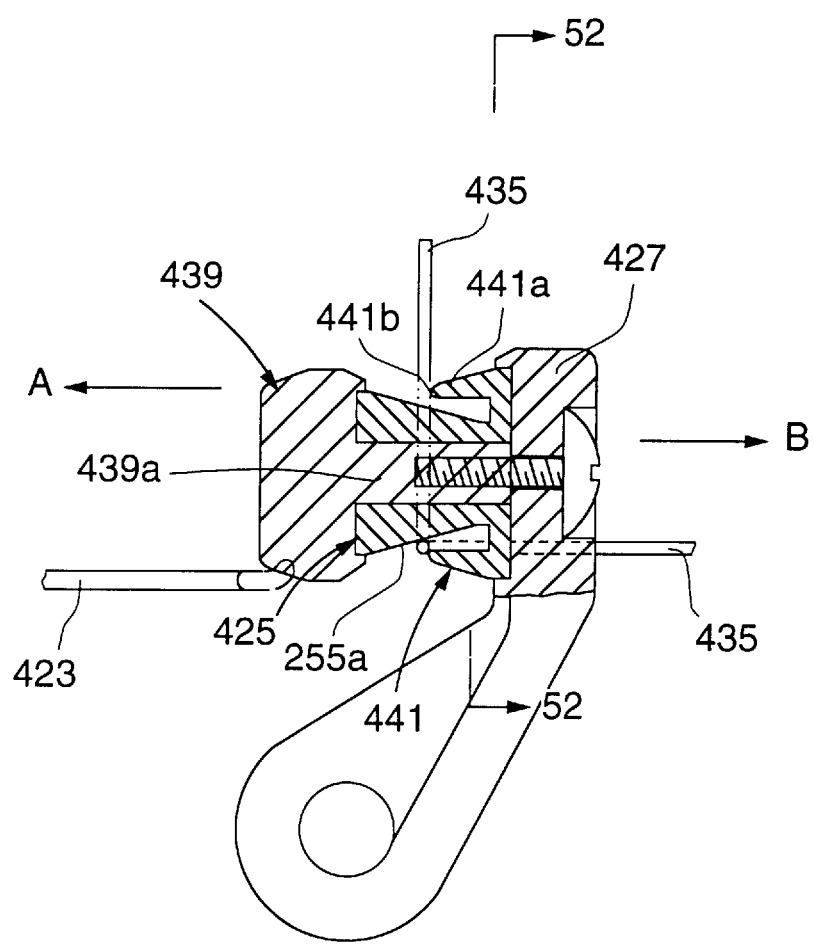
FIG. 51 is a cross-section view of the featured components of the spinning reel for fishing shown in FIG. 49.
Figure 52:
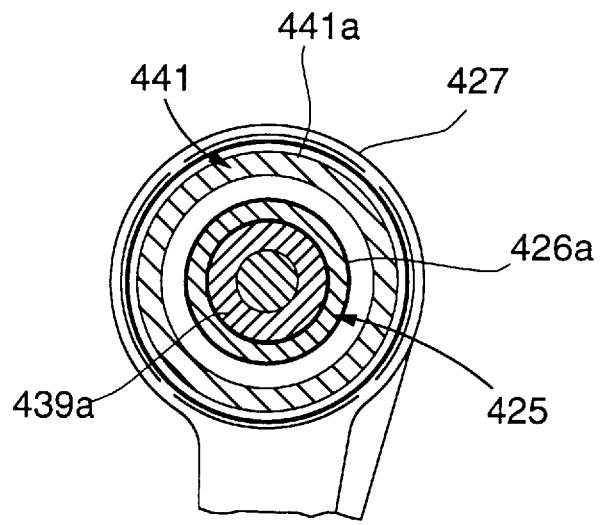
FIG. 52 is a cross-section view taken along the line 52—52 of FIG. 51.

FIGS. 51 and 52 show cross-section views of the line roller 425 supported by the bail arm 427. A substantially T-shaped line slider 439 includes a shaft portion 439a secured to the bail arm 427. The line roller 425, which is rotatably supported on the shaft portion 439a, includes a tapered fishline guide portion 425a extending between two opposite axial ends of the line roller 425. The diameter of the fishline guide portion 425a increases in a direction from the bail arm 427 toward the line slider 439, i.e. in the fishline winding direction of rotation by the rotor 417.

An integral annular guide projection 441 on the axial end portion of the line roller 425 proximate to the bail arm 427 includes a guide 441a extending toward the longitudinal midpoint of the line roller 425. The edge 441a of the guide projection 441a contacts the fishline 435 during winding to restrict movement of the fishline 435, i.e. to maintain the fishline 435 substantially at the central region of the line roller 425.

As described above, the line roller 425 is tapered such that the diameter increases in the fishline winding direction of rotation by the rotor 417. Preferably, the taper angle of the line roller 425 is within the range of 1° to 12°.

Generally, the line roller 425 is constructed from various kinds of hard material including ceramics, copper alloy or the like which have received a hard plating treatment, or other commonly known materials for line rollers.

Turning the handle 433 rotates the rotor 417 in the fishline winding direction $\underline{A}$ of rotation which causes the fishline 435 being guided by the line roller 425 to shift in the direction $\underline{B}$ (i.e. in the opposite direction to the fishline winding direction). However, the edge 441a of the guide projection 441a contacts the fishline 435 to restrict shifting and maintain the fishline 435 at substantially the central region of the line roller 425.

An increase in the line winding diameter on the spool 431 also causes the fishline 435 in contact with the fishline guide portion 425a to shift in the direction $\underline{B}$ toward a junction 425b between the fishline guide portion 425a and the guide projection 441. Again, the edge 441b of the guide projection piece 441a contacts the fishline 435 to restrict such shifting of the fishline 435, thereby maintaining the fishline 435 at substantially the central region of the line roller 425.

As described previously, inasmuch as the line roller 425 has a tapered shape wherein the diameter increases in the fishline winding rotation direction, friction between the line roller 425 and the fishline 435 increases as diameter of the line roller 425 increases. Consequently, the fishline 435 is intentionally twisted in the opposite direction to line twists which occur during casting. The line twists on the fishline 435 produced during winding and the line twists occurring during casting mutually cancel, thereby eliminating spiral delivery of the fishline 435 from the spool 431 during casting.

According to the twenty-fifth embodiment, the guide 441a restricts movement of the fishline 435 in the direction $\underline{B}$ during winding, thereby maintaining the fishline 435 at substantially the central region of the line roller 425, regardless of variations in the line winding diameter of the fishline 435. Further, the twenty-fifth embodiment eliminates the potential that the fishline 435 may become tangled between the line roller 425 and bail arm 427, as well as reducing resistance due to contact by the fishline 435 with the bail arm 427.

Inasmuch as the size of the bail arm 427 according to the twenty-fifth embodiment is minimized, the weight of the bail arm 427 is not centered forward of the spinning reel, and the dynamic balance of the rotor 417 is not adversely affected by the bail arm 427. Additionally, winding the fishline 435 twists the fishline 435 in the opposite direction to line twists which occur during casting, thereby preventing the accumulation of line twists caused by repeated winding and playing-out in conventional spinning reels. Consequently, the present invention prevents the accumulation of twists from breaking the fishline 435 over long periods of use.

Figure 53:
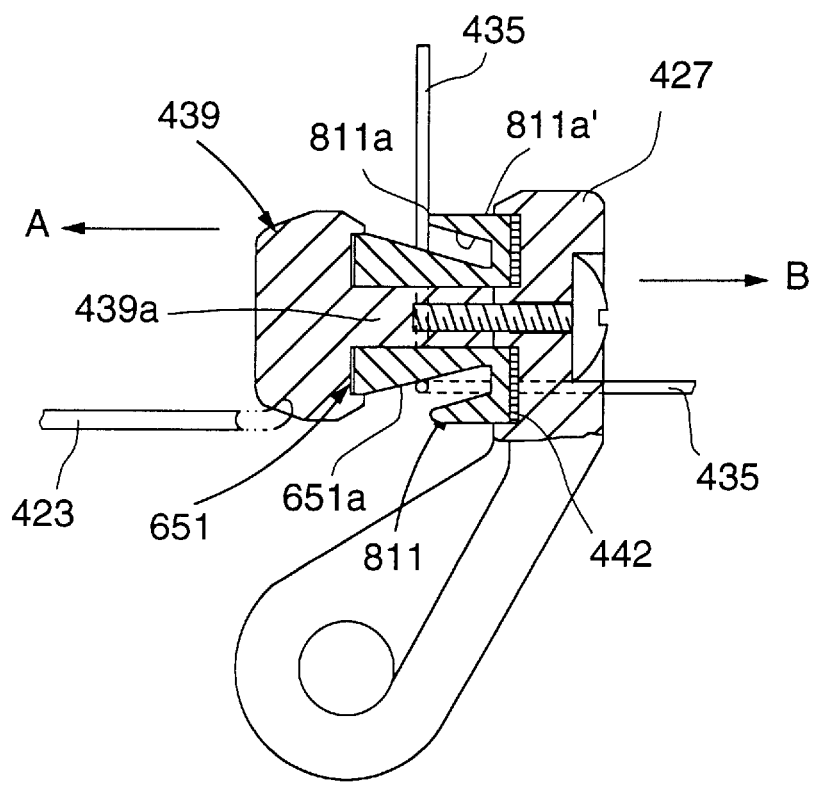
FIG. 53 is a cross-section view of the featured components of a spinning reel for fishing according to a twenty-sixth embodiment of the present invention.

FIG. 53 shows the featured components of a spinning reel for fishing according to a twenty-sixth embodiment of the present invention. Similar to the twenty-fifth embodiment, the diameter of a tapered line roller 651 increases in the fishline winding direction $\underline{A}$ of rotation by the rotor 417. The line roller 651 is rotatably supported on the shaft portion 439a of the line slider 439. The line roller 651 includes an integral annular guide projection 811 at the axial end proximate to the bail arm 427. The guide projection 811 has a guide 811a extending toward the longitudinal midpoint of the line roller 651, and a tapered inner periphery 811a' of the guide projection 811 confronting the fishline guide portion 651a of the line roller 651.

A ring-shaped resin washer 442 between the line roller 651 and the bail arm 427 reduces frictional resistance to rotation of the line roller 651.

Again, the twenty-sixth embodiment achieves the aforementioned objects of the present invention. Moreover, if the taper angle of the inner periphery 811a' is at least as great as the taper angle of the line roller 651, the line roller 651 is easier to manufacture and machine.

The resin washer 442 reduces frictional resistance during the rotation of the line roller 651, thereby contributing to the smooth rotation of the line roller 651.

Figure 54:
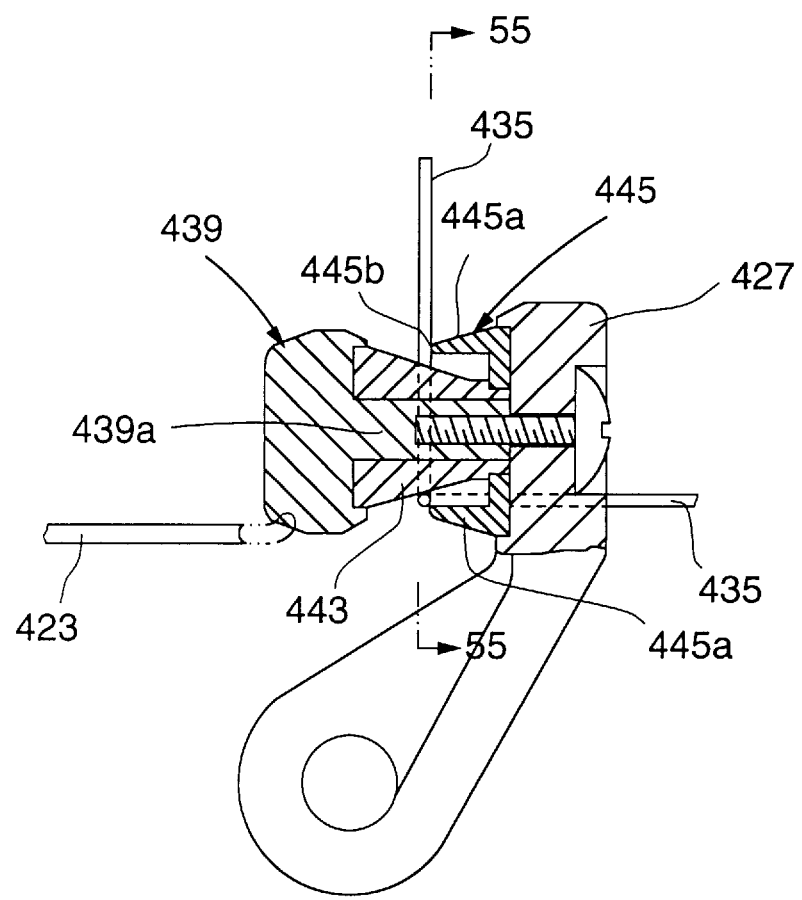
FIG. 54 is a cross-section view of the featured components of a spinning reel for fishing according to a twenty-seventh embodiment of the present invention.
Figure 55:
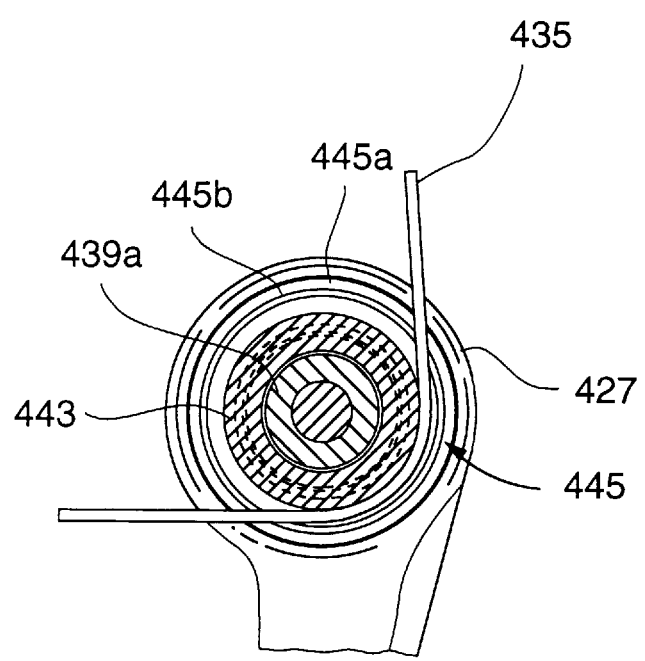
FIG. 55 is a cross-section view taken along the line 55—55 of FIG. 54.

FIGS. 54 and 55 show the featured components of a spinning reel for fishing according to a twenty-seventh embodiment of the present invention. In contrast to the twenty-fifth embodiment wherein the annular guide portion 441 is integral with the axial end of the line roller 425, an annular guide 445 of the twenty-seventh embodiment is separate from the axial end of the line roller 443. According to the twenty-seventh embodiment, a tapered line roller 443, having an increasing diameter in the fishline winding direction $\underline{A}$ of rotation by the rotor 417, is rotatably supported on the shaft portion 439a of the line slider 439. A separate annular guide piece 445, including a guide projection 445a extending toward the longitudinal midpoint of the line roller 443, is fixed to the axial end of the line roller 443 proximate to the bail arm 427 and maintains the fishline 435 at substantially the central region of the line roller 443.

Similarly to the line roller 425 of the twenty-fifth embodiment, the line roller 443 according to the twenty-seventh embodiment is also a hard material such as ceramic or copper alloy receiving a hard plating treatment. The guide piece 445 may be constructed of various hard materials such as ceramics or copper alloy which receives a hard plating treatment, aluminum which receives either a hard Alumirite treatment or a hard plating treatment, stainless steel which receives an ion plating treatment, or the like. However, the material of the guide piece 445 is not limited to these materials.

Figure 56:
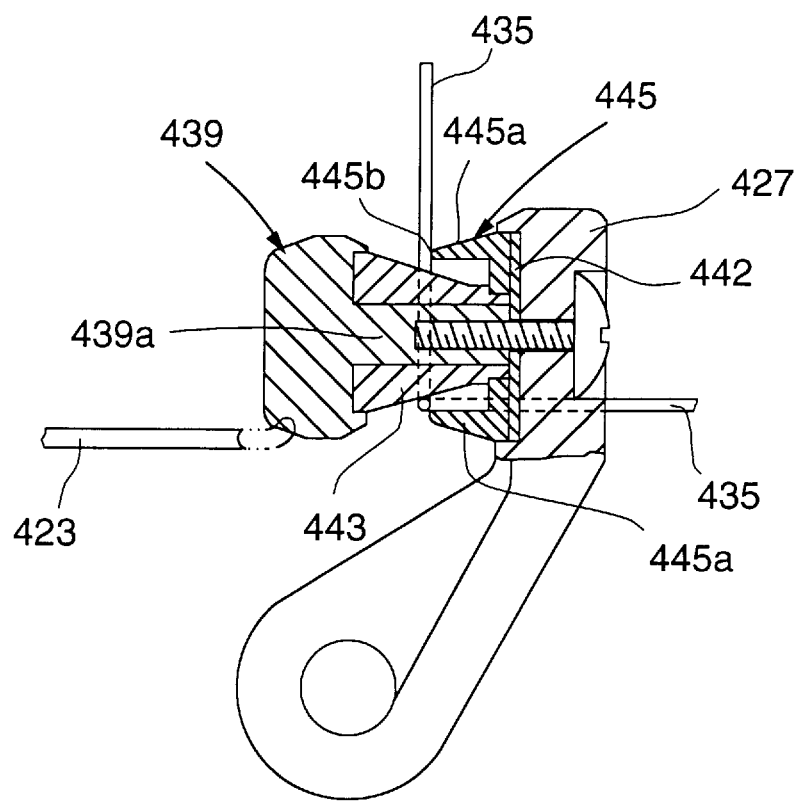
FIG. 56 is a cross-section view of the featured components of a spinning reel for fishing according to a twenty-eighth embodiment of the present invention.

FIG. 56 shows the featured components of a spinning reel for fishing according to a twenty-eighth embodiment of the present invention. The annular guide piece 445 in the twenty-seventh embodiment is formed separately and then fixed to the axial end of the line roller 443. The guide piece 445 in the twenty-eighth embodiment has the same shape, however the guide piece 445 is rotatably supported on the axial end of the end of the line roller 443 proximate to the bail arm 427. A resin washer 442 is interposed between the guide piece 445 and bail arm 427 to reduce frictional resistance to rotation of the guide piece 445 and line roller 443.

Inasmuch as the line roller 443 and the guide piece 445 are separate and can be rotated independently in the same direction as the line roller 443 during winding, the fishline 435 can be guided to the spool 431 with minimal resistance. Consequently, line twists occurring during casting are reduced.

Also, the interposition of the resin washer 442 enables the guide piece 445 and line roller 443 to be rotated with reduced friction as compared to the twenty-seventy embodiment.

Figure 57:
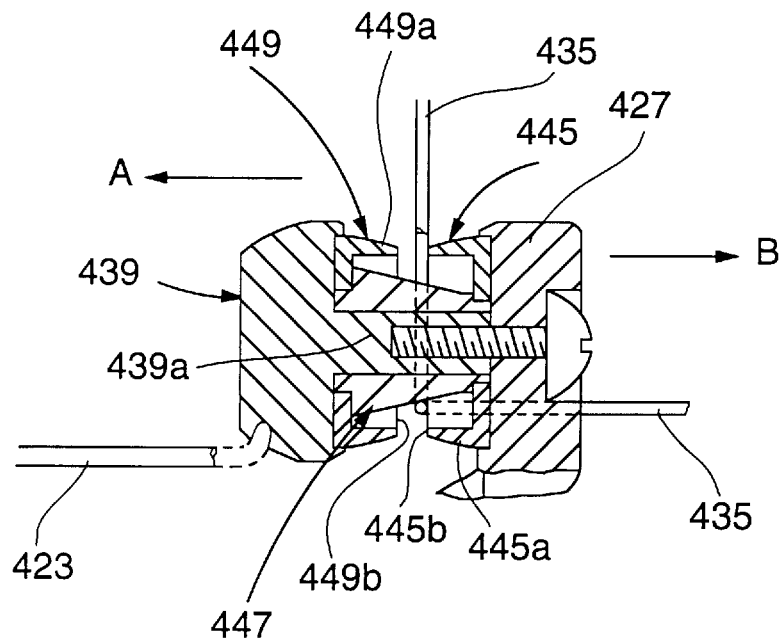
FIG. 57 is a cross-section view of the featured components of a spinning reel for fishing according to a twenty-ninth embodiment of the present invention.

FIG. 57 shows the featured components of a spinning reel for fishing according to a twenty-ninth embodiment of the present invention. The diameter of a tapered line roller 447, which increases in the fishline winding direction $\underline{A}$ of rotation by the rotor 417, is rotatably supported on the shaft portion 439a of the line slider 439. A separate annular guide piece 445 is fixed to the axial end of the line roller 447 proximate to the bail arm 427, and a separate annular guide piece 449 including a guide projection 449a extending toward the midpoint of the line roller 447 is fixed to the opposite axial end of the line roller 447 proximate to the line slider 439.

As in the previous embodiments, the edge 445b of the guide projection 445a contacts the fishline 435 to restrict the movement of the fishline 435 in the direction B to maintain the fishline 435 at substantially the central region of the line roller 447.

The guide projection 449a restricts shifting of the fishline 435 in the direction A when the fishline 435 is played-out from the spool against the resistance of a drag mechanism, thereby maintaining the fishline 435 at substantially the central region of the line roller 447. Thus, the twenty-ninth embodiment more completely restricts shifting of the fishline 435 on the line roller 447.

Figure 58:
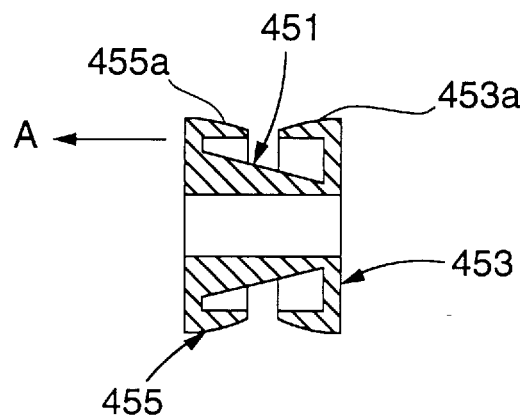
FIG. 58 is a cross-section view of a modified line roller according to the present invention.

FIG. 58 shows a modified, tapered line roller 451. The diameter of the line roller 451 increases in the fishline winding direction A of rotation by the rotor 417, and integral annular guide projections 453,455, which respectively include guides 453a,455a extending toward the longitudinal midpoint of the line roller 451, are formed at respective axial ends of the line roller 451.

The shape of the line roller 451 is not limited as illustrated. Inasmuch as the modifications shown in FIGS. 59 to 70 are generally similar to the modification shown in FIG. 58, only the differences will be described hereinafter. The same elements are given the same designations and repetitive descriptions are omitted.

FIGS. 59 to 62 show modified line rollers having a trumpet shape wherein the diameter increases non-linearly in the fishline winding direction A of rotation by the rotor 417. Line roller 457 shown in FIG. 59 has an integral annular guide projection 459 including a guide 459a extending toward the longitudinal midpoint of the line roller 457 formed at the axial end of the line roller 457 proximate to the bail arm 427. Line roller 461 shown in FIG. 60 includes a separate guide piece 463, including a guide 463a extending toward the longitudinal midpoint of the line roller 461, and fixed to the axial end of the line roller 461 proximate to the bail arm 427.

Figure 61:
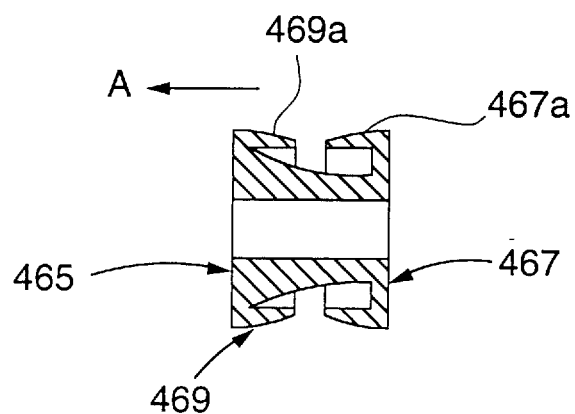
FIG. 61 is a cross-section view of another modified line roller according to the present invention.
Figure 62:
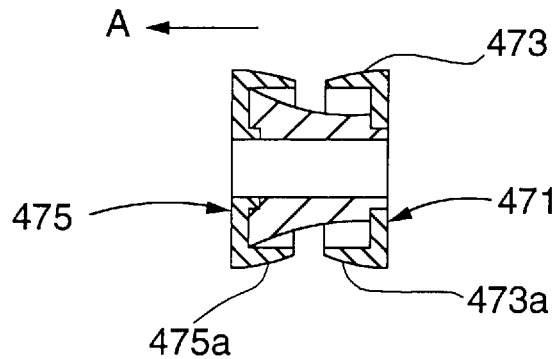
FIG. 62 is a cross-section view of another modified line roller according to the present invention.

Line roller 465 shown in FIG. 61 includes integral annular guide projections 467,469, respectively including guides 467a,469a extending toward the longitudinal midpoint of the line roller 465, and formed at the opposite axial ends of the line roller 465. Line roller 471 shown in FIG. 62 includes separate annular guide pieces 473,475, respectively including guides 473a,475a extending toward the longitudinal midpoint of the line roller 471, and fixed to the opposite axial ends of the line roller 471.

Figure 59:
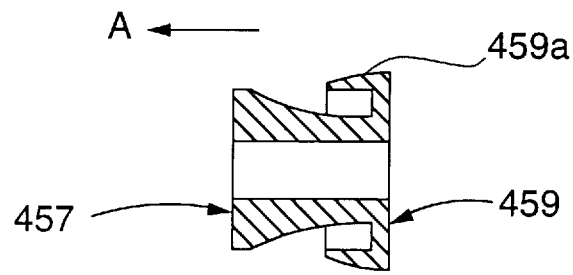
FIG. 59 is a cross-section view of another modified line roller according to the present invention.
Figure 60:
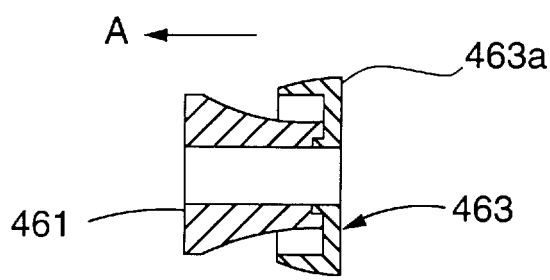
FIG. 60 is a cross-section view of another modified line roller according to the present invention.

The line rollers 457 and 461 shown in FIGS. 59 and 60, respectively, achieve a similar effect to the twenty-fifth embodiment of the present invention. The line rollers 465 and 471 shown in FIGS. 61 and 62, respectively, achieve a similar effect to the twenty-ninth embodiment of the present invention.

FIGS. 63 to 66 show modified line rollers having a drum shape. Line roller 477 shown in FIG. 63 has an integral annular guide projection 479 including a guide 479a extending toward the longitudinal midpoint of the line roller 477 formed at the axial end of the line roller 477 proximate to the bail arm 427. Line roller 481 shown in FIG. 64 includes a separate guide piece 483, including a guide 483a extending toward the longitudinal midpoint of the line roller 481, and fixed to the axial end of the line roller 481 proximate to the bail arm 427.

Figure 65:
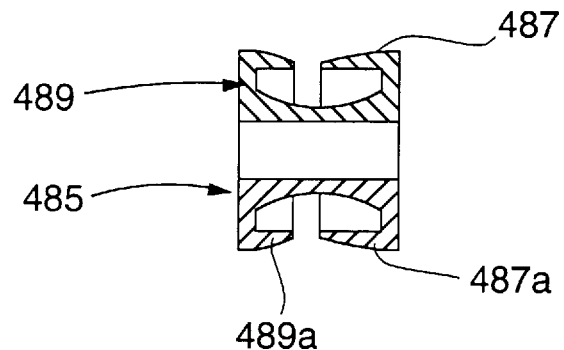
FIG. 65 is a cross-section view of another modified line roller according to the present invention.
Figure 66:
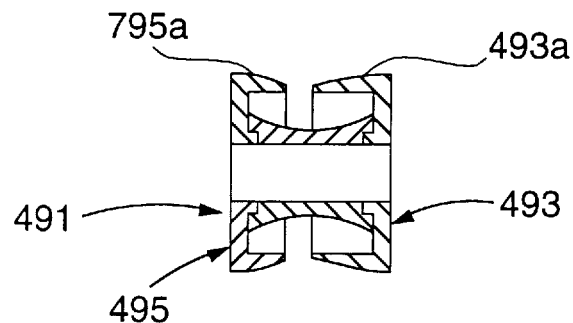
FIG. 66 is a cross-section view of another modified line roller according to the present invention.

Line roller 485 shown in FIG. 65 includes integral annular guide projections 487,489, respectively including guides 487a,489a extending toward the longitudinal midpoint of the line roller 485, formed at the opposite axial ends of the line roller 485. Line roller 491 shown in FIG. 66 includes separate annular guide pieces 493,495, respectively including guide projection pieces 493a,495a extending toward the longitudinal midpoint of the line roller 491, fixed to the opposite axial ends of the line roller 491.

Figure 63:
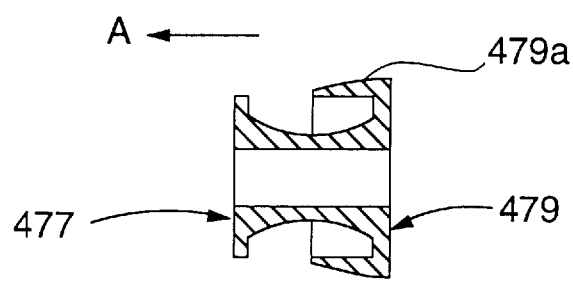
FIG. 63 is a cross-section view of another modified line roller according to the present invention.
Figure 64:
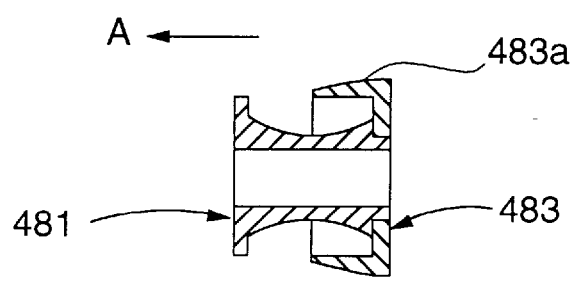
FIG. 64 is a cross-section view of another modified line roller according to the present invention.

The line rollers 477 and 481 shown in FIGS. 63 and 64, respectively, achieve a similar effect to the twenty-fifth embodiment of the present invention. The line rollers 485 and 491 shown in FIGS. 65 and 66, respectively, achieve a similar effect to the twenty-ninth embodiment of the present invention.

FIGS. 67 to 70 show modified line rollers having a cylindrical shape. Line roller 497 shown in FIG. 67 has an integral annular guide projection 499 including a guide 499a extending toward the longitudinal midpoint of the line roller 497 formed at the axial end of the line roller 497 proximate to the bail arm 427. Line roller 501 shown in FIG. 68 includes a separate guide piece 503, including a guide 503a extending toward the longitudinal midpoint of the line roller 501, fixed to the axial end of the line roller 501 proximate to the bail arm 427.

Figure 69:
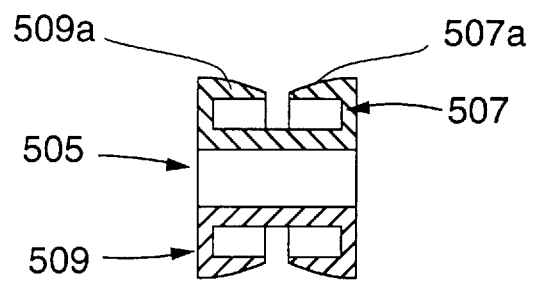
FIG. 69 is a cross-section view of another modified line roller according to the present invention.
Figure 70:
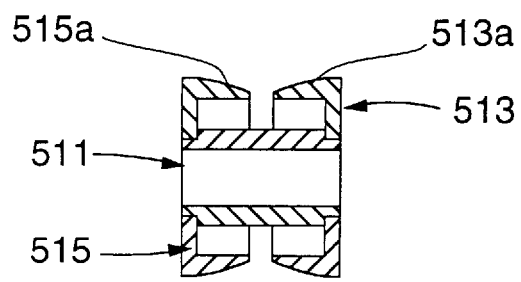
FIG. 70 is a cross-section view of another modified line roller according to the present invention.

Line roller 505 shown in FIG. 69 includes integral annular guide projections 507,509, respectively including guides 507a,509a extending toward the longitudinal midpoint of the line roller 505, formed at the opposite axial ends of the line roller 505. Line roller 511 shown in FIG. 70 includes separate annular guide pieces 513,515, respectively including guides 513a,515a extending toward the longitudinal midpoint of the line roller 511, fixed to the opposite axial ends of the line roller 511.

Figure 67:
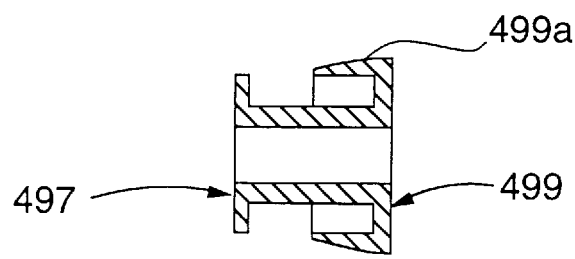
FIG. 67 is a cross-section view of another modified line roller according to the present invention.
Figure 68:
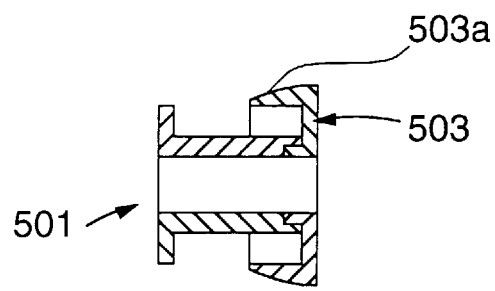
FIG. 68 is a cross-section view of another modified line roller according to the present invention.

The line rollers 497 and 501 shown in FIGS. 67 and 68, respectively, achieve a similar effect to the twenty-fifth embodiment of the present invention. The line rollers 505 and 511 shown in FIGS. 69 and 70, respectively, achieve a similar effect to the twenty-ninth embodiment of the present invention.

Figure 71:
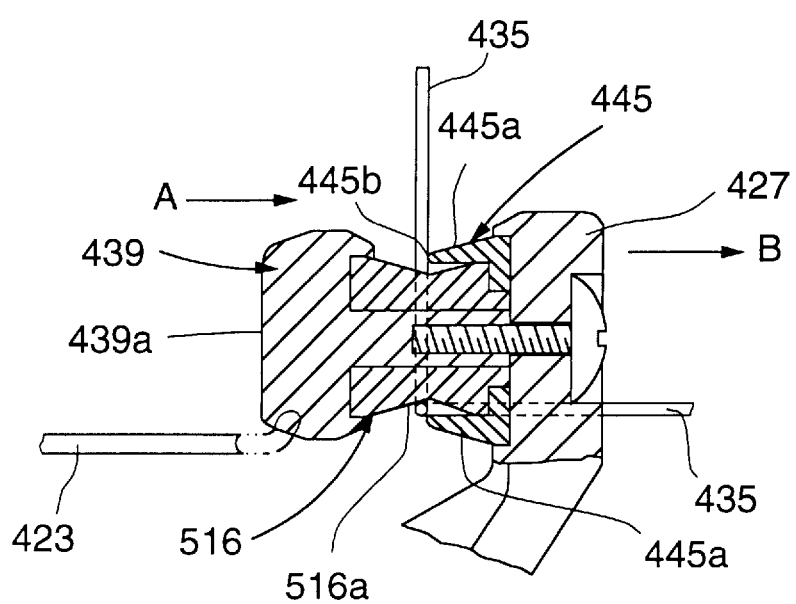
FIG. 71 is a cross-section view of the featured components of a spinning reel for fishing according to a thirtieth embodiment of the present invention.

FIG. 71 shows the featured components of a thirtieth embodiment of the present invention. A V-shaped line roller 516 is rotatably supported on the shaft portion 439a of the line slider 439 and includes a fishline guide portion 516a formed substantially in the central region of the line roller 516. An annular guide piece 445 is rotatably situated within a recess of the bail arm 427 and includes a guide 445a extending toward the longitudinal midpoint of the line roller 516. The guide 445a maintains the fishline 425 in the central region of the fishline guide portion 516b during winding.

Turning the handle 433 rotates the rotor 417 in the fishline winding direction A of rotation by the rotor 417. The fishline 435 shifts in the direction B opposite to the fishline winding direction A, however the edge 445b of the guide 445a in contact with the fishline 435 restricts such shifting to maintain the fishline 435 on the fishline guide portion 516a between the line slider 439 and the longitudinal midpoint of the line roller 516.

An increase in the line winding diameter on the spool 431 also causes the fishline 435 in contact with the fishline guide portion 516a to shift in the direction B. Again, the edge 445b of the guide 445a contacts the fishline 435 to restrict such shifting of the fishline 435, thereby maintaining the fishline 435 at substantially the central region of the line roller 516.

As described previously, inasmuch as the line roller 516 has a V-shape wherein the diameter increases in the fishline winding rotation direction from the central region of the fishline guide portion 516a, friction between the line roller 516 and the fishline 435 increases as diameter of the line roller 516 increases. Consequently, the fishline 435 is intentionally twisted in the opposite direction to line twists which occur during casting. The line twists on the fishline 435 produced during winding and the line twists occurring during casting mutually cancel, thereby eliminating spiral delivery of the fishline 435 from the spool 431 during casting.

According to the thirtieth embodiment as well, the guide piece 445 restricts the movement of the fishline 435 in the direction B during winding, thereby maintaining the fishline 435 at substantially the central region of the line roller 516, regardless of variations in the line winding diameter of the fishline 435. Further, the thirtieth embodiment eliminates the potential that the fishline 435 may become tangled between the line roller 516 and bail arm 427, as well as reducing resistance due to contact by the fishline 435 with the bail arm 427.

Inasmuch as the size of the bail arm 427 according to the thirtieth embodiment is minimized, the weight of the bail arm 427 is not centered forward of the spinning reel, and the dynamic balance of the rotor 417 is not adversely affected by the bail arm 427. Additionally, winding the fishline 435 twists the fishline 435 in the opposite direction to the line twists which occur during casting, thereby preventing the accumulation of line twists caused by repeated winding and play-ing out in conventional spinning reels.

Inasmuch as the line roller 516 and the guide piece 445 are separate and can be rotated independently in the same direction as the line roller 516 during winding, the fishline 435 can be guided to the spool 431 with minimal resistance. Consequently, line twists occurring during casting are reduced.

Figure 72:
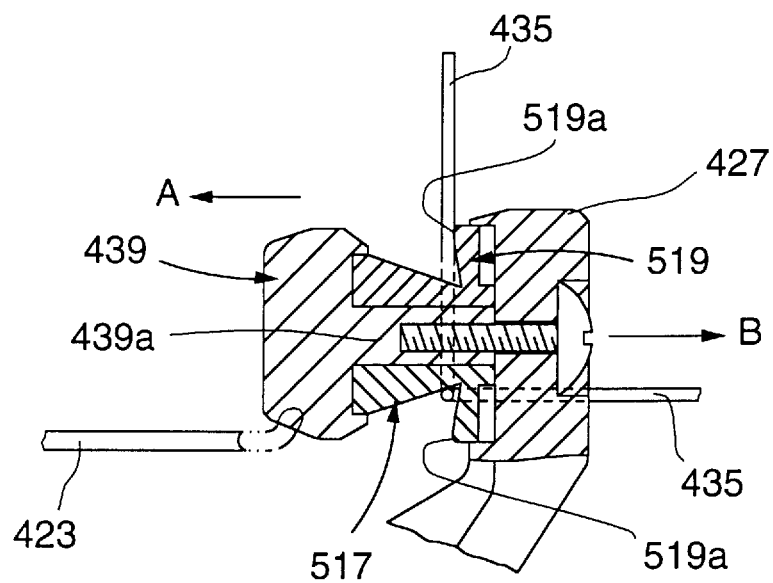
FIG. 72 is a cross-section view of the featured components of a spinning reel for fishing according to a thirty-first embodiment of the present invention.

FIG. 72 shows the featured components of a spinning reel for fishing according to a thirty-first embodiment of the invention. The diameter of a line roller 517, which increases in the fishline winding direction A of rotation by the rotor 417, is rotatably supported on the shaft portion 439a of the line slider 439. An integral disk-like guide projection 519 is fixed near the axial end of the line roller 517 proximate to the bail arm 427. A side surface of the guide projection 519 facing the line slider 439 has a recess which increases in depth from the radially outer edge 519a of the guide toward the line roller 517. During winding, only the peripheral edge 519a contacts the fishline 435 to restrict the movement of the fishline 435 in the direction B and maintain the fishline 435 at a desired position along the line roller 517.

The remaining portions of the thirty-first embodiment of the present invention are similar to the twenty-fifth embodiment, the same elements are given the same designations and repetitive descriptions are omitted.

Turning the handle 433 rotates the rotor 417 in the fishline winding direction A of rotation which causes the fishline 435 in contact with the line roller 517 to shift in the direction B. The peripheral edge 519a of the guide projection 519 contacts the fishline 435 to restrict such shifting of the fishline 435, thereby maintaining the fishline 435 at the desired position along the line roller 517.

An increase in the line winding diameter on the spool 431 also causes the fishline 435 in contact with the line roller 517 to shift in the direction B. Again, the peripheral edge 519a contacts the fishline 435 to restrict such shifting of the fishline 435, thereby maintaining the fishline 435 at the desired position along the line roller 517.

As previously described, inasmuch as the line roller 517 has a tapered shape wherein the diameter increases in the fishline winding rotation direction, friction between the line roller 517 and the fishline 435 increases as the diameter of the line roller 517 increases. Consequently, the fishline 435 is intentionally twisted in the opposite direction to line twists which occur during casting. The line twists on the fishline 435 produced during winding and the line twists occurring during casting mutually cancel, thereby eliminating spiral delivery of the fishline 435 from the spool 431 during casting. The thirty-first embodiment, like the previous embodiments, similarly achieves the objects of the present invention.

Figure 73:
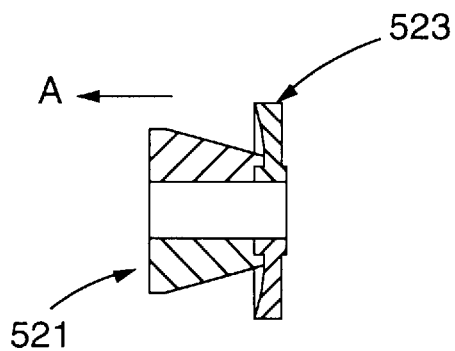
FIG. 73 is a cross-section view of a line roller in a spinning reel for fishing according to a thirty-second embodiment of the present invention.

FIG. 73 shows a thirty-second embodiment of the present invention wherein, instead of the line roller 517 according to the thirty-first embodiment, a line roller 521 has a guide piece 523 formed separately and subsequently fixed near the axial end of the line roller 521 proximate to the bail arm 427.

Figure 74:
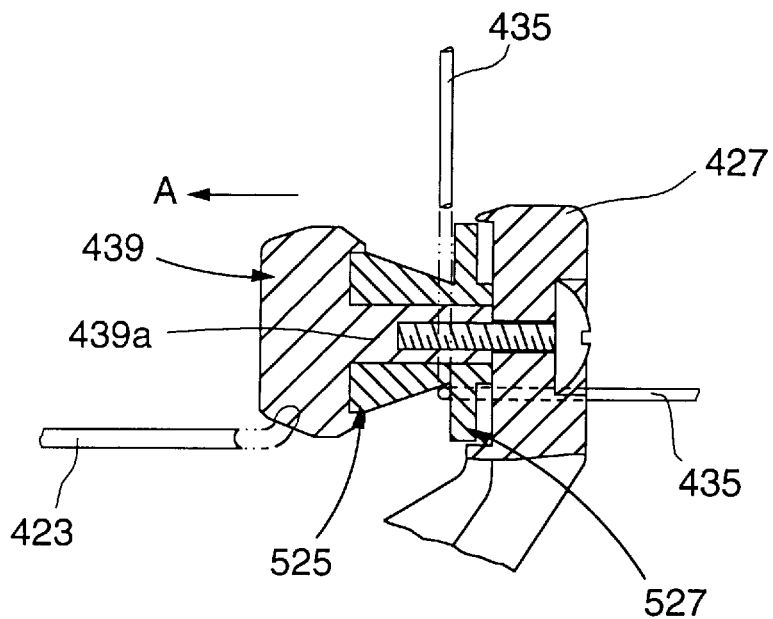
FIG. 74 is a cross-section view of the featured components of a spinning reel for fishing according to a thirty-third embodiment of the present invention.

FIG. 74 shows the featured components of a spinning reel for fishing according to a thirty-third embodiment of the present invention. As in the thirty-first embodiment, the diameter of a line roller 525, which increases in the fishline winding direction A of rotation by the rotor 417, is rotatably supported on the shaft portion 439a of the line slider 439. An integral disk-like guide projection 527 is fixed near the axial end of the end of the line roller 517 proximate to the bail arm 427. The guide projection 527 has a uniform thickness. During winding, the guide projection 527 contacts the fishline 435 to restrict shifting of the fishline 435 and maintain the fishline 435 at a desired position along the line roller 525.

Figure 75:
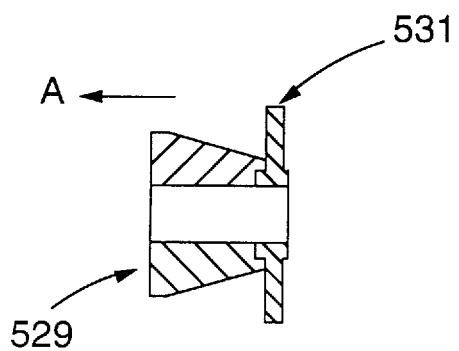
FIG. 75 is a cross-section view of a line roller in a spinning reel for fishing according to a thirty-fourth embodiment of the present invention.

FIG. 75 shows a thirty-fourth embodiment of the present invention wherein, instead of the line roller 525 according to the thirty-third embodiment, a line roller 529 has a guide piece 531 formed separately and subsequently fixed near the axial end of the line roller 529 proximate to the bail arm 427.

According to each of the thirty-first through thirty-fourth embodiments of the present invention, the objects of the present invention can be achieved. However, inasmuch as the guide projection 527 and guide piece 531 of the thirty-third and thirty-fourth embodiments do not have the recessed side surface of the thirty-first and thirty-second embodiments, manufacture and machining of the line roller 525 and guide are simplified.

Figure 76:
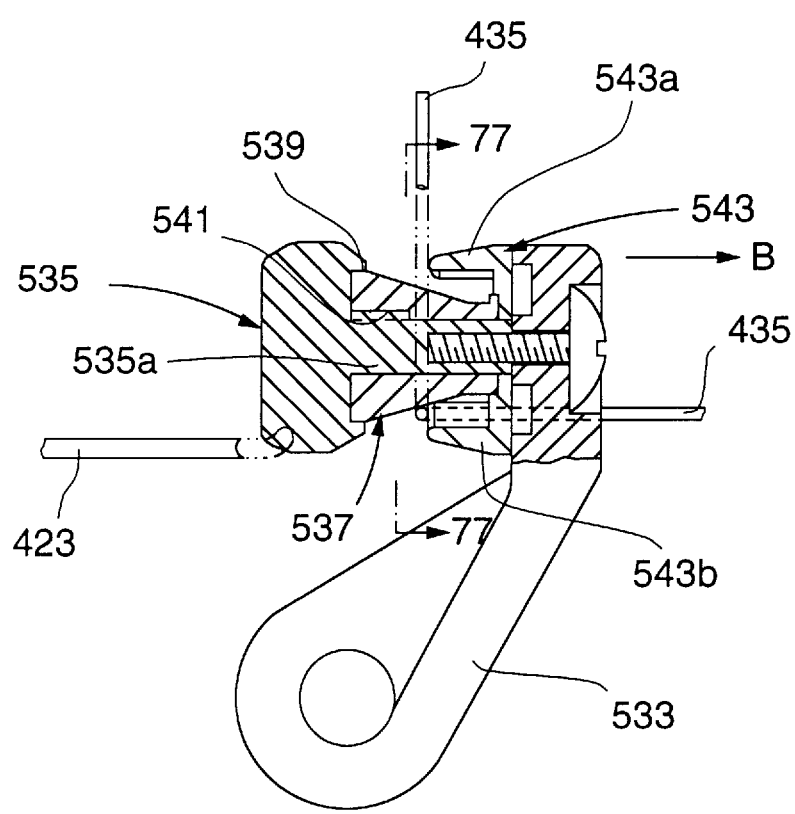
FIG. 76 is a cross-section view of the featured components of a spinning reel for fishing according to a thirty-fifth embodiment of the present invention.
Figure 77:
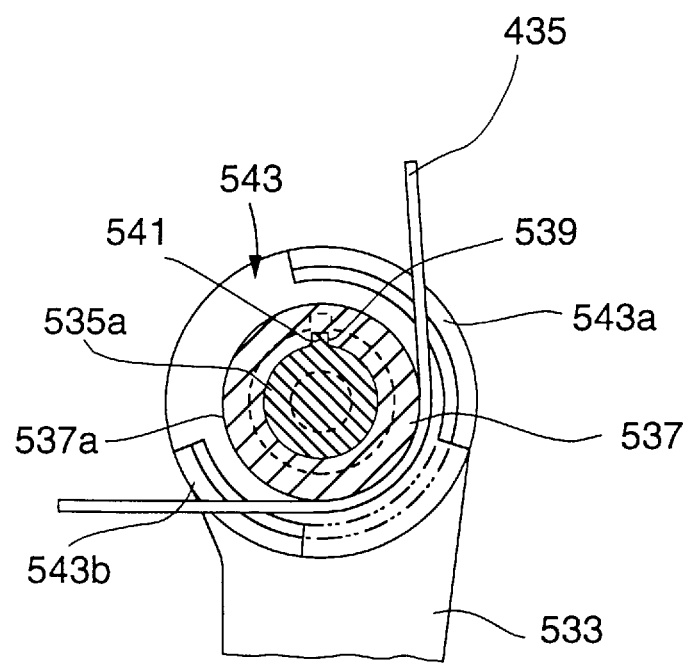
FIG. 77 is a cross-section view taken along the line 77—77 in FIG. 76.
Figure 78:
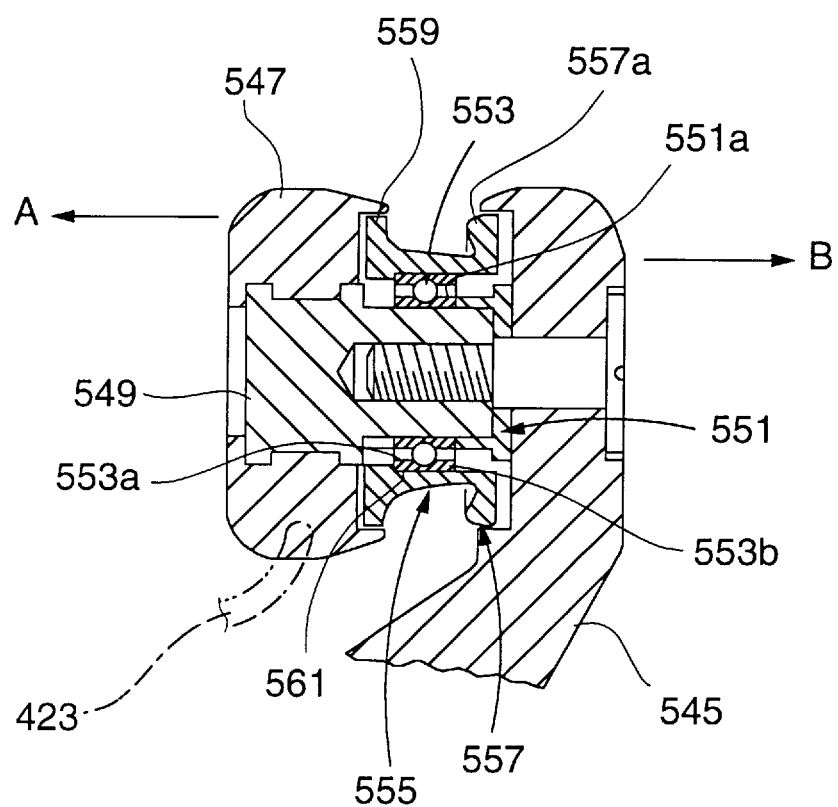
FIG. 78 is a cross-section view of the featured components of a spinning reel for fishing according to a thirty-sixth embodiment of the present invention.

FIGS. 76 and 77 show the featured components of a spinning reel for fishing according to a thirty-fifth embodiment of the present invention. Elements of the thirty-fifth embodiment of the present invention which are similar to twenty-fifth embodiment are given the same designations and repetitive descriptions are omitted.

A bail arm 533 is mounted on the leading end portion of a bail support arm 421, and a shaft portion 535a of a line slider 535 is fixed with respect to the bail arm 533. The diameter of a line roller 537, which increases in the fishline winding direction A of rotation by the rotor 417, is supported on the shaft portion 535a of the line slider 535. An interior recess 541 on the line roller 537 engages a projection 539 on the outer periphery of the shaft portion 535a so that the line roller 537 is not rotatable with respect to the shaft portion 535a.

As best seen in FIG. 77, two arc-shaped guides 543a,543b integrally extend from the peripheral edge of the guide piece 543 toward the longitudinal midpoint of the line roller 537, and are diametrically opposite to one another with respect to the axis of the line roller 537. During winding, guide 543a contacts the fishline 435 to restrict shifting of the fishline 435 in the direction B. The guide 543b also contacts the fishline 435 to restrict shifting of the fishline 435 in the direction B in order to substantially maintain the fishline 435 at the longitudinal midpoint of the line roller 537.

According to the thirty-fifth embodiment (similar to the twenty-fifth embodiment), turning the handle 433 rotates the rotor 417 in the fishline winding direction A of rotation which causes the fishline 435 in contact with the line roller 517 to shift in the direction B. The guide 543a contacts the fishline 435 to restrict such shifting of the fishline 435, thereby substantially maintaining the fishline 435 at the longitudinal midpoint of the line roller 537.

An increase in the line winding diameter on the spool 431 also causes the fishline 435 in contact with the line roller 537 to shift in the direction B. However, the guide 543b contacts the fishline 435 to restrict such shifting of the fishline 435, thereby maintaining the fishline 435 at substantially the longitudinal midpoint of the line roller 537.

As previously described, inasmuch as the line roller 537 has a tapered shape wherein the diameter increases in the fishline winding rotation direction, friction between the line roller 537 and the fishline 435 increases as the diameter of the line roller 537 increases. Consequently, the fishline 435 is intentionally twisted in the opposite direction to line twists which occur during casting. The line twists on the fishline 435 produced during winding and the line twists occurring during casting mutually cancel, thereby eliminating spiral delivery of the fishline 435 from the spool 431 during casting. The thirty-fifth embodiment, like the previous embodiments, similarly achieves the objects of the present invention.

Alternatively, as shown by two-dot chained lines in FIG. 77, the guides 543a and 543b may be connected with each other to provide a single, substantially C-shaped guide.

FIGS. 78 to 84 shows the featured components of spinning reels for fishing according to a thirty-sixth through forty-second embodiments of the present invention. Elements of these embodiments of the present invention which are similar to the twenty-fifth embodiment are given the same designations and repetitive descriptions are omitted.

According to the thirty-sixth embodiment of the present invention, a line slider 547 fixed to a metal support shaft 549 is attached to a bail arm 545. A metal cylindrical member 551 is interposed and held between the support shaft 549 and the bail arm 545. A bearing 553 supports a line roller 555 on the support shaft 549. The bearing includes an inner race 553a abutted against an end 551a of the cylindrical member and an outer race 553b abutted against a securing shoulder 561 on the interior of the line roller. The end 551a of the cylindrical member and the securing shoulder 561 of the line roller 555 restrict longitudinal movement of the bearing 553 with respect to the support shaft 549 and the line roller 555.

The diameter of a tapered line roller 555 increases in the fishline winding direction A of rotation by the rotor 417. The line roller 555 includes an integral annular guide projection 557 at the axial end proximate to the bail arm 545. The guide projection 557 has a guide 557a extending toward the longitudinal midpoint of the line roller 555. During winding, only the guide 557a contacts the fishline 435 to restrict the movement of the fishline 435 in the direction B and maintain the fishline 435 at a desired position along the line roller 555.

A disk-shaped guide projection 559 is integrally formed at an axial end of the line roller 555 proximate to the line slider 547. The guide 559 restricts shifting of the fishline 435 in the direction A when the fishline 435 is played-out from the spool against the resistance of a drag mechanism during winding, thereby preventing the fishline 435 from becoming tangled between the line slider 547 and line roller 555.

Turning the handle 433 rotates the rotor 417 in the fishline winding direction A of rotation by the rotor 417. The fishline 435 shifts in the direction B opposite to the fishline winding direction A, however the guide 557a contacts the fishline 435 restricting such shifting to prevent the fishline 435 from becoming tangled between the line roller 555 and bail arm 545. Concurrently, engagement between the ball bearing 553 and the securing shoulder 561 prevents the line roller 555 from contacting the bail arm 545. Inasmuch as the ball bearing 553 reduces friction and positions the line roller 555, the fishline 435 can be wound more easily and efficiently.

The guide projection 559 restricts shifting of the fishline 435 in the direction A when the fishline 435 is played-out from the spool against the resistance of a drag mechanism during winding, thereby preventing the fishline 435 from becoming tangled between the line slider 547 and line roller 555.

An increase in the line winding diameter on the spool 431 also causes the fishline 435 in contact with the line roller 555 to shift in the direction B. However, the guide 557a contacts the fishline 435 to restrict such shifting of the fishline 435, thereby maintaining the fishline 435 at substantially the longitudinal midpoint of the line roller 555.

As previously described, inasmuch as the line roller 555 has a tapered shape wherein the diameter increases in the fishline winding rotation direction A, friction between the line roller 555 and the fishline 435 increases as the diameter of the line roller 555 increases. Consequently, the fishline 435 is intentionally twisted in the opposite direction to line twists which occur during casting. The line twists on the fishline 435 produced during winding and the line twists occurring during casting mutually cancel, thereby eliminating spiral delivery of the fishline 435 from the spool 431 during casting.

The two guide projections 557,559 restrict movement of the fishline 435 in the directions B and A, respectively, during fishline winding, thereby eliminating the possibilities that the fishline 435 may become tangled between the line roller 555 and bail arm 545 or line slider 547.

Inasmuch as the size of the bail arm 427 according to the thirty-sixth embodiment is minimized, the weight of the bail arm 427 is not centered forward of the spinning reel, and the dynamic balance of the rotor 417 is not adversely affected by the bail arm 427. Additionally, winding the fishline 435 twists the fishline 435 in the opposite direction to the line twists which occur during casting, thereby preventing the accumulation of line twists caused by repeated winding and play-ing out in conventional spinning reels.

Figure 79:
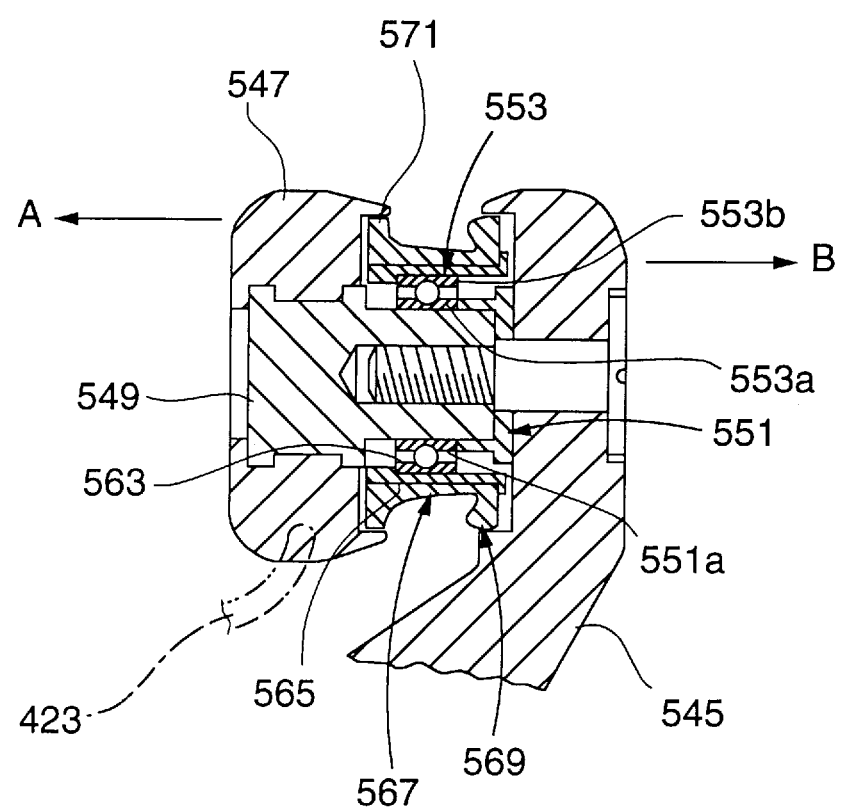
FIG. 79 is a cross-section view of the featured components of a spinning reel for fishing according to a thirty-seventh embodiment of the present invention.

FIG. 79 shows the featured components of a spinning reel for fishing according to a thirty-seventh embodiment of the present invention. As described with respect to the thirty-sixth embodiment, the securing shoulder 561 projected directly from the interior periphery of the line roller 555 to restrict movement of the line roller 555 in the direction B. According to the thirty-seventh embodiment, a cylindrical securing collar 565 with a radially inward projecting securing shoulder 563 is received in the interior periphery of a line roller 567 to restrict the movement of the line roller 567 in the direction B.

The diameter of a tapered line roller 567 increases in the fishline winding direction A of rotation by the rotor 417. The line roller 567 includes an integral annular guide projection 569 at the axial end proximate to the bail arm 545, as well as a guide projection 571 similar to the guide projection 559 which is integral with the axial end of the line roller 567 proximate to the line slider 547. The desired objects of the present invention can be achieved according to the thirty-seventh embodiment similar to the above embodiments.

Figure 80:
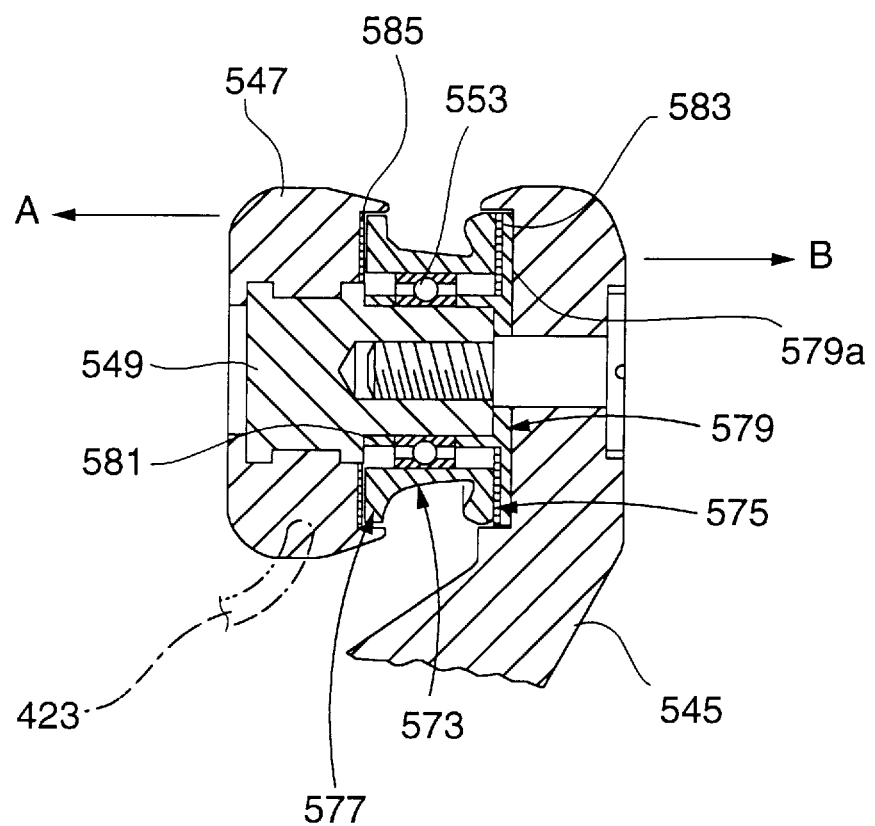
FIG. 80 is a cross-section view of the featured components of a spinning reel for fishing according to a thirty-eighth embodiment of the present invention.

FIG. 80 shows the featured components of a spinning reel for fishing according to a thirty-eighth embodiment of the present invention. A line roller 573, the diameter of which increases in the fishline winding direction A of rotation by the rotor 417, is rotatably mounted on a support shaft portion 549 via a bearing 553. The line roller 573 includes an integral annular guide projection 575, similar to the guide projection 569, at the axial end proximate to the bail arm 545. A guide projection 577 similar to the guide projection 571 is integral with the axial end of the line roller 573 proximate to the line slider 547.

Two cylindrical members 579 and 581 supported on the periphery of the support shaft 549 position the bearing 553. The radial flange 579a of the cylindrical member 579 contacts the side surface of the bail arm 545. Ring-shaped resin washers 583 and 585 are mounted between the flange 579a and line roller 573, as well as between the line roller 573 and the line slider 547, respectively.

Unlike the thirty-sixth and thirty-seventh embodiments, which include the securing shoulders 561 and 563, the thirty-eighth embodiment enables the line roller 573 to shift in both the directions A and B during fishline winding. However, the resin washers 583 and 585 reduce the friction resistance as opposed to the line roller 573 contacting the flange 579a or the line slider 547.

Figure 81:
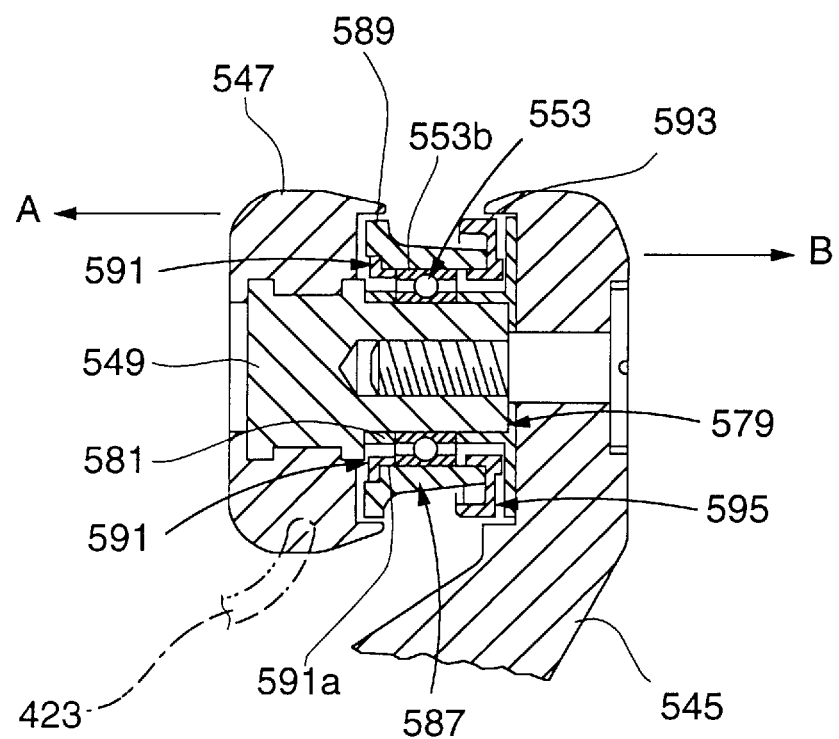
FIG. 81 is a cross-section view of the featured components of a spinning reel for fishing according to a thirty-ninth embodiment of the present invention.

FIG. 81 shows the featured components of a spinning reel for fishing according to a thirty-ninth embodiment of the present invention. Elements which are similar to the thirty-eighth embodiment are given the same designations and repetitive descriptions are omitted.

A line roller 587, the diameter of which increases in the fishline winding direction A of rotation by the rotor 417, is rotatably mounted on a support shaft portion 549 via a bearing 553. A guide projection 589 similar to the guide projection 577 is integral with the axial end of the line roller 587 proximate to the line slider 547.

A cylindrical securing collar 591 is received on the interior periphery of the line roller 587. The end portion 591a of the securing collar 591 contacts the outer race 553b of the ball bearing 553 during fishline winding to restrict the movement of the line roller 587 in the direction B.

An annular guide piece 595 is rotatably mounted at the axial end of the line roller 587 proximate to the bail arm 545, and includes a guide 593 extending toward the longitudinal midpoint of the line roller 587. During winging, the fishline 435 contacts the guide 593 to restrict shifting of the fishline 435 in the direction B.

The desired objects of the present invention can be achieved according to the thirty-ninth embodiment similar to the above embodiments. Inasmuch as the line roller 587 and the guide piece 595 are separate and can be rotated independently in the same direction during winding, the fishline 435 can be guided to the spool 431 with minimal resistance.

Figure 82:
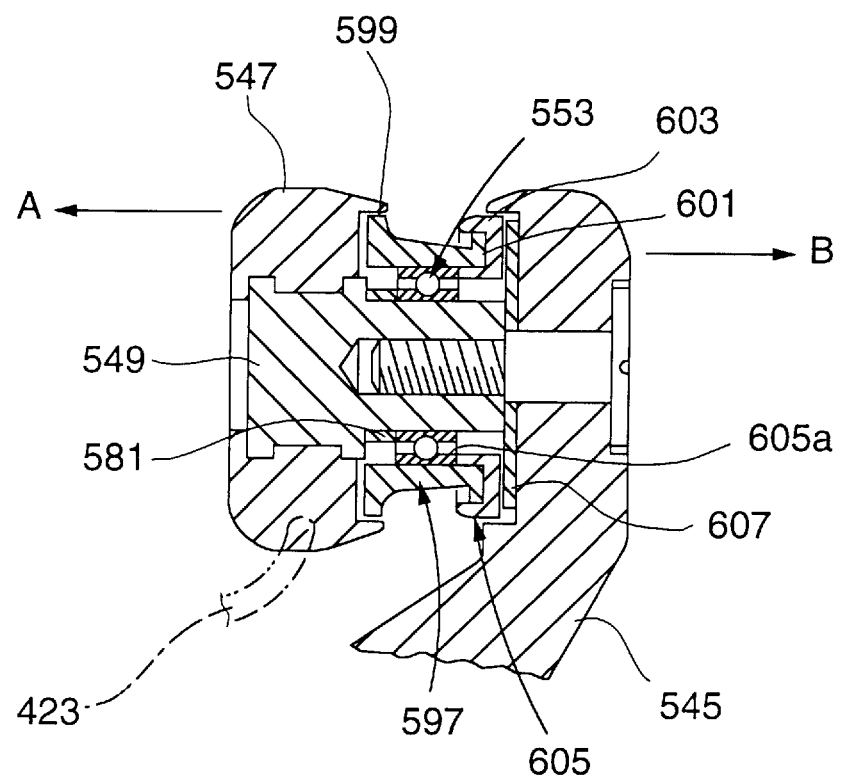
FIG. 82 is a cross-section view of the featured components of a spinning reel for fishing according to a fortieth embodiment of the present invention.

FIG. 82 shows the featured components of a spinning reel for fishing according to a fortieth embodiment of the present invention. A line roller 597, the diameter of which increases in the fishline winding direction A of rotation by the rotor 417, is rotatably mounted on a support shaft portion 549 via a bearing 553. A guide projection 599 similar to the guide projection 589 is integral with the axial end of the line roller 597 proximate to the line slider 547.

The line roller 597 includes an integral annular flange 601 at the axial end which is proximate the bail arm 545. A guide piece 605 is rotatably mounted around the annular flange 601 and includes a guide 603 extending toward the longitudinal midpoint of the line roller 597. The guide 603 contacts the fishline 435 during winding to restrict shifting of the fishline 435 in the direction A.

The guide piece 605 also includes an end portion 605a which extends inside the line roller 597 and which contacts the ball bearing 553 to restrict movement of the line roller 597 in the direction B. A resin washer 607 minimizes friction between the guide piece 605 and the side surface of the bail arm 545. Similar to the above embodiments, the desired objects of the present invention are also achieved according to the fortieth embodiment.

Figure 83:
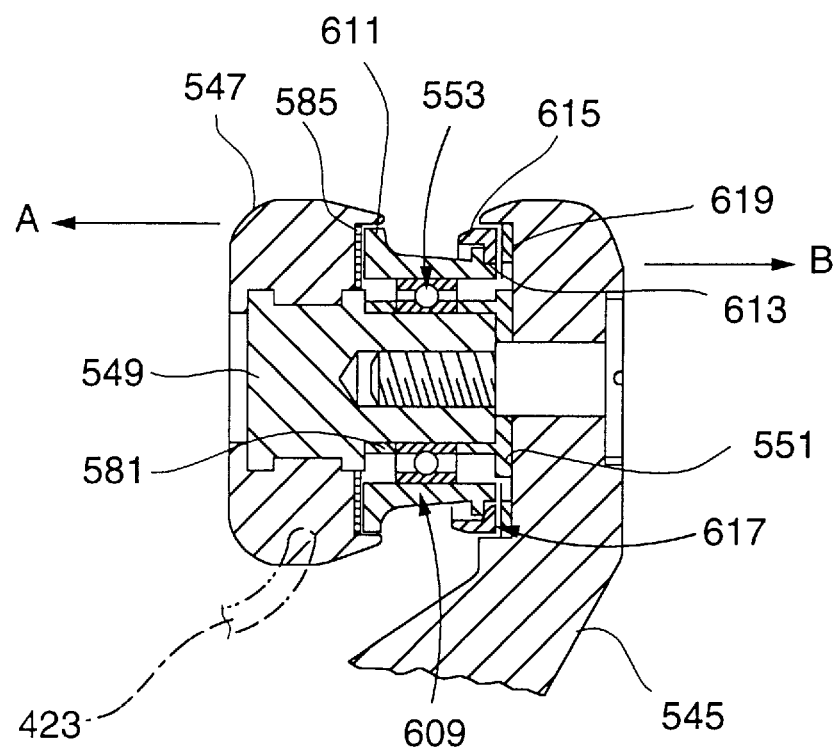
FIG. 83 is a cross-section view of the featured components of a spinning reel for fishing according to a forty-first embodiment of the present invention.

FIG. 83 shows the featured components of a spinning reel for fishing according to a forty-first embodiment of the present invention. A line roller 609, the diameter of which increases in the fishline winding direction A of rotation by the rotor 417, is rotatably mounted on a support shaft portion 549 via a bearing 553. A guide projection 611 similar to the guide projection 599 is integral with the axial end of the line roller 609 proximate to the line slider 547.

An integral disk 613 is fixed near the axial end of the end of the line roller 609 proximate to the bail arm 545. A guide piece 617 is rotatably mounted on the line roller 609 adjacent to the disk 613 and includes a guide 615 extending toward the longitudinal midpoint of the line roller 607. The guide 615 contacts the fishline 435 during winding to restrict shifting of the fishline 435 in the direction B. A resin washer 619 is axially interposed between the guide piece 617 and the bail arm 545. Elements which are similar to the fortieth embodiment are given the same designations and repetitive descriptions are omitted. Similar to the thirty-ninth embodiment, the desired objects of the present invention are also achieved according to the forty-first embodiment.

Figure 84:
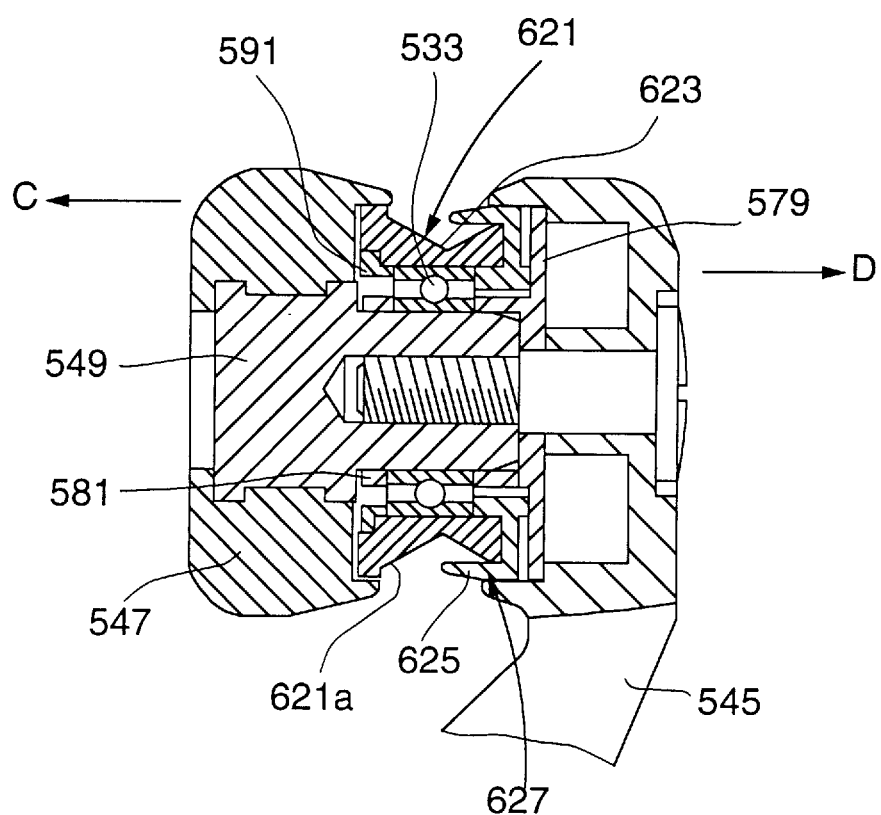
FIG. 84 is a cross-section view of the featured components of a spinning reel for fishing according to a forty-second embodiment of the present invention.

FIG. 84 shows the featured components of a spinning reel for fishing according to a forty-second embodiment of the present invention. A V-shaped line roller 621 includes a fishline guide portion 621a having a valley 623 located axially closer to the bail arm 545 with respect to the longitudinal midpoint of the line roller 621.

An annular guide piece 627, including a guide 625 extending toward the longitudinal midpoint of the line roller 621, is rotatably supported on the axial end of the line roller 621 proximate to the bail arm 545. During winding, the guide 625 contacts the fishline 435 to maintain the fishline 435 on the fishline guide portion 621a between the valley 623 and the line slider 547. Elements which are similar to the previous embodiments are given the same designations and repetitive descriptions are omitted. Similar to the above embodiments, the desired objects of the present invention are also achieved according to the forty-second embodiment.

FIGS. 85 to 89 show the featured components a spinning reel for fishing according to a forty-third embodiment of the present invention. A rotor 702 is rotatably mounted on a reel main body 701. A pair of bail support arms 702a,702b are formed integrally with the rotor 702. A semi-annular bail 714 is mounted on the leading end portions of the bail support arms 702a,702b. A pivotal bail arm 704 having a main line roller 707 and a line guide roller 708 supports a first end of the bail 714, and a pivotal bail holder 705 supports a second end of the bail 714. Consequently, the bail 714 can be reversibly positioned on a first side of the rotor 702 for winding a fishline 713 onto a spool 703, and on a second side of the rotor 702 for freely playing-out the fishline 713 off the spool 703.

The spool 703 is mounted coaxially with the rotor 702 and is fixed on a spool shaft (not shown). The spool shaft is mounted for reciprocating movement with respect to the reel main body 701. After the bail 714 has been positioned on the fishline winding side, the rotor 702 is rotated in a fishline winding direction by operating a manual handle 710. The fishline 713 is wound around the spool 703, which concurrently reciprocates in conjunction with rotation of the rotor 702.

Figure 85:
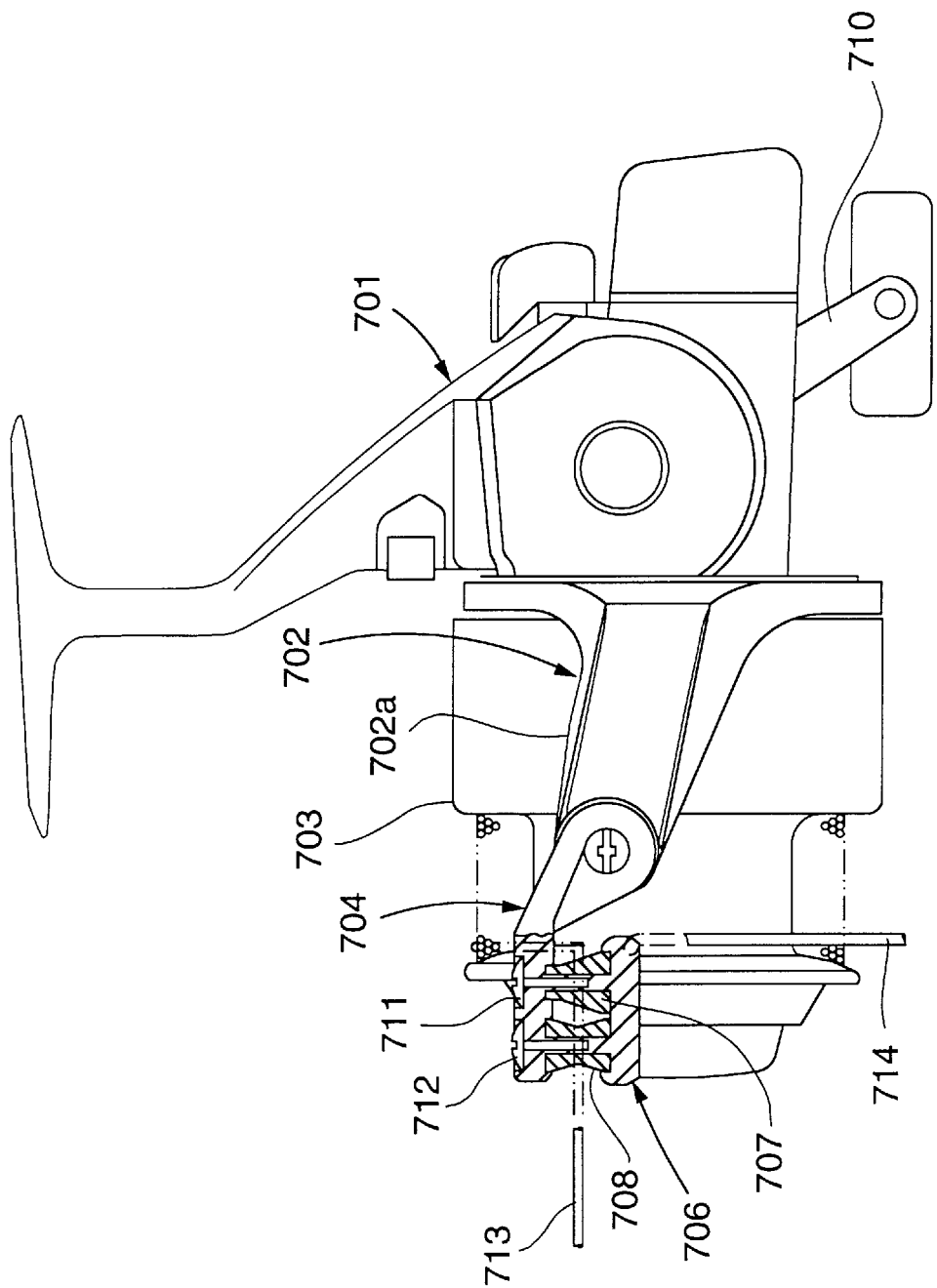
FIG. 85 is a partial cross-section, front elevation view of a spinning reel for fishing according to a forty-third embodiment of the present invention.
Figure 86:
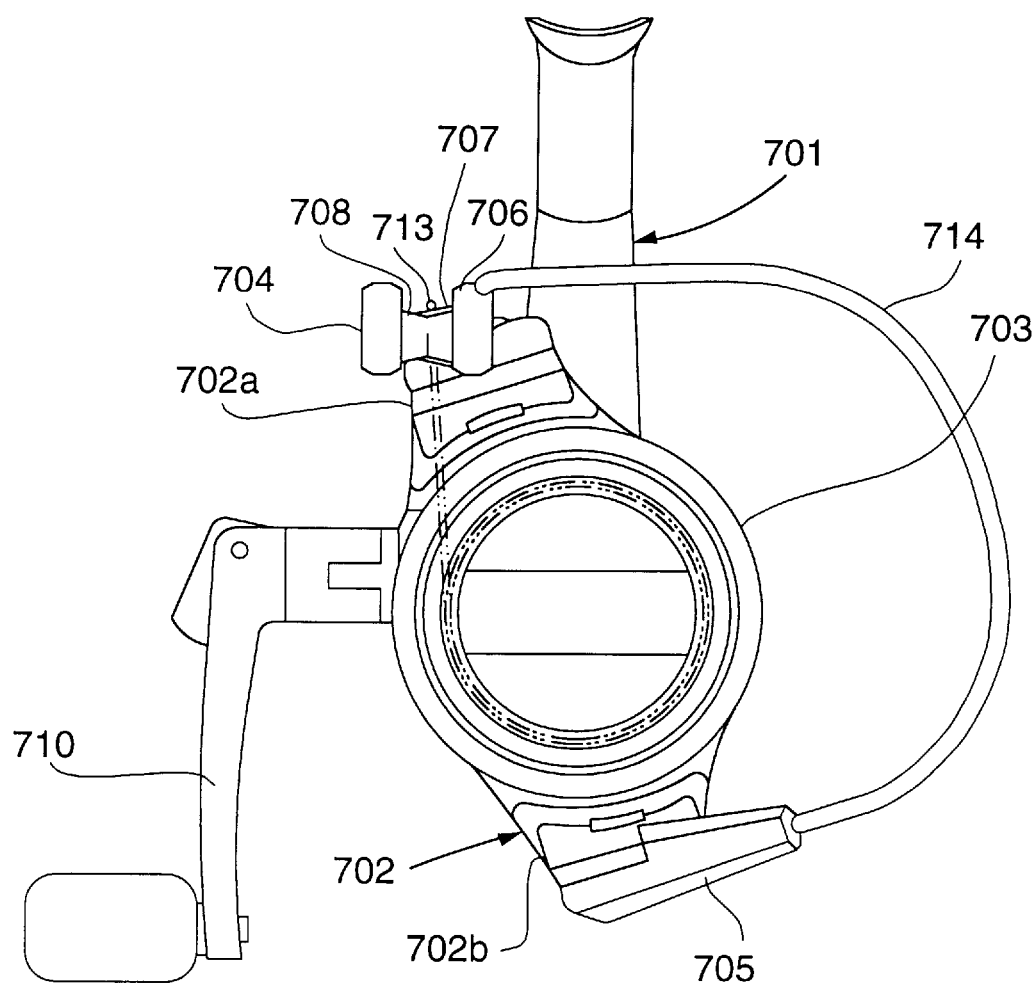
FIG. 86 is a left-side elevation view of the spinning reel for fishing shown in FIG. 85.
Figure 87:
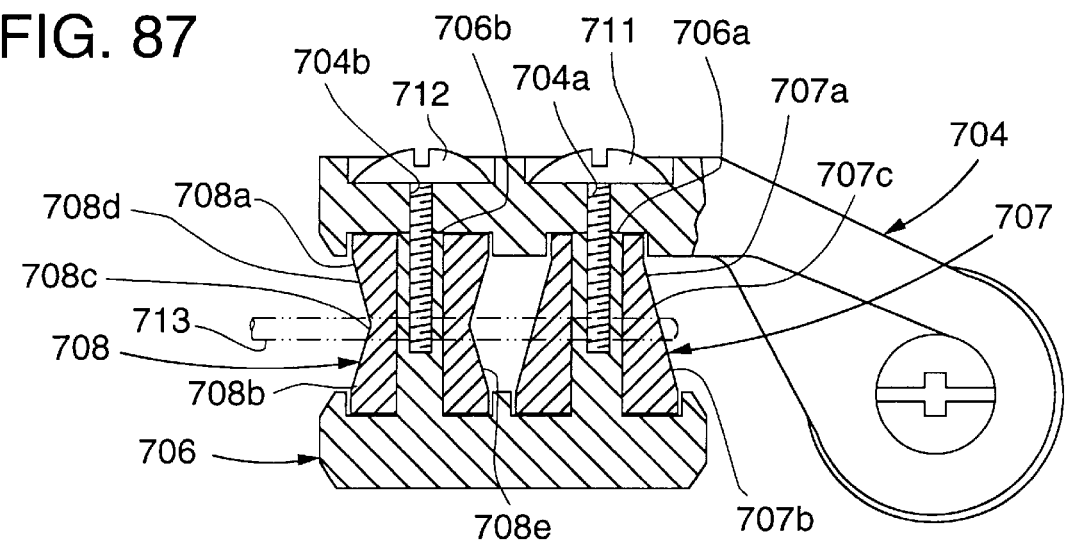
FIG. 87 is a -cross-sectional front view of the featured components of the spinning reel for fishing shown in FIG. 85.
Figure 88:
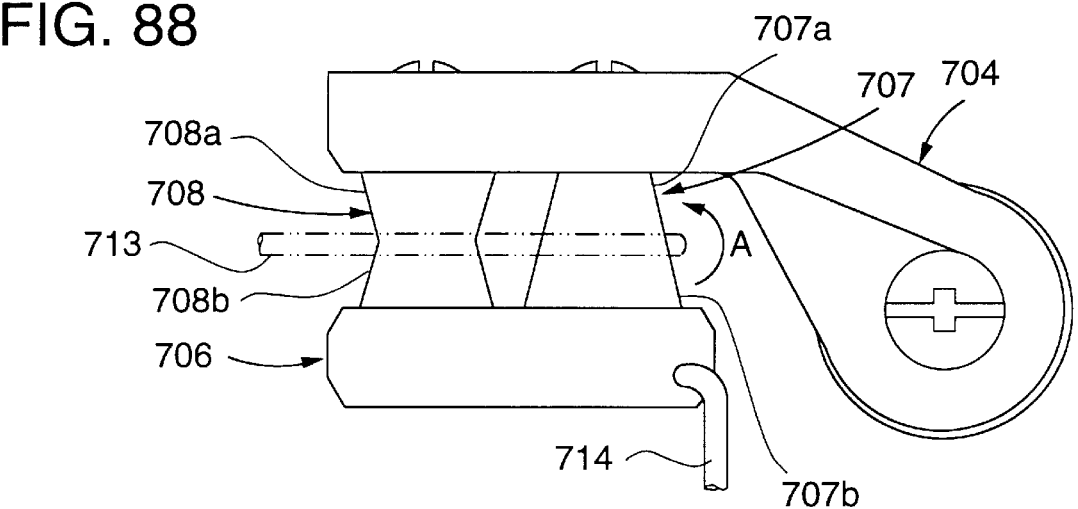
FIG. 88 is a front elevation view of the featured components of the spinning reel for fishing shown in FIG. 87.
Figure 89:
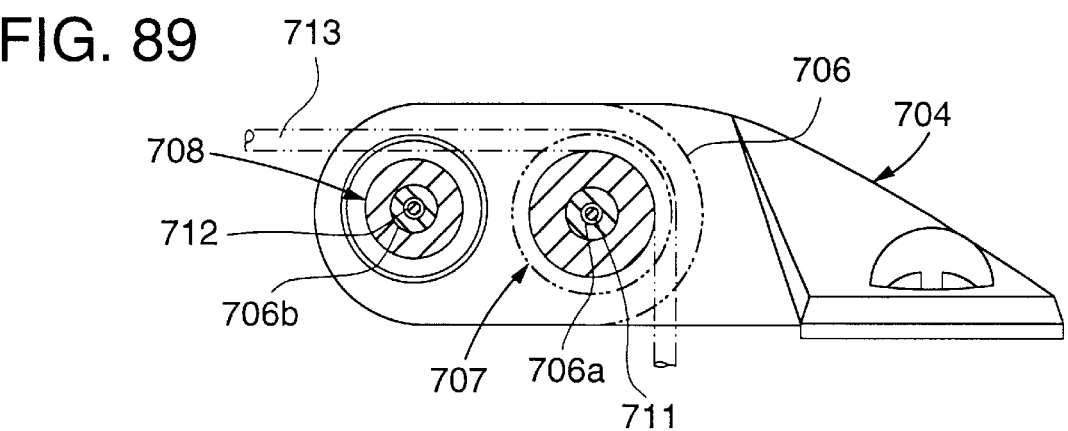
FIG. 89 is a cross-sectional plan view of the featured components of the spinning reel for fishing shown in FIG. 87.

FIGS. 85 and 87 show there are two through holes 704a,704b in the bail arm 704 which threadably receive screws 711,712 mounting a roller support 706 with respect to the bail arm 704.

The roller support 706 includes two shafts 706a,706b. The main line roller 707 for guiding the fishline 713 onto the spool 703 is fitted on the shaft 706a, while the line guide roller 708 for playing out and guiding the fishline 713 is fitted on the shaft 706b.

The main line roller 707 includes a tapered surface 707c having an increasing diameter from proximate a first axial end 707a proximate the bail arm 704 to a second axial end 707b proximate the roller support 706, that is to say, in the fishline winding rotation direction of the rotor 702.

The line guide roller 708 has a V-shape profile wherein two tapered surfaces 708d,708e have increasing diameters extending from a central region 708c to respect axial ends 708a,708b. The diameter of end 708a proximate to the bail arm 704 is substantially equal to the diameter of the end 708b proximate to the roller support 706, and the diameter of the central region 708c is smaller than the diameters of the ends 708a,708b.

Inasmuch as the main line roller 707 has a tapered shape wherein the diameter increases in the fishline winding direction of rotor 702 rotation, friction between the main line roller 707 and the fishline 713 increases as the diameter of the main line roller 707 increases. Consequently, the fishline 713 is intentionally twisted in the opposite direction to line twists which occur during casting. The line twists on the fishline 713 produced during winding (in the direction of arrow A) and the line twists occurring during casting mutually cancel, thereby eliminating spiral delivery of the fishline 713 from the spool 703 during casting. According to the forty-third embodiment of the present invention, the problem of accumulating twists in the fishline is solved. Contact between the fishline 713 with the main line roller 707 is maintained substantially at the longitudinal midpoint of the tapered surface 707c by the line guide roller 708, thereby preventing contact between the fishline 713 and the bail arm 704. The line guide roller 708 also reduces frictional resistance during winding by reducing the amount of bending the fishline 713 is subjected to approaching the main line roller 707.

Further, the forty-third embodiment of the present invention reduces the potential of the fishline being deformed or crushed, as well as minimizing the effects of line twisting, thereby extending the life of the fishline.

Figure 90:
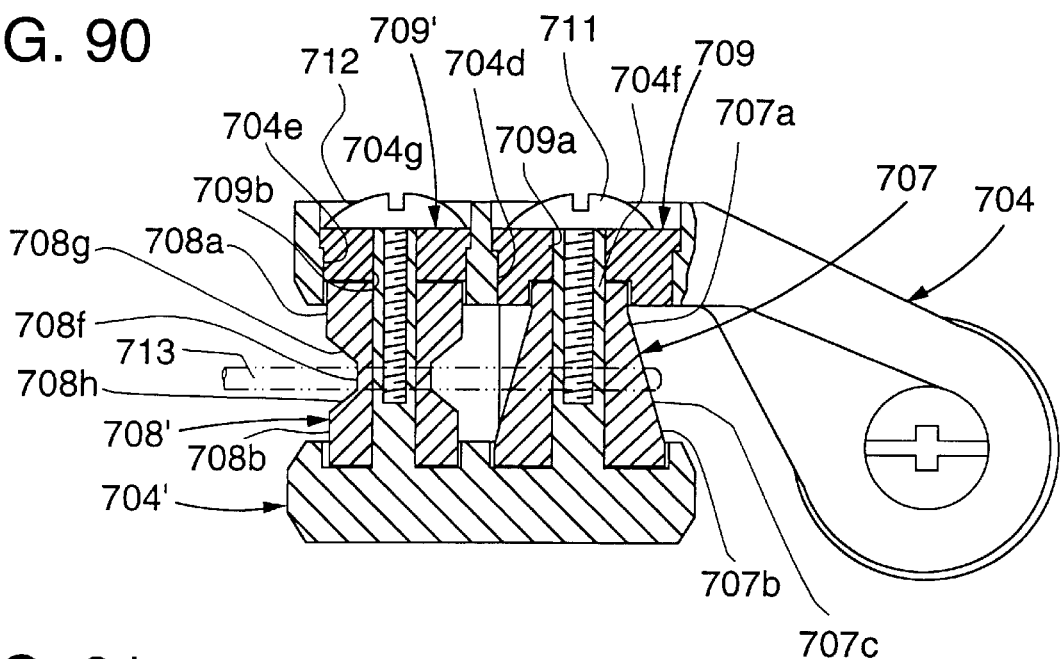
FIG. 90 is a cross-sectional front view of the featured components of a spinning reel for fishing according to a forth-fourth embodiment of the present invention.
Figure 91:
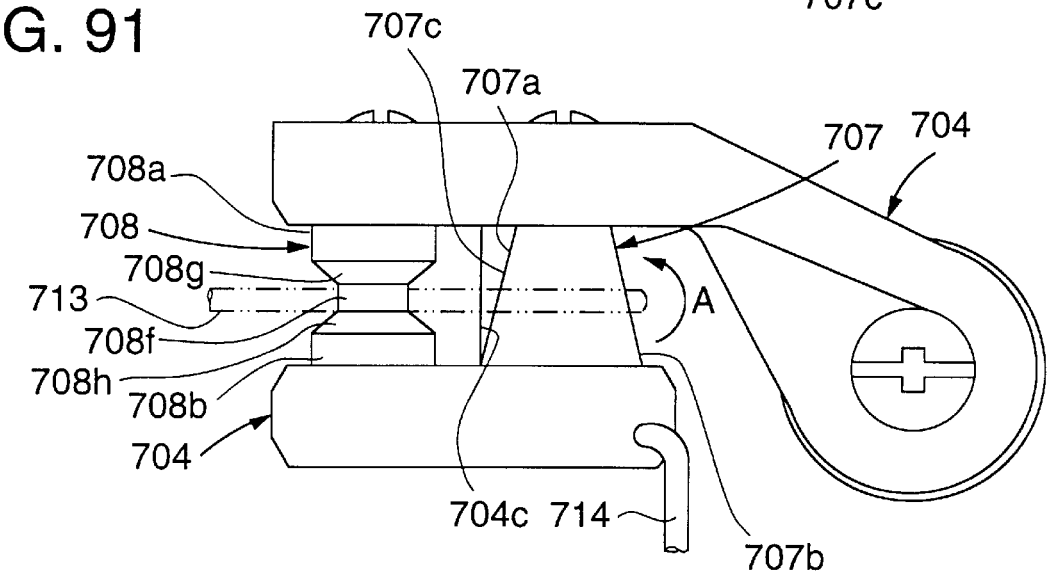
FIG. 91 is a front elevation view of the featured components of the spinning reel for fishing shown in FIG. 90.
Figure 92:
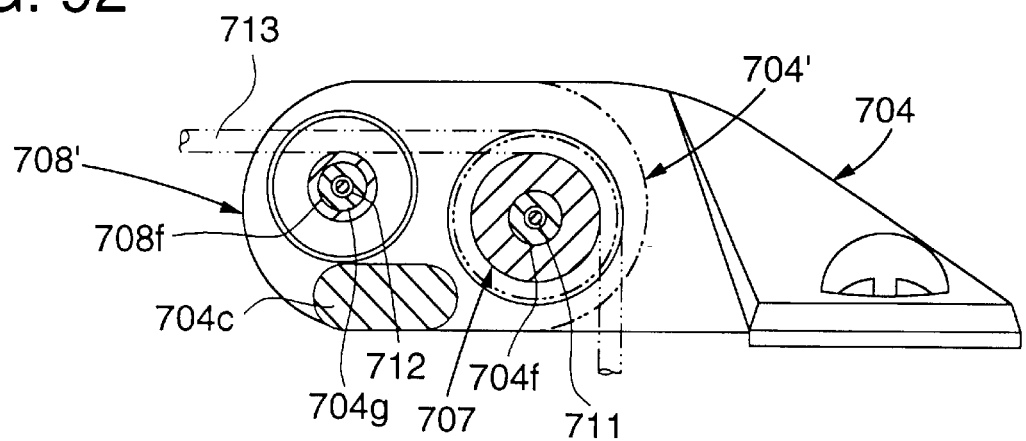
FIG. 92 is a cross-sectional plan view of the featured components of the spinning reel for fishing shown in FIG. 90.

FIGS. 90 to 92 show the featured components of a spinning reel for fishing according to a forty-fourth embodiment of the present invention. Elements which are similar to the forty-third embodiment are given the same designations and repetitive descriptions are omitted.

In the forty-fourth embodiment, the bail arm 704 is integrally connected with a roller supporting portion 704' by a bridge 704c. The main line roller 707 and a modified line guide roller 708' are respectively installed through a pair of stepped holes 704d,704e through the bail arm 704.

Plugs 709,709' are inserted into the stepped holes 704d, 704e and secured to shaft portions 704f,704g of the roller supporting portion 704' by screws 711,712, respectively. The main line roller 707 for guiding a fishline 713 to a spool 703 is fitted on shaft portion 704f, and the line guide roller 708' for playing out and guiding the fishline 713 is fitted on the shaft portion 704g. Plugs 709,709' respectively include through holes 709a,709b into which the shaft portions 704f,704g are received.

The line guide roller 708' includes an annular, grove-like central portion 708f and two steeply tapered surfaces 708g, 708h on either side of the central portion 708f. The diameter of the first end 708a is substantially equal to the diameter of the second end 708b, and the diameter of the central portion 708f is smaller than the diameter of the first and second ends 708a,708b.

Figure 93:
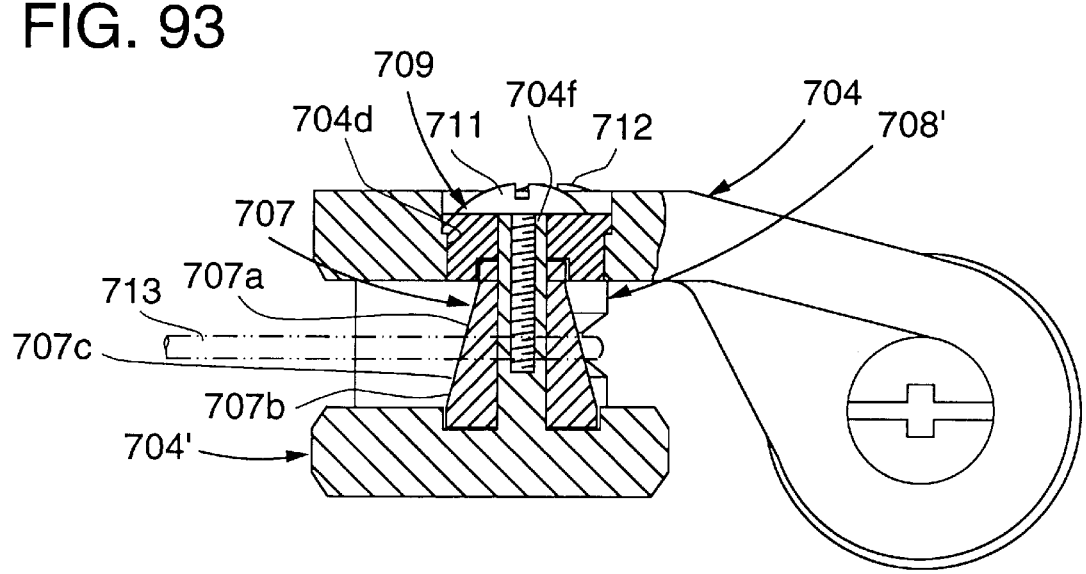
FIG. 93 is a cross-sectional front view of the featured components of a spinning reel for fishing according to a forty-fifth embodiment of the present invention.
Figure 94:
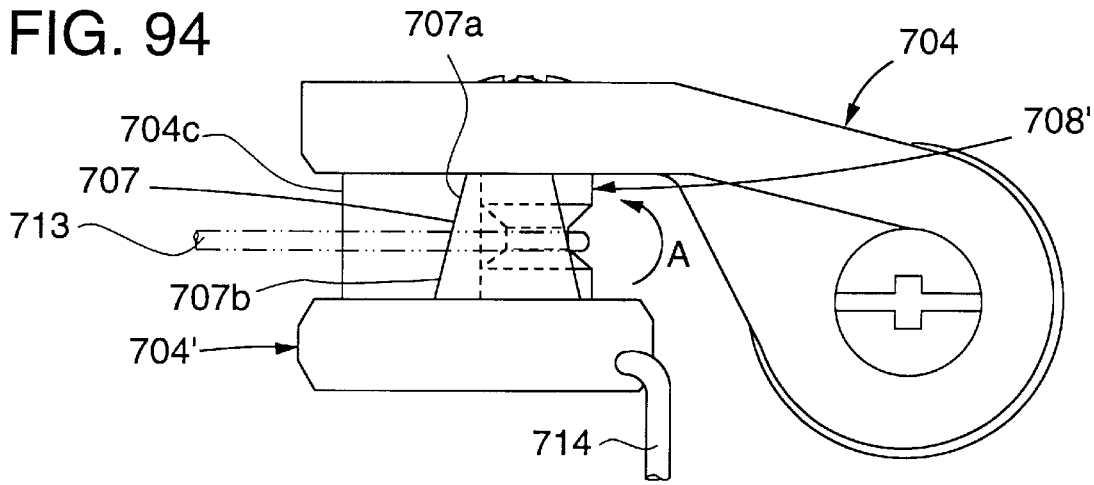
FIG. 94 is a front elevation view of the featured components of the spinning reel for fishing shown in FIG. 93.
Figure 95:
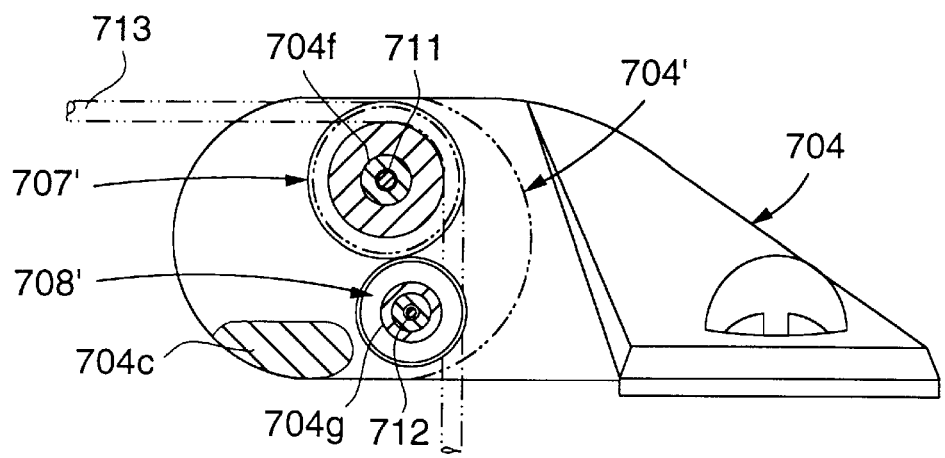
FIG. 95 is a cross-sectional plane view of the featured components shown in FIG. 93.

FIGS. 93 to 95 show the featured components of a spinning reel for fishing according to a forty-fifth embodiment of the present invention. Elements which are similar to the forty-fourth embodiment are given the same designations and repetitive descriptions are omitted.

In the forty-fifth embodiment, the bail arm 704 is integrally connected with a roller supporting portion 704' by a bridge 704c. The main line roller 707 and a line guide roller 708' are juxtaposed in a direction perpendicular to the direction in which the main line roller 707 and the line guide roller 708' are juxtaposed in the forty-fourth embodiment. Further, the main line roller 707 is disposed on the fishline play-out side of the bail arm 704, and the line guide roller 708' is disposed on the side of the bail arm 704 proximate to the spool 703.

Figure 96:
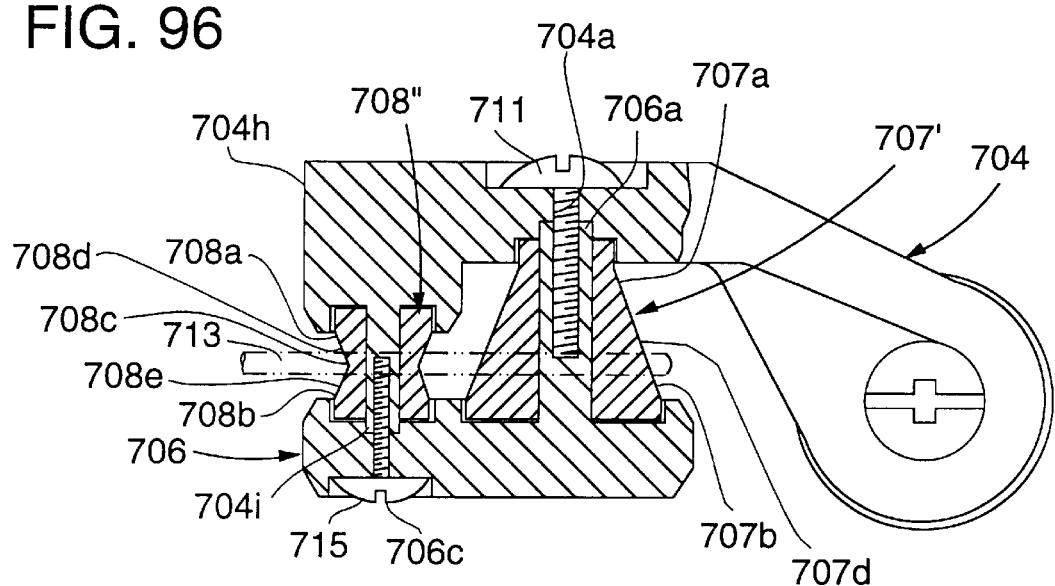
FIG. 96 is a cross-sectional front view of the featured components of a spinning reel for fishing according to a forty-sixth embodiment of the present invention.
Figure 97:
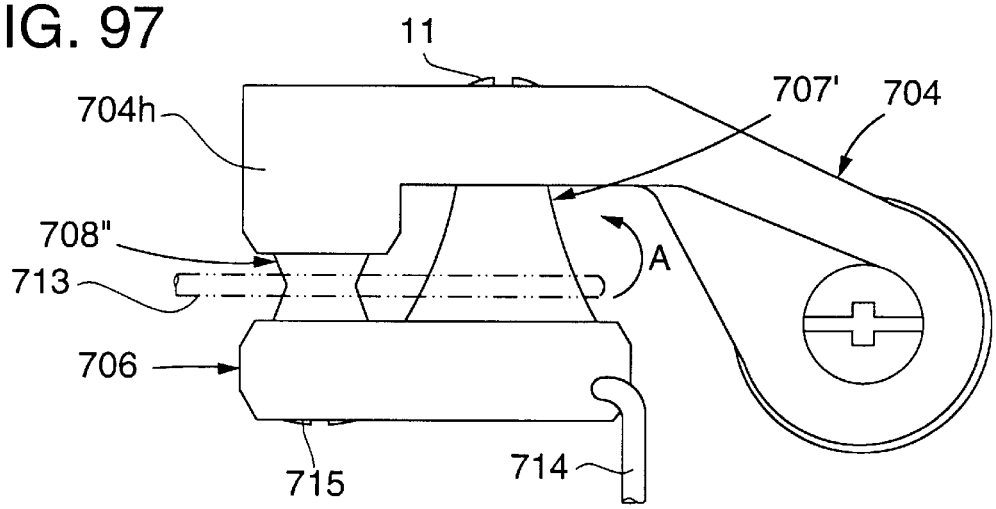
FIG. 97 is a front elevation view of the featured components of the spinning reel for fishing shown in FIG. 96.
Figure 98:
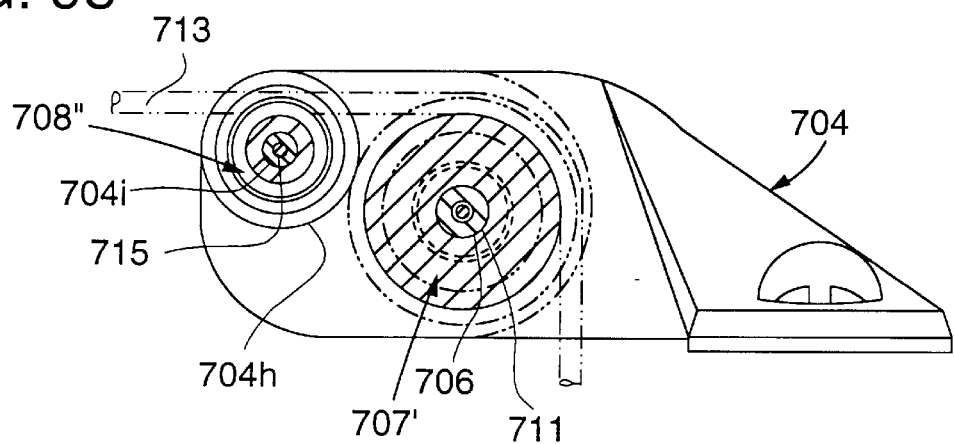
FIG. 98 is a cross-sectional plan view of the featured components of the spinning reel for fishing shown in FIG. 96.
Figure 99:
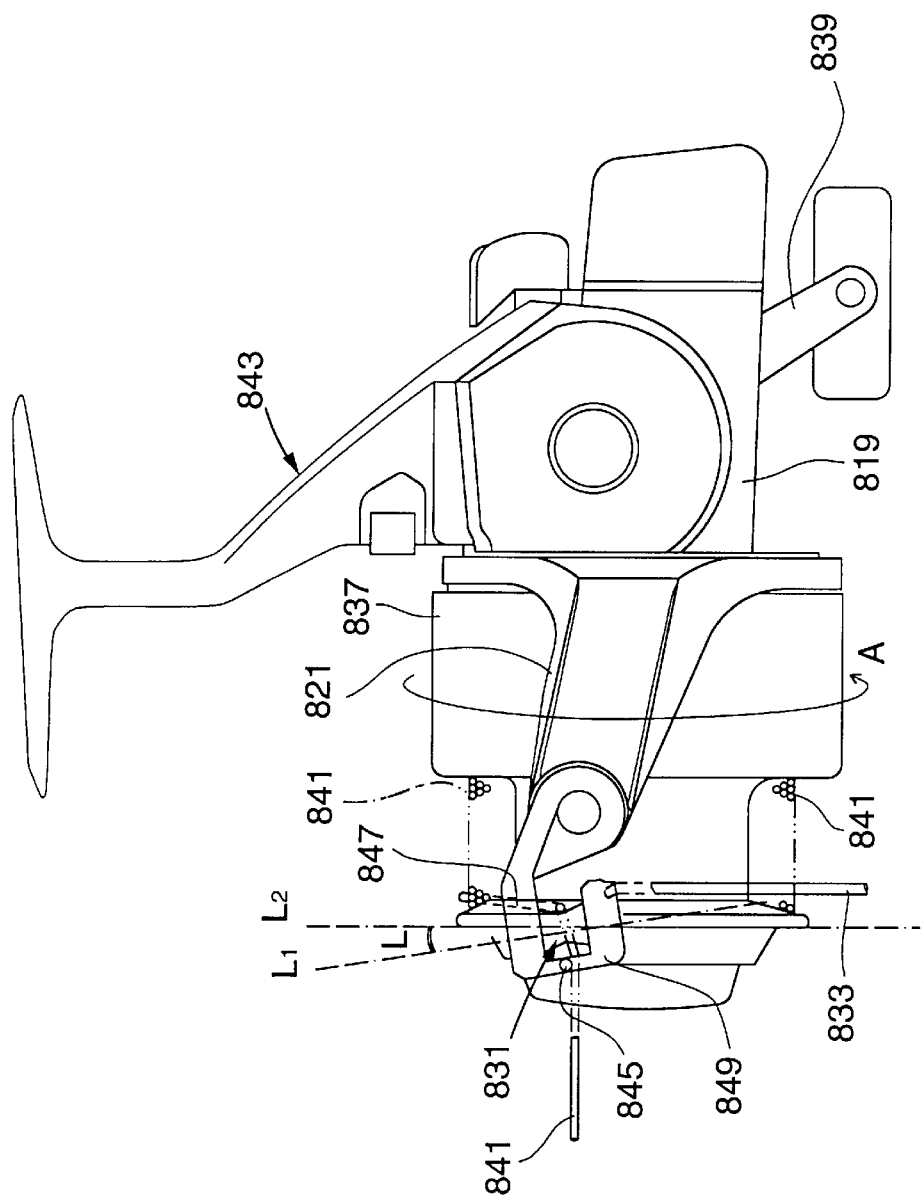
FIG. 99 is a front elevation view of a spinning reel for fishing according to a forty-seventh embodiment of the present invention.
Figure 100:
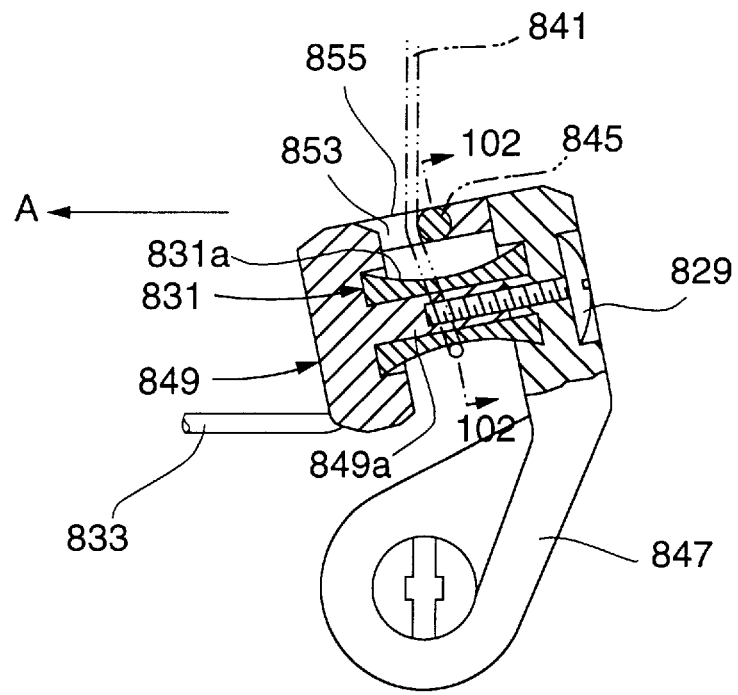
FIG. 100 is a cross-section view of the featured components of the spinning reel for fishing shown in FIG. 99.
Figure 101:
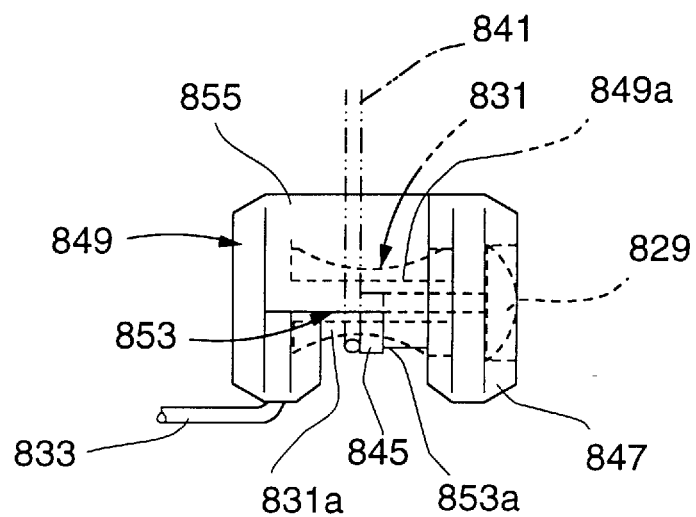
FIG. 101 is a left-side elevation view of the featured components of the spinning reel for fishing shown in FIG. 99.
Figure 102:
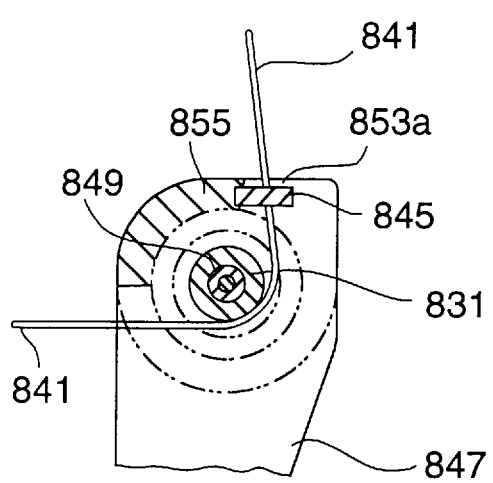
FIG. 102 is a cross-section view taken along the line 102—102 of FIG. 100.

FIGS. 96 to 98 show the featured components of a spinning reel for fishing according to a forty-sixth embodiment of the invention. Elements which are similar to the forty-third embodiment are given the same designations and repetitive descriptions are omitted.

In the forty-sixth embodiment, the bail arm 704 includes a through hole 704a. A screw 711 inserted via the through-hole 704a secures the roller support 706 to the bail arm 704. The bail arm 704 further includes a cylindrical portion 704h extending toward the roller support 706 and from which a shaft portion 704i projects. A line guide roller 708", which is smaller in size than the line guide roller 708, is used to play-out and guide the fishline 713. The line guide roller 708" is fitted on the shaft portion 704i. A screw 715 inserted via a through-hole 706c in the bail mounting portion 706, is threadably engaged in the shaft portion 704i.

Instead of the main line roller 707 according to the forty-third through forty-fifth embodiments, a main line roller 707' according to the forty-sixth embodiment is trumpet-shaped. In particular, the diameter of a curved surface 707d increases from the first end 707a proximate the one bail arm 704 to the second end 707b proximate the roller support 706, i.e. in the fishline winding rotation direction of the rotor 702.

In the above forty-third through forty-sixth embodiments, the main line rollers 707,707' are rotatably fitted on the shaft portions 706a,706f. Alternatively, the main line rollers could be secured to shaft portions which are relatively rotatable with respect to the bail arm 704.

Further, each of the line guide rollers 708,708',708" may be fixed to their respective shaft portions. However, to improve the winding performance of the spinning reel, it is preferable that the line guide rollers are relatively rotatably with respect to their shaft portions.

FIGS. 99 to 102 show the featured components of a spinning reel 843 for fishing according to a forty-seventh embodiment of the invention. A rotor 817 is rotatably mounted on a reel main body 819. A pair of bail support arms 821 (only one is shown) are formed integrally with the rotor 817. A semi-annular bail 833 is mounted on the leading end portions of the bail support arms 821. A bail arm 847 having a line roller 831 mounts a first end of the bail 833, and a bail holder mounts a second end of the bail 833. Consequently, the bail 833 can be reversibly positioned on a first side of the rotor 817 for winding a fishline 841 onto a spool 837, and on a second side of the rotor 817 for freely playing-out the fishline 841 off the spool 837.

The spool 837 is mounted coaxially with the rotor 817 and is fixed on a spool shaft (not shown). The spool shaft is mounted for reciprocating movement with respect to the reel main body 819. Similar to the conventional spinning reels for fishing, after the bail 833 has been positioned on the fishline winding side, the rotor 817 is rotated in a fishline winding direction (indicated by arrow $\underline{A}$ in FIG. 99) by operating a manual handle 839. The fishline 841 is wound around the spool 837, which concurrently reciprocates in conjunction with rotation of the rotor 817.

The spinning reel 843 according to the forty-seventh embodiment of the present invention has the following featured components in addition to the above-mentioned structure which is similar to the conventional fishing reels.

A line slider 849 is fixed to the bail arm 847 via a screw 829 threadably engaging a shaft portion 849a of the line slider 849. A line cover 855 is integrally fixed to the line slider 849 and includes a gap 853 through which the fishline 841 passes. The line roller 831 is located between the bail arm 847 and line slider 849, and rotatably supported on the shaft portion 849a. A fishline guide portion 831a of the line roller 831 has a diameter which increases toward the axial ends which are proximate to the bail arm 847 and proximate to the line slider 849.

A guide projection 853a of the line cover 855 extends toward the line slider 849 and includes a guide 845 which contacts the fishline 841 during winding, i.e. before the fishline 841 is redirected by the line roller 831, thereby restricting movement of the fishline 841 toward the bail arm 847.

Unlike the previous embodiments of the present invention in which the axis ($L_2$, in FIG. 99) of the line roller was substantially perpendicular to the common axis of the rotor and spool, axis $L_1$ of the line roller 831 according to forty-seventh embodiment is oriented obliquely with respect to the common axis of the rotor 817 and spool 837. In particular, the axial end of the line roller 831 which is proximate to the line slider 849 is bent generally backward toward the reel main body 819. The inclination of the axis $L_1$ with respect to the axis $L_2$ is preferably in the range of 1° to 10°, and more preferably 2° to 6° from the viewpoint of attaining smooth rotation of the line roller 831, preventing damage of the fishline and stabilizing line control function of the guide 845.

According to the forty-seventh embodiment, the aforementioned objects of the present invention can be achieved regardless of the relative position between the fishing reel 843 and the fishline 841 receiving eyelet along the fishing rod (not shown) closest to the fishing reel 843.

Figure 103:
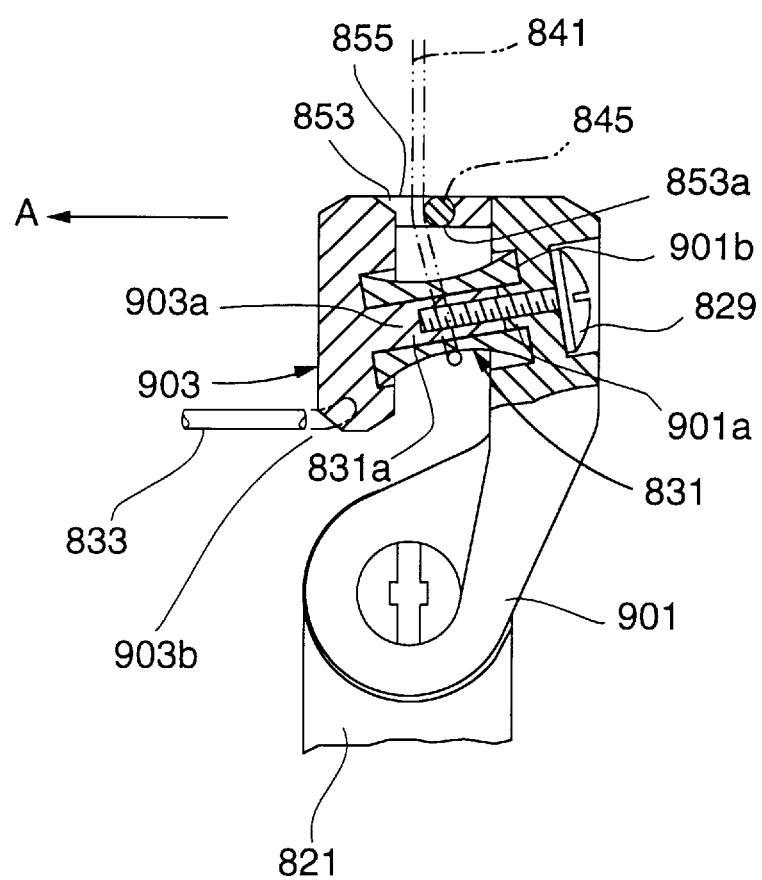
FIG. 103 is a cross-section view of the featured components of a spinning reel for fishing according to a forty-eighth embodiment of the present invention.

FIG. 103 shows the featured components of a spinning reel for fishing according to a forty-eighth embodiment of the present invention. Elements which are similar to the forty-seventh embodiment are given the same designations and repetitive descriptions are omitted.

In the forty-eighth embodiment, the bail arm 901 is not bent to obtain an oblique orientation of the line roller 831 as in the forty-seventh embodiment. Instead, only shaft portions 901a and 903a extending from the bail arm 901 and line slider 903, respectively, are obliquely oriented. Recesses 901b and 903b in the bail arm 901 and line slider 903, respectively, are also obliquely oriented to receive the axial ends of the line roller 831.

Figure 104:
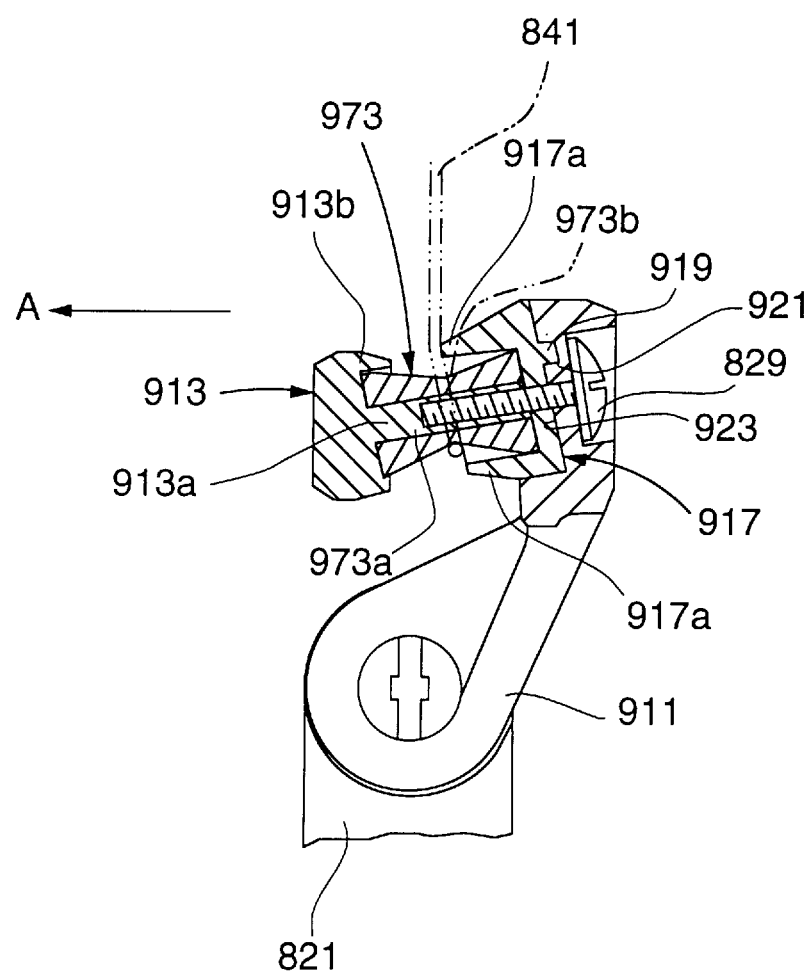
FIG. 104 is a partial cross-section, front elevation view of a spinning reel for fishing according to a forty-ninth embodiment of the present invention.
Figure 105:
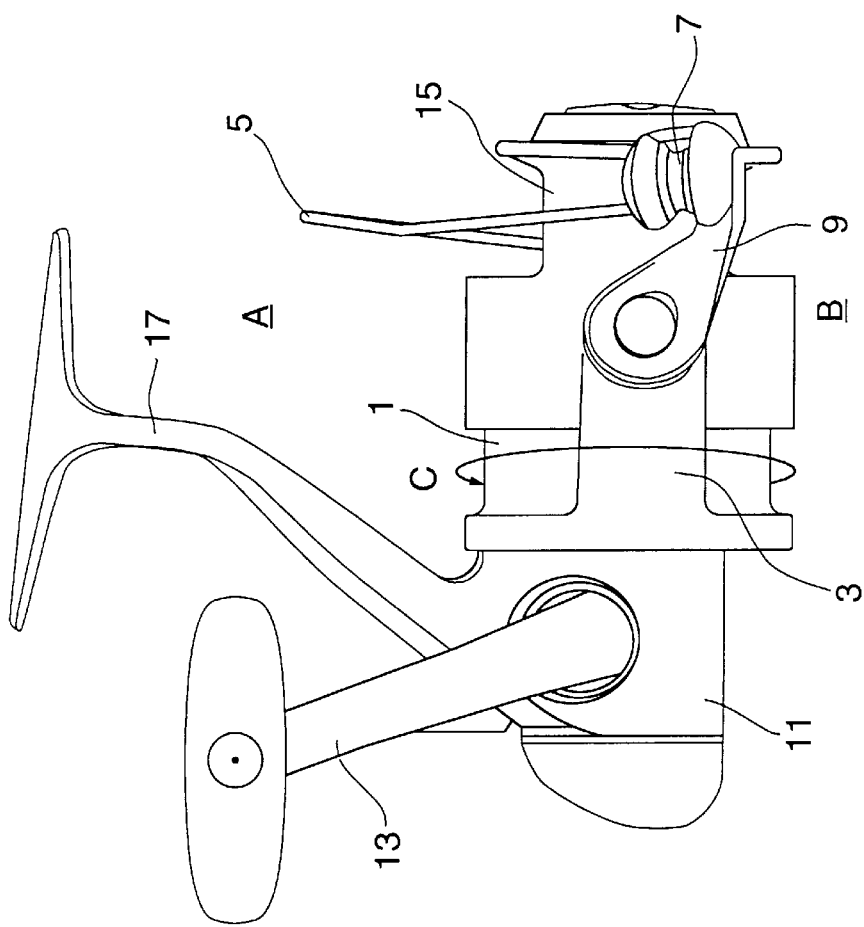
FIG. 105 is a front elevation view of a conventional spinning reel for fishing.
Figure 106A:
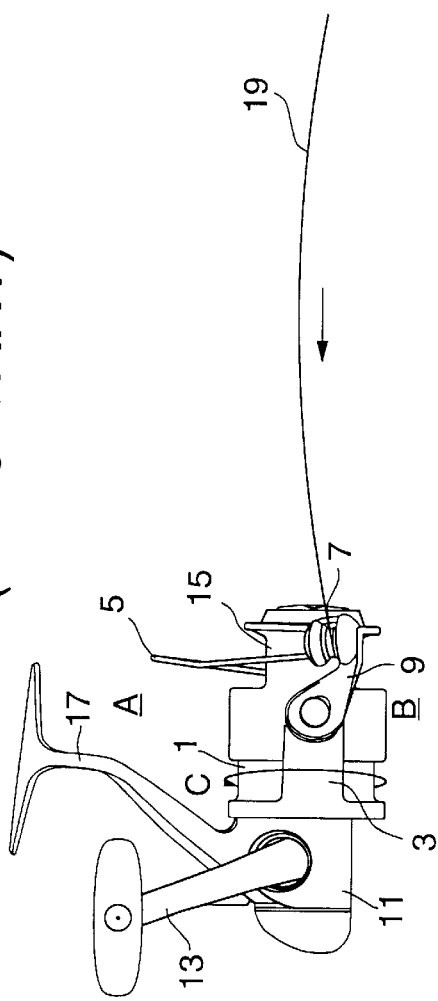
FIG. 106A shows the state of a fishline during the fishline winding operation of a conventional spinning reel.
Figure 106B:
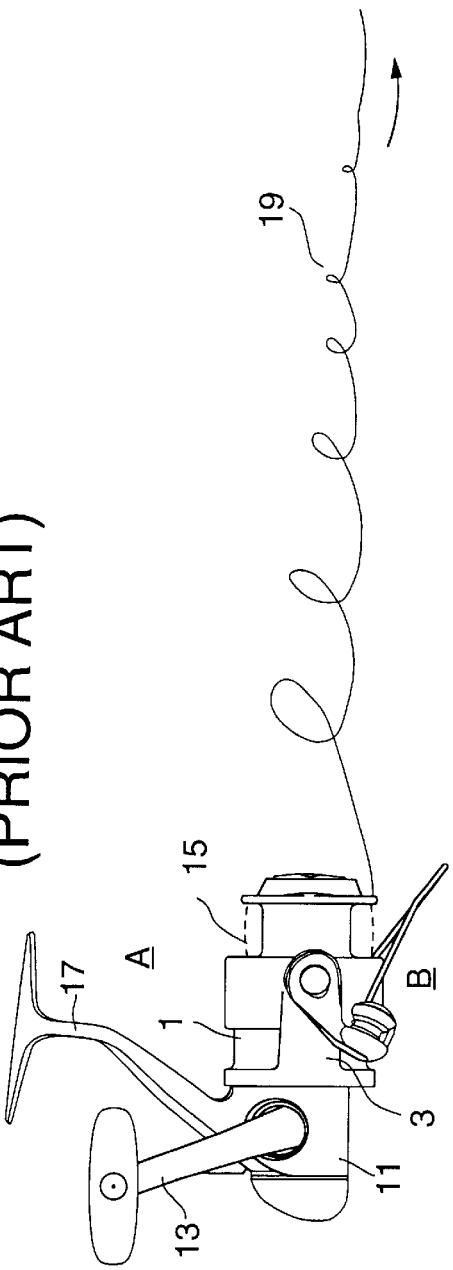
FIG. 106B shows the state of a fishline during the fishline playing-out operation of a conventional spinning reel.
Figure 107:
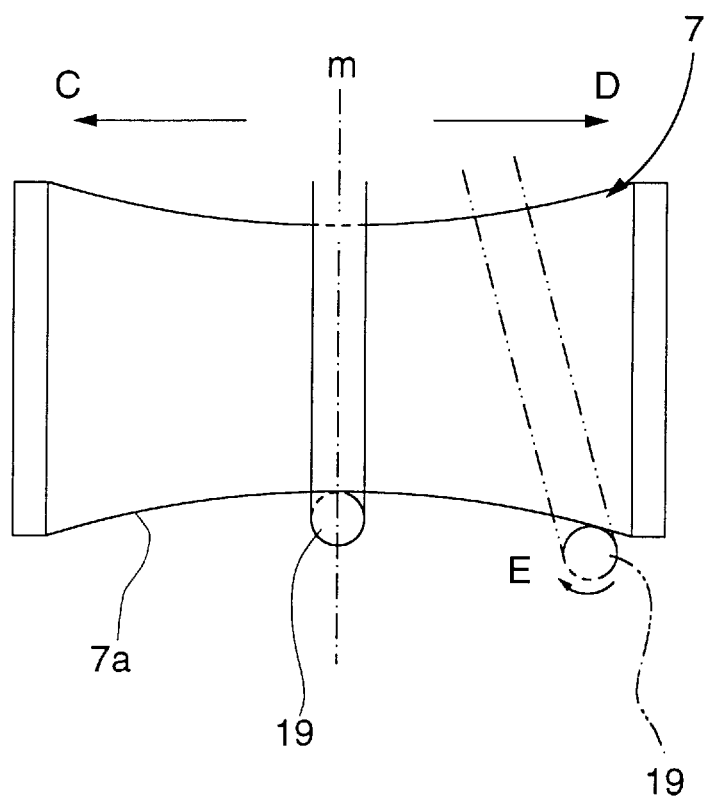
FIG. 107 is an explanatory view of the movements and twisting of a fishline during the fishline winding operation of a conventional line roller.
Figure 108:
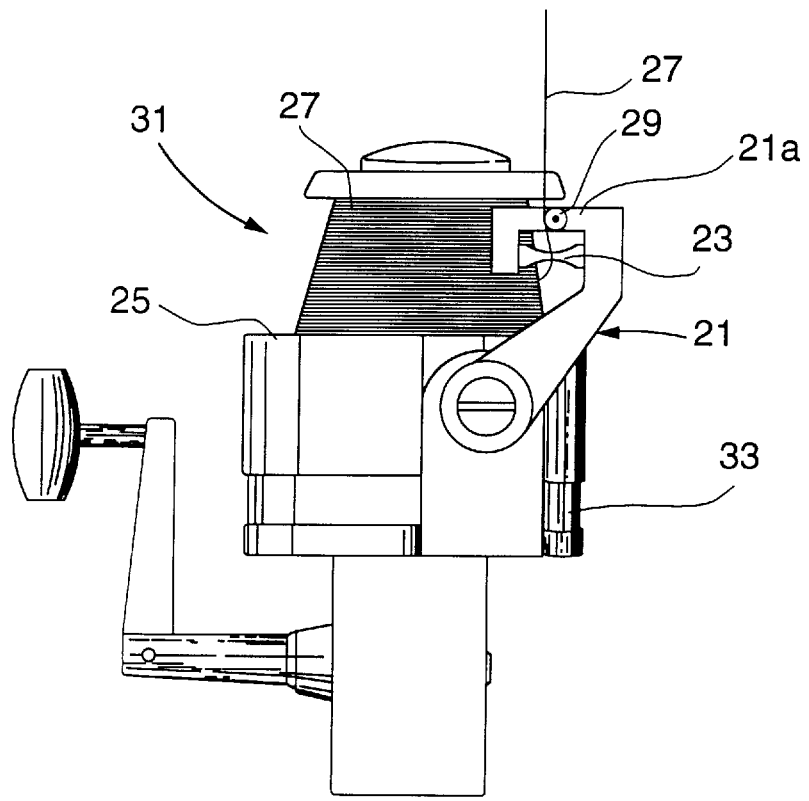
FIG. 108 is a plan view of another conventional spinning reel for fishing.
Figure 109:
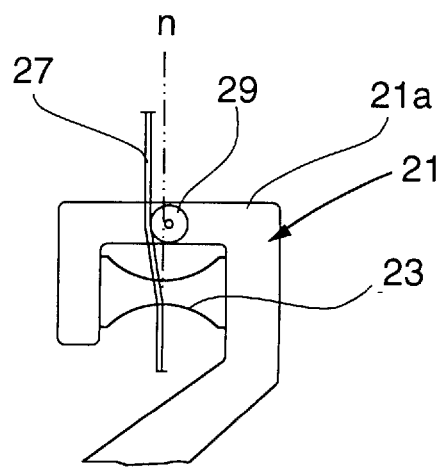
FIG. 109 is an enlarged view of a portion of the conventional spinning reel for fishing shown in FIG. 102.
Figure 110:
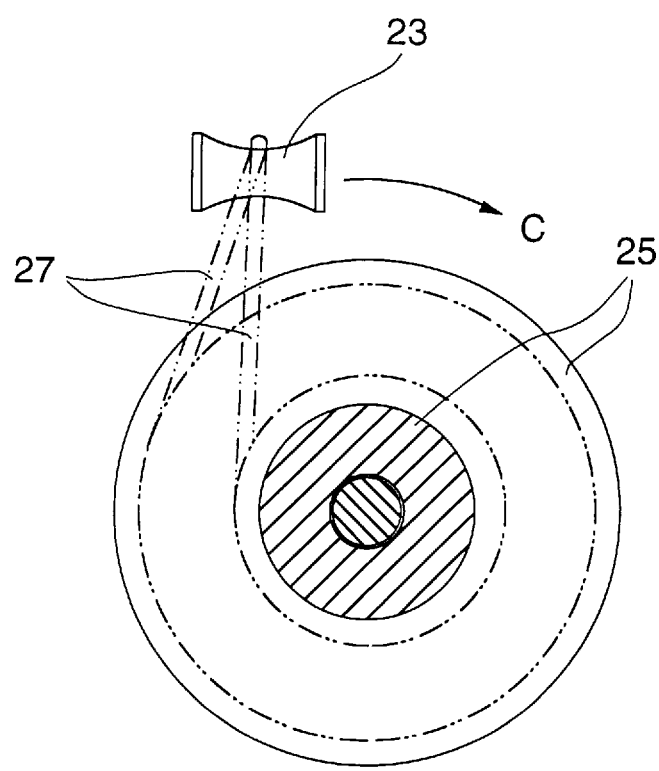
FIG. 110 is an explanatory view of the effects of variations in the line winding diameter.
Figure 111:
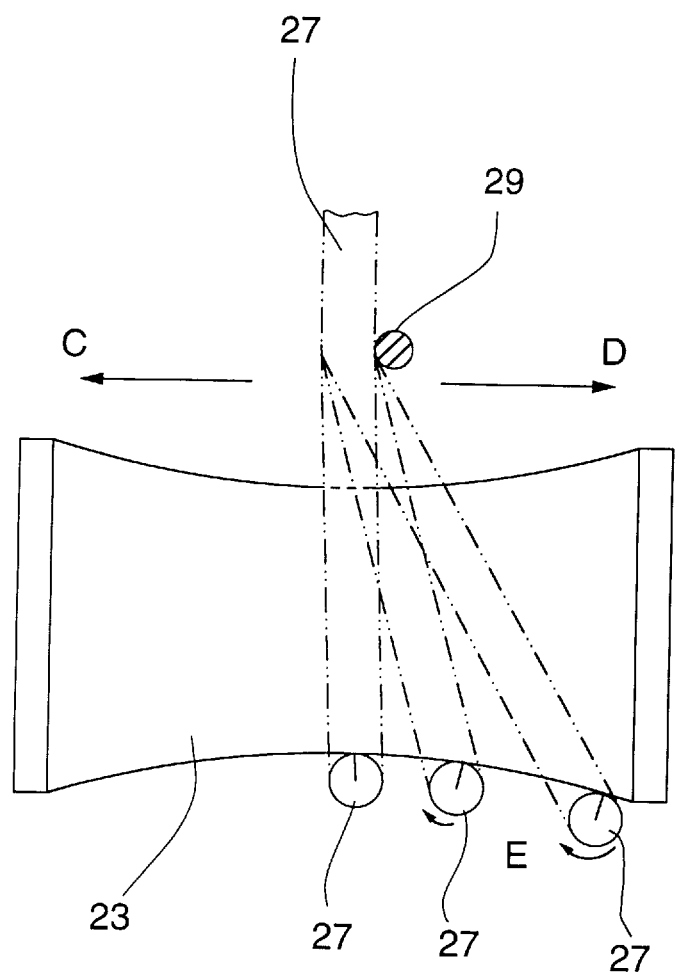
FIG. 111 is an explanatory view of the movements and twisting of a fishline due to variations in the line winding diameter of a conventional spinning reel for fishing.

FIG. 104 shows the featured components of a spinning reel for fishing according to a forty-ninth embodiment of the present invention. Elements which are similar to the forty-seventh and forty-eighth embodiments are given the same designations and repetitive descriptions are omitted.

According to the forty-ninth embodiment, the line cover of the forty-eighth embodiment is eliminated. A line slider 913 is secured to a bail arm 911 by the screw 823 threadably engaging a shaft portion 913a of the line slider 913. The shaft portion 913a, which is obliquely oriented with respect to the common axis of the rotor 817 and the spool 837, rotatably supports a line roller 973 having a fishline guide portion 973a including a valley 973b. As in the forty-eighth embodiment, recess 913b in the line slider 913 is also obliquely oriented to receive an axial end of the line roller 973.

A guide 917 is axially secured between the shaft portion 913a and the bail arm 911, and prevented from rotation by an appendage 919 cooperating with a recess 921 in a side surface 923 of the bail arm 911. As in previous embodiments, a guide projection 917a extends from the guide 917 and contacts the fishline 841 during winding.

What is claimed is:

1. A spinning reel for fishing comprising:

a reel main body;

a spool supported on said reel main body;

a rotor rotatably supported on said reel main body for winding a fishline onto said spool, said rotor including an arm; and, a first line roller mounted on said arm and rotatable about an axis, said first line roller contacting and guiding said fishline onto said spool during said winding, said first line roller being integrally formed as a unitary body including a first axial end proximate said arm, a second axial end opposite said first axial end, a fishline guide portion extending along said axis between said first and second axial ends, and a first fishline guide projection for contacting said fishline before said fishline guide portion during said winding, wherein said fishline guide portion has a diameter which increases toward said second axial end to thereby define a taper angle between a longitudinal tangent to said fishline guide portion and said axis.

2. The spinning reel for fishing according to claim 1, wherein said diameter of said fishline guide portion continuously increases from said first axial end to said second axial end.

3. The spinning reel for fishing according to claim 1, wherein said taper angle between said longitudinal tangent to said fishline guide portion and said axis is in a range of 1° to 12°.

4. The spinning reel for fishing according to claim 1, further comprising:

a flange radially projecting from said first axial end.

5. The spinning reel for fishing according to claim 1, wherein:

said first fishline guide projection extending substantially parallel to said axis and partially covering said fishline guide portion, said first fishline guide projection extends from proximate said first axial end to substantially over a longitudinal midpoint of said first line roller.

6. The spinning reel for fishing according to claim 5, wherein said first fishline guide projection completely circumscribes said first line roller.

7. The spinning reel for fishing according to claim 5, wherein said fishline guide projection extends from said first axial end.

8. A spinning reel for fishing according to claim 1, wherein said axis is substantially parallel to a rotational tangent to said rotor, said rotational tangent being tangent to an outer circumferential surface of said rotor.

9. A spinning reel for fishing according to claim 1, further comprising:
mounting means for removably interchanging said line roller.

10. A spinning reel for fishing comprising:
a reel main body;
a spool supported on said reel main body;
a rotor rotatably supported on said reel main body for winding a fishline onto said spool, said rotor including an arm;
a first line roller mounted on said arm and rotatable about an axis, said first line roller contacting and guiding said fishline onto said spool during said winding, said first line roller being integrally formed as a unitary body including a first axial end proximate said arm, a second axial end opposite said first axial end, a fishline guide portion defined by an exterior surface of said first line roller extending along a longitudinal direction between said first and second axial ends, and a first fishline guide projection;
said first fishline guide projection extending substantially parallel to said axis and partially covering said fishline guide portion, said first fishline guide projection extending from proximate said first axial end to substantially over a longitudinal midpoint of said first line roller, wherein said fishline contacts said first fishline guide projection before said first line roller during said winding, and
wherein said fishline guide portion has a diameter which increases from said longitudinal midpoint toward said second axial end to thereby define a taper angle between said fishline guide portion and said axis, said taper angle being in a range of 1° to 12°.

11. The spinning reel for fishing according to claim 10, wherein said first fishline guide projection completely circumscribes said first line roller.

12. The spinning reel for fishing according to claim 10, wherein said fishline guide projection extends from said first axial end.

13. The spinning reel for fishing according to claim 10, wherein said diameter of said fishline guide portion continuously increases from said first axial end to said second axial end.

14. The spinning reel for fishing according to claim 10, further comprising:
a flange radially projecting from said first axial end.

15. A spinning reel for fishing according to claim 10, wherein said axis is substantially parallel to a rotational tangent to said rotor, said rotational tangent being tangent to an outer circumferential surface of said rotor.

16. A spinning reel for fishing according to claim 10, further comprising:
mounting means for removably interchanging said line roller.

17. A spinning reel for fishing according to claim 10, wherein a spatial gap is defined between said first fishline guide projection and said fishline guide portion in a radial direction of said first line roller.

18. A spinning reel for fishing comprising:
a reel main body;
a spool supported on said reel main body;
a rotor rotatably supported on said reel main body for winding a fishline onto said spool, said rotor including an arm;
a first line roller mounted on said arm and rotatable about an axis, said first line roller contacting and guiding said fishline onto said spool during said winding, said first line roller including a first axial end proximate said arm, a second axial end opposite said first axial end, and a fishline guide portion defined by an exterior surface of said first line roller and disposed between said first and second axial ends; and
at least one flange radially projecting from said first axial end,
wherein said fishline guide portion and said at least one flange are integrally formed as a unitary body, said flange defining a fishline guiding path along which said fishline travels during winding, said fishline guiding path extending from said flange to said fishline guide portion and intersecting said fishline guide portion at a fishline contact point, and
wherein said fishline guide portion continuously decreases in diameter toward said first axial end and terminates at a junction with said flange, said fishline contact point being between said second axial end and said junction.

19. A spinning reel for fishing comprising:
a reel main body;
a spool supported on said reel main body;
a rotor rotatably supported on said reel main body for winding a fishline onto said spool, said rotor including an arm; and
a line roller mounted on said arm and rotatable about an axis, said line roller contacting and guiding said fishline onto said spool during said winding, said line roller being integrally formed as a unitary body including a first axial end proximate said arm, a second axial end opposite said first axial end, a fishline guide portion defined by an exterior surface of said line roller disposed between said first and second axial ends, and a restriction portion restricting an axial movement of said fishline in an axial direction from said second axial end toward said first axial end by contact with said fishline,
wherein said line roller defines a fishline guiding path along which said fishline travels during winding, said fishline guiding path extending from said restricting portion to said fishline guide portion, said fishline guiding path intersecting said fishline guide portion at a fishline contact point, and
wherein said fishline guide portion has a varying diameter along said axial direction from said second axial end to said contact point.

20. The spinning reel for fishing according to claim 19, wherein a taper angle is defined between said fishline guide portion and said axis, said taper angle being in a range of 1° to 12°.

21. The spinning reel for fishing according to claim 19, wherein said restriction portion completely circumscribes said first line roller.

22. A spinning reel for fishing comprising:

a reel main body;

a spool supported on said reel main body;

a rotor rotatably supported on said reel main body for winding a fishline onto said spool, said rotor including an arm; and a line roller mounted on said arm and rotatable about an axis, said line roller contacting and guiding said fishline onto said spool during said winding, said line roller being integrally formed as a unitary body including a first axial end proximate said arm, a second axial end opposite said first axial end, a fishline guide portion defined by an exterior surface of said line roller between said first and second axial ends, and a restriction portion restricting an axial movement of said fishline in an axial direction from said second axial end toward said first axial end by contact with said fishline, wherein said restriction portion comprises a raised contact surface disposed in a generally radial direction from said fishline guide portion between said second axial end and said first axial end, said fishline contacting said raised contact portion before said fishline guide portion during said winding, and said raised contact surface restricting axial movement of said fishline, and wherein said fishline guide portion comprises an outer circumferential surface which decreases in diameter along said axial direction to said raised contact surface.

23. The spinning reel for fishing according to claim 22, wherein a taper angle is defined between said fishline guide portion and said axis, said taper angle being in a range of 1° to 12°.

24. The spinning reel for fishing according to claim 22, wherein said restriction portion completely circumscribes said first line roller.

* * * * *